US008904435B2

(12) United States Patent
Drazin et al.

(10) Patent No.: US 8,904,435 B2
(45) Date of Patent: *Dec. 2, 2014

(54) ELECTRONIC PROGRAM GUIDE FOR INDICATING AVAILABILITY OF PAST PROGRAMS

(71) Applicant: United Video Properties, Inc., Santa Clara, CA (US)

(72) Inventors: Jonathan P. V. Drazin, Buckinghamshire (GB); Achim H. Kram, London (GB)

(73) Assignee: United Video Properties, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,328

(22) Filed: May 22, 2013

(65) Prior Publication Data

US 2013/0326559 A1 Dec. 5, 2013

Related U.S. Application Data

(63) Continuation of application No. 13/570,019, filed on Aug. 8, 2012, now Pat. No. 8,505,050, which is a continuation of application No. 10/474,089, filed as application No. PCT/GB02/01557 on Apr. 3, 2002, now Pat. No. 8,266,649.

(51) Int. Cl.
H04N 5/445 (2011.01)
H04N 21/4147 (2011.01)
H04N 21/45 (2011.01)
H04N 21/431 (2011.01)
H04N 21/482 (2011.01)
H04N 21/472 (2011.01)
H04N 21/81 (2011.01)

(52) U.S. Cl.
CPC ......... H04N 21/482 (2013.01); H04N 21/4147 (2013.01); H04N 21/4532 (2013.01); H04N 21/4314 (2013.01); H04N 21/8133 (2013.01); H04N 21/4821 (2013.01); H04N 21/47214 (2013.01); H04N 5/44543 (2013.01); H04N 21/4316 (2013.01)
USPC .................................. 725/39; 725/56; 725/58

(58) Field of Classification Search
USPC ................................................ 725/39, 56, 58
See application file for complete search history.

(56) References Cited

U.S. PATENT DOCUMENTS 4,706,121 A 11/1987 Young
4,872,005 A 10/1989 DeLuca et al.
(Continued)

FOREIGN PATENT DOCUMENTS

DE 44 33 033 C1 9/1995
EP 604871 A1 7/1994
(Continued)

OTHER PUBLICATIONS

Office Actions dated Nov. 20, 2006, Jul. 18, 2007 and Feb. 6, 2008 and Corresponding Replies dated Apr. 20, 2007, Nov. 19, 2007 and Jul. 3, 2008 in relation to U.S. Appl. No. 10/762,812.
(Continued)

Primary Examiner — Pankaj Kumar
Assistant Examiner — Franklin Andramuno
(74) Attorney, Agent, or Firm — Ropes & Gray LLP

(57) ABSTRACT

A system and method for providing an electronic program guide for television or radio programs includes presenting listing of present or future programs on-screen, presenting listings of past programs on-screen and indicating whether the past program is available again at a future time. Also, a system and method for handling information controllable from an electronic program guide for television or radio programs comprises receiving information in a user's system, storing the received information in the user's system, displaying access to the stored information by means of a user interface and enabling the user to select one of a plurality of management options for controlling the operation of the stored information through the user interface.

24 Claims, 50 Drawing Sheets

(56) References Cited

U.S. PATENT DOCUMENTS

| | | |
|---|---|---|
| 5,224,156 A | 6/1993 | Fuller et al. |
| 5,351,075 A | 9/1994 | Herz et al. |
| 5,353,121 A | 10/1994 | Young et al. |
| 5,479,266 A | 12/1995 | Young et al. |
| 5,479,268 A | 12/1995 | Young et al. |
| 5,485,197 A | 1/1996 | Hoarty |
| 5,585,838 A | 12/1996 | Lawler et al. |
| 5,589,892 A | 12/1996 | Knee et al. |
| 5,594,661 A | 1/1997 | Bruner et al. |
| 5,596,373 A | 1/1997 | White et al. |
| 5,635,989 A | 6/1997 | Rothmuller |
| 5,654,748 A | 8/1997 | Matthews, III |
| 5,657,072 A | 8/1997 | Aristides et al. |
| 5,680,617 A | 10/1997 | Gough et al. |
| 5,699,107 A | 12/1997 | Lawler et al. |
| 5,734,444 A | 3/1998 | Yoshinobu |
| 5,751,282 A * | 5/1998 | Girard et al. ............ 715/721 |
| 5,801,787 A | 9/1998 | Schein et al. |
| 5,805,763 A | 9/1998 | Lawler et al. |
| 5,808,608 A | 9/1998 | Young et al. |
| 5,809,204 A | 9/1998 | Young et al. |
| 5,850,218 A | 12/1998 | LaJoie et al. |
| 5,880,768 A | 3/1999 | Lemmons et al. |
| 5,907,323 A | 5/1999 | Lawler et al. |
| 5,945,988 A | 8/1999 | Williams et al. |
| 5,949,954 A | 9/1999 | Young et al. |
| 5,959,688 A | 9/1999 | Schein et al. |
| 6,008,802 A | 12/1999 | Iki et al. |
| 6,023,267 A | 2/2000 | Chapuis et al. |
| 6,061,056 A | 5/2000 | Menard et al. |
| 6,075,526 A | 6/2000 | Rothmuller |
| 6,133,909 A | 10/2000 | Schein et al. |
| 6,141,488 A | 10/2000 | Knudson et al. |
| 6,151,059 A | 11/2000 | Schein et al. |
| 6,172,674 B1 | 1/2001 | Etheredge |
| 6,177,931 B1 | 1/2001 | Alexander et al. |
| 6,208,335 B1 | 3/2001 | Gordon et al. |
| 6,216,264 B1 | 4/2001 | Maze et al. |
| 6,247,176 B1 | 6/2001 | Schein et al. |
| 6,266,814 B1 | 7/2001 | Lemmons et al. |
| 6,275,648 B1 | 8/2001 | Knudson et al. |
| 6,369,840 B1 | 4/2002 | Barnett et al. |
| 6,388,714 B1 | 5/2002 | Schein et al. |
| 6,442,332 B1 | 8/2002 | Knudson et al. |
| 6,445,398 B1 * | 9/2002 | Gerba et al. ............ 715/721 |
| 6,473,559 B1 | 10/2002 | Knudson et al. |
| 6,483,548 B1 | 11/2002 | Allport |
| 6,532,589 B1 | 3/2003 | Proehl et al. |
| 6,601,238 B2 | 7/2003 | Morrison et al. |
| 6,614,987 B1 | 9/2003 | Ismail et al. |
| 6,681,396 B1 | 1/2004 | Bates et al. |
| 6,701,528 B1 | 3/2004 | Arsenault et al. |
| 6,721,954 B1 | 4/2004 | Nickum |
| 6,742,184 B1 | 5/2004 | Finseth et al. |
| 6,751,401 B1 | 6/2004 | Arai et al. |
| 6,782,551 B1 | 8/2004 | Entwistle |
| 6,822,661 B2 | 11/2004 | Sai et al. |
| 6,850,693 B2 | 2/2005 | Young et al. |
| 6,857,128 B1 | 2/2005 | Borden, IV et al. |
| 6,898,762 B2 | 5/2005 | Ellis et al. |
| 6,901,207 B1 * | 5/2005 | Watkins ............ 386/314 |
| 6,909,708 B1 | 6/2005 | Krishnaswamy et al. |
| 7,003,213 B1 * | 2/2006 | Hasegawa ............ 386/291 |
| 7,029,640 B2 | 4/2006 | Yao et al. |
| 7,032,176 B2 | 4/2006 | Gordon et al. |
| 7,096,185 B2 | 8/2006 | Reichardt et al. |
| 7,100,184 B1 | 8/2006 | Kahn |
| 7,151,886 B2 | 12/2006 | Young et al. |
| 7,185,355 B1 | 2/2007 | Ellis et al. |
| 7,187,847 B2 | 3/2007 | Young et al. |
| 7,188,356 B1 | 3/2007 | Miura et al. |
| 7,325,244 B2 | 1/2008 | Boyle et al. |
| 7,343,614 B1 | 3/2008 | Hendricks et al. |
| 7,694,319 B1 | 4/2010 | Hassell et al. |
| 7,761,892 B2 | 7/2010 | Ellis et al. |
| 7,895,624 B1 | 2/2011 | Thomas et al. |
| 2001/0013126 A1 | 8/2001 | Lemmons et al. |
| 2001/0027563 A1 | 10/2001 | White et al. |
| 2001/0039656 A1 | 11/2001 | Nakamura et al. |
| 2002/0026496 A1 | 2/2002 | Boyer et al. |
| 2002/0038457 A1 | 3/2002 | Numata et al. |
| 2002/0049804 A1 | 4/2002 | Rodriguez et al. |
| 2002/0073424 A1 | 6/2002 | Ward et al. |
| 2002/0073427 A1 * | 6/2002 | Morrison et al. ............ 725/50 |
| 2002/0157099 A1 | 10/2002 | Schrader et al. |
| 2002/0162112 A1 | 10/2002 | Javed |
| 2002/0174430 A1 | 11/2002 | Ellis et al. |
| 2003/0016471 A1 | 1/2003 | Hiraguchi et al. |
| 2003/0040962 A1 | 2/2003 | Lewis |
| 2003/0110499 A1 | 6/2003 | Knudson et al. |
| 2003/0115603 A1 | 6/2003 | Lemmons et al. |
| 2003/0131356 A1 | 7/2003 | Proehl et al. |
| 2003/0142957 A1 | 7/2003 | Young et al. |
| 2003/0146940 A1 | 8/2003 | Ellis et al. |
| 2003/0149988 A1 | 8/2003 | Ellis et al. |
| 2003/0177495 A1 | 9/2003 | Needham et al. |
| 2003/0208756 A1 | 11/2003 | Macrae et al. |
| 2003/0208763 A1 | 11/2003 | McElhatten et al. |
| 2004/0008971 A1 | 1/2004 | Young et al. |
| 2004/0019902 A1 | 1/2004 | Knudson et al. |
| 2004/0019903 A1 | 1/2004 | Knudson et al. |
| 2004/0031052 A1 | 2/2004 | Wannamaker et al. |
| 2004/0049783 A1 | 3/2004 | Lemmons et al. |
| 2004/0073927 A1 | 4/2004 | Knudson et al. |
| 2004/0078815 A1 | 4/2004 | Lemmons et al. |
| 2004/0103434 A1 | 5/2004 | Ellis |
| 2004/0123323 A1 | 6/2004 | Russo |
| 2004/0143845 A1 | 7/2004 | Lin et al. |
| 2004/0158861 A1 | 8/2004 | Terakado et al. |
| 2004/0181814 A1 | 9/2004 | Ellis et al. |
| 2004/0205644 A1 | 10/2004 | Shaughnessy et al. |
| 2004/0216160 A1 | 10/2004 | Lemmons et al. |
| 2004/0218905 A1 | 11/2004 | Green et al. |
| 2005/0002649 A1 | 1/2005 | Boyle et al. |
| 2005/0010949 A1 | 1/2005 | Ward et al. |
| 2005/0022242 A1 | 1/2005 | Rosetti et al. |
| 2005/0028208 A1 | 2/2005 | Ellis et al. |
| 2005/0055715 A1 | 3/2005 | Minnick et al. |
| 2005/0120371 A1 | 6/2005 | Kimura et al. |
| 2005/0144640 A1 | 6/2005 | Fritsch et al. |
| 2005/0172319 A1 | 8/2005 | Reichardt et al. |
| 2005/0204388 A1 | 9/2005 | Knudson et al. |
| 2005/0229213 A1 | 10/2005 | Ellis et al. |
| 2005/0235322 A1 | 10/2005 | Ellis et al. |
| 2005/0235323 A1 | 10/2005 | Ellis et al. |
| 2005/0251831 A1 | 11/2005 | Young et al. |
| 2005/0278741 A1 | 12/2005 | Robarts et al. |
| 2006/0083484 A1 | 4/2006 | Wada et al. |
| 2006/0117347 A1 | 6/2006 | Steading |
| 2006/0140584 A1 | 6/2006 | Ellis et al. |
| 2006/0161956 A1 | 7/2006 | Wasilewski et al. |
| 2007/0016926 A1 | 1/2007 | Ward et al. |
| 2007/0033613 A1 | 2/2007 | Ward et al. |
| 2007/0186240 A1 | 8/2007 | Ward et al. |

FOREIGN PATENT DOCUMENTS

| | | |
|---|---|---|
| EP | 0 805 590 A2 | 11/1997 |
| EP | 1014715 A2 | 6/2000 |
| EP | 1 104 189 A2 | 5/2001 |
| EP | 1 104 195 A2 | 5/2001 |
| EP | 1 126 701 A1 | 8/2001 |
| JP | 11-88280 A | 7/1989 |
| JP | 2001-77771 | 9/1999 |

(56) References Cited

FOREIGN PATENT DOCUMENTS

| | | |
|---|---|---|
| JP | 2001-128076 A | 5/2001 |
| JP | 2001-186429 A | 7/2001 |
| WO | WO-9322877 | 11/1993 |
| WO | WO-9838831 A1 | 9/1998 |
| WO | WO-00/21286 A1 | 4/2000 |

OTHER PUBLICATIONS

Bowen et. al., "The Datacycle Architecture," Communications of the ACM, vol. 35, No. 12, pp. 71-81. Dec. 1992.
"Horzu", p. 68, 28.9.1999.
"Horzu", p. 69, 28.9.1999.

* cited by examiner

ELECTRONIC PROGRAM GUIDE FOR INDICATING AVAILABILITY OF PAST PROGRAMS

CROSS-REFERENCE TO RELATED APPLICATIONS

This application is a continuation application of Ser. No. 13/570,019, filed Aug. 8, 2012, which is a continuation of U.S. patent application Ser. No. 10/474,089, now U.S. Pat. No. 8,266,649, filed May 14, 2004, which is a national stage of International Patent Application No. PCT/GB02/01557, filed Apr. 3, 2002, which claims priority benefit under 35 U.S.C. §119 from Great Britain Patent Application No. 0108355.9, filed Apr. 3, 2001, and Great Britain Patent Application No. 0204478.2, filed Feb. 26, 2002. The aforementioned, earlier-filed applications are hereby incorporated by reference herein in their entireties.

The present invention relates to an improved electronic program guide (EPG) for a television or radio system. The present invention, in further embodiments, also relates to a system for handling information controllable from an EPG, particularly but not exclusively for a set-top-box (STB) connected within a television or radio system.

Many electronic program guide (EPG) systems have emerged over the past few years. These display listings information for television or radio programs to assist users to plan their television viewing or radio listening for the coming few days. Such systems may provide a record function whereby a user highlights and selects on-screen a portion of listing information, thereby to activate a record or watch or listen (for radio) function for the program selected by the user. Such systems may also provide a means for receiving targeted advertising provided by the service provider in the form of advertisements being sent to the user's system and displayed in the EPG.

In the case of a user selecting a record function, the system may control a recording device (e.g. VCR, PVR, DVD, audio-cassette, MiniDisc or DAT recorder) to record the desired program on the right channel and at the right time. In the case of a user selecting a watch function, the system may cause an icon or reminder message to be displayed on the television screen a short while before the desired program is to be broadcast. Alternatively the system may cause an audible alarm to be sounded.

The effectiveness of finding and recording or watching a desired program in this way depends upon on the ease of use of the particular EPG and upon a user's inclination to consult it properly. With even the most user friendly EPG, users often forget or cannot spare time to browse desired programs. In order to solve this problem and provide more sophisticated functionality, some EPGs infer programs of interest to users and record them without any user intervention. Inferences are made by inviting users to rate program titles displayed within the EPG according to whether they are explicitly of interest. An alternative, implicit approach infers programs of interest by monitoring whether programs possessing similar characteristics were viewed in the past. In either case, a rating algorithm is employed by the EPG system to decide whether each program carried within the EPG listings data is of sufficient interest to warrant recording. Such methods increase the likelihood that a desired program will be recorded. However, these systems are not infallible and often fail to record programs reliably and may either be too indiscriminate or miss specific programs of interest.

An object of the invention is to provide an electronic program guide with improved functionality.

A further preferred embodiment of the present invention is directed to providing an improved EPG for a television or radio system in which non-volatile means is provided to record programs or data, such as advertising data or general information, for subsequent viewing.

According to a first aspect of the present invention, there is provided a system for providing an electronic program guide for television or radio programs that includes:

means for presenting listings of present or future programs on-screen;

means for presenting listings of past programs on-screen and means, associated with the on-screen listings of past programs, for indicating whether the past program is available again at a future time.

In this way, users can identify programs desired for watching or recording based upon those they have missed in the recent past. This is advantageous, because with the continuing trend towards increasing numbers of channels, there are growing probabilities that a missed program will be repeated in the not too distant future, either on the same channel or on a different one. Hence, by linking a past program within the EPG to future repeats of that program, viewers can readily identify and select a future program based on a missed past program.

The means indicative of the availability of the past program at a later date, may be operable to highlight within the on-screen listings of past programs, programs that are to be repeated.

Preferably, means are provided for receiving a user selection of a past program. Means responsive to the user selection may be provided for generating options for the user to select. The options may include record or watch functions. Means may be provided so that on selection of the record function, the system is automatically set to cause a repeat of the selected past program to be recorded. Means may be provided so that on selection of the watch function, the system is automatically set to notify the viewer when a repeat of the selected past program is about to be broadcast.

The guide may be presented in a grid format, with time along one axis of the grid and channel along another axis of the grid. Time is preferably along a horizontal axis of the grid and channel is preferably along a vertical axis of the grid.

According to a second aspect of the present invention, there is provided a computer program, preferably on a data carrier, for providing an electronic program guide for television or radio programs, the computer program including instructions for:

presenting listings of present or future programs on-screen;

presenting listings of past programs on-screen and indicating in association with the on-screen listings of past programs whether the past program is available again at a future time.

According to a third aspect of the present invention, there is provided a method for providing an electronic program guide for television or radio programs that includes:

receiving program listings information;

presenting listings of present or future programs;

presenting listings of past programs and indicating whether the past program is available again at a future time.

The step of indicating may involve highlighting in the guide programs that are to be repeated.

The method also may involve receiving a user selection of a past program and generating options for the user to select. The options may include record or watch functions. Preferably on selection of the record function, recording of a repeat of the selected program is set automatically. On selection of the watch function, the method may further involve automatically notifying the viewer when a repeat of the selected program is about to be broadcast. This may be done by generating and presenting an icon a pre-determined time prior to the start of the program.

According to a fourth aspect of the present invention, there is provided a system for providing an electronic program guide for television or radio programs that includes:
- means for presenting listings of present or future programs on-screen;
- means for presenting listings of past programs on-screen;
- means for receiving user selections of functions associated with past programs, for example recording or watching or listening;
- means for identifying whether the past program is to be repeated and means for activating the selected function associated with the past program in the event that the past program is repeated.

The means for identifying whether the past program is to be repeated may comprises means for searching the past and future listings to determine a match between the listings information.

Means may be provided, associated with the on-screen listings of past programs, for indicating whether the past program is available again at a future time.

According to a fifth aspect of the present invention, there is provided a method for providing an electronic program guide for television or radio programs, the method involving:
- presenting listings of past programs on-screen;
- receiving user selections of functions associated with past programs, for example recording or watching or listening;
- identifying whether the past program is to be repeated; and
- activating the selected function associated with the past program in the event that the past program is repeated.

The step of identifying whether the past program is to be repeated may comprise searching past and future program listings to determine a match between at least part of the listings information. The part of the listings information compared may be a program and/or episode identifier.

According to a sixth aspect of the present invention, there is provided a computer program, preferably on a data carrier, for providing an electronic program guide for television or radio programs, the computer program comprising instructions for:
- presenting listings of past programs on-screen;
- receiving user selections of past programs for recording or watching or listening;
- identifying whether the past program is to be repeated; and
- causing the repeat of the past program to be recorded or notifying the user of the repeat of the past program, in the event that the past program is repeated.

The instructions for identifying whether the past program is to be repeated may comprise instructions for searching past and future program listings to determine a match between at least part of the listings information. The part of the listings information compared may be a program and/or episode identifier.

According to a seventh aspect of the present invention, there is provided a system for providing an electronic program guide for television or radio programs that includes:
- means for presenting listings of present or future programs on-screen; and
- means for presenting listings of past programs on-screen.

Preferably, means are provided for identifying past programs, these means preferably comprising means for comparing the stop time of programs with real time derived from either a real time clock or a downloaded real time signal, thereby to identify programs that have finished. Preferably, this is done each time the electronic program guide is accessed by the viewer.

According to an eighth aspect of the present invention there is provided a system for handling information controllable from an EPG for television or radio programs, the system comprising:
- means for receiving information in a user's system;
- means for storing the received information in the user's system;
- means for displaying access to the stored information by means of a user interface; and
- control means for enabling the user to select one of a plurality of management options for controlling the operation of the stored information through the user interface.

Preferably, the means for storing the received information is Flash memory, DRAM, a non-volatile storage such as a hard disk or an optical storage device.

Preferably, the means for receiving the information is an aerial, satellite, cable or ADSL receiver.

Preferably, the system further comprises means for erasing stored information from the means for storing the information.

In a preferred embodiment, the system further comprises means for automatically deleting stored information from the means for storing the information, preferably in response to detection of insufficient storage space for recordal of desired information.

Preferably, the system further comprises means for categorising received information, for example according to subject matter, date of receipt or storage of the information by the system, or channel on which the information was transmitted. In the preferred embodiment, the means for categorising further comprises allocating a colour identifier to different categories of stored information.

Preferably, the system further comprises means for searching the stored information, for example, according to date of receipt or storage of the information by the system, subject matter, or channel on which the information was transmitted.

Preferably, the system further comprises means for displaying a portion of the stored information in the user interface on selection of associated stored information by the user.

In a preferred embodiment, the means for receiving information is adapted to receive information provided by a service provider, or the user.

Preferably, the system further comprises means for presenting listings of present or future programs on-screen, means for presenting listings of past programs on-screen and means associated with the on-screen listings of past programs for indicating whether or not the past program is available again at a future time.

In this way, users can identify programs desired for watching or recording based upon those they have missed in the recent past. This is advantageous, because with the continuing trend towards increasing numbers of channels, there are growing probabilities that a missed program will be repeated in the not too distant future, either on the same channel or on a different one. Hence, by linking a past program within the EPG to future repeats of that program, viewers can readily identify and select a future program based on a missed past program.

The means indicative of the availability of the past program at a later date, may be operable to highlight within the on-screen listings of past programs, programs that are to be repeated.

Preferably, means are provided for receiving a user selection of a past program. Means responsive to the user selection may be provided for generating options for the user to select. The options may include record or watch functions. Means may be provided so that on selection of the record function, the system is automatically set to cause a repeat of the selected past program to be recorded. Means may be provided so that on selection of the watch function, the system is automatically set to notify the viewer when a repeat of the selected past program is about to be broadcast.

The guide may be presented in a grid format, with time along one axis of the grid and channel along another axis of the grid. Time is preferably along a horizontal axis of the grid and channel is preferably along a vertical axis of the grid.

Preferably, the system further comprises means for identifying whether the past program is to be repeated and means for activating the selected function associated with the past program in the event that the past program is repeated.

The means for identifying whether the past program is to be repeated may comprise means for searching the past and future listings to determine a match between the listings information.

Means may be provided, associated with the on-screen listings of past programs, for indicating whether the past program is available again at a future time.

According to a ninth aspect of the invention there is provided a method for handling information controllable from an EPG for television or radio programs, the method comprising:
  receiving information in a user's system;
  storing the received information in the user's system;
  displaying access to the stored information by means of a user interface; and
  controlling the selection of one of a plurality of management options for controlling the operation of the stored information through the user interface.

Preferably, system further comprises means for displaying information, preferably visual, relevant to the status of the stored information, such as whether or not the information has been viewed by the user, and/or whether or not the user has elected to keep or delete stored information, and/or viewing duration of stored information, and/or the progress of viewed information.

Various systems and methods in which the invention is embodied will now be described by way of example only and with reference to the accompanying drawings, in which.

The retrospective electronic program guide in which the invention in a first aspect is embodied allows a viewer to see listings for programs that were broadcast in the past. It additionally links past broadcasts to future repeats of the past broadcast, thereby enabling viewers to easily identify when a repeat of a missed program is to be broadcast. It will be appreciated that the invention could be applied to television or radio systems. For the sake of clarity, however, the specific embodiment is described with reference to a television system.

Figure 1:
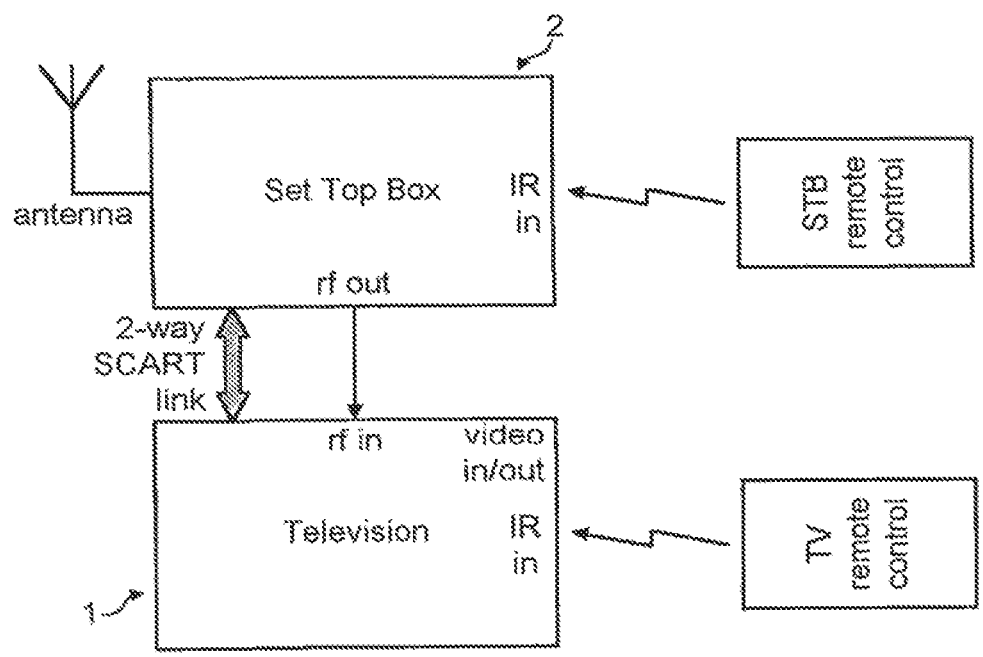
FIG. 1 is a block diagram of a television system.

FIG. 1 shows a television 1 that is operable to communicate with a set top box 2 via a RF link and a SCART cable. Each of the television 1 and the set top box 2 is controllable by its own dedicated remote control. The television 1 may also, optionally, be connected to a video recorder. In order to provide an EPG, a processor is provided. This can be located in either of the set top box 2 or in the television 1 itself.

Figure 2:
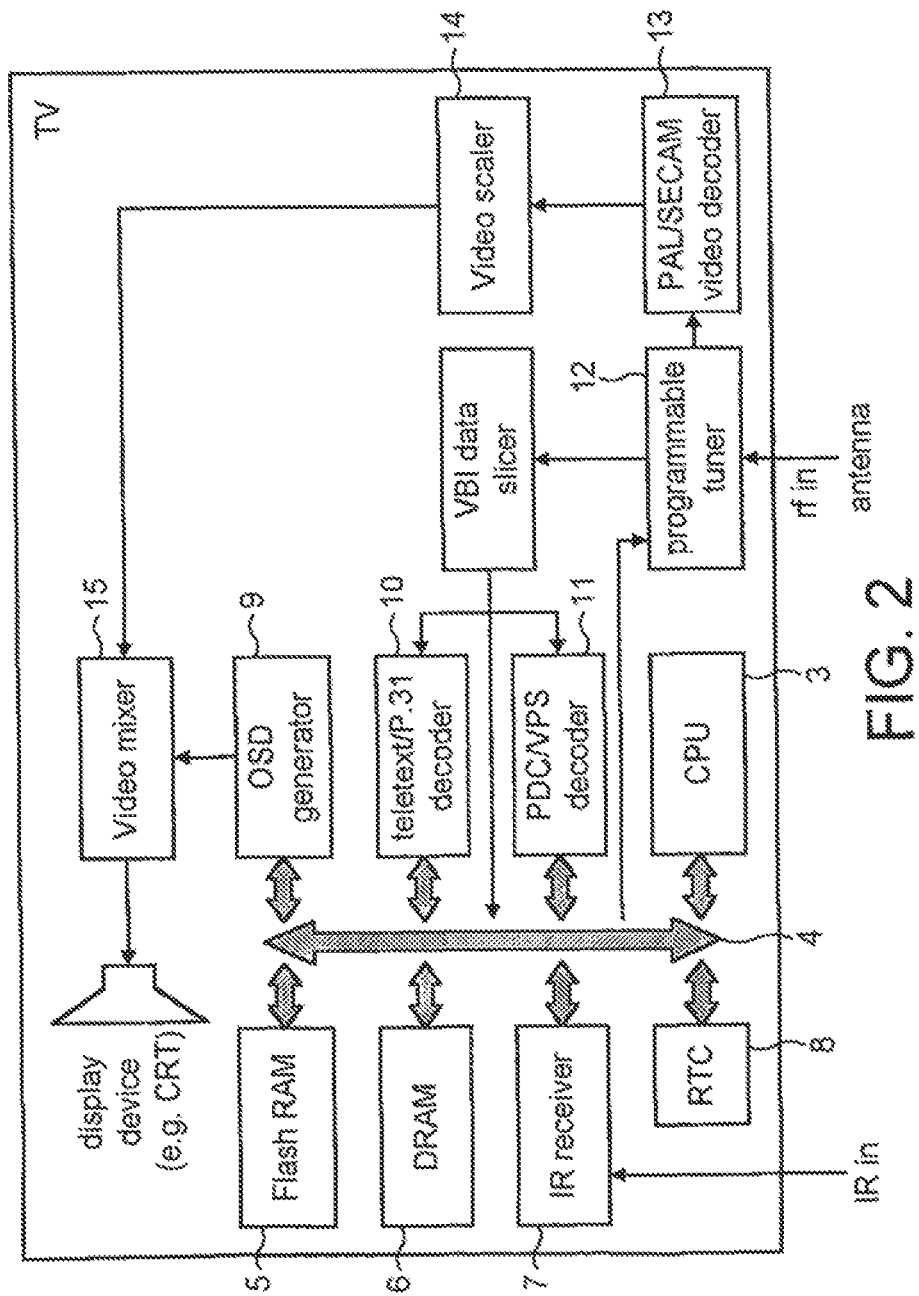
FIG. 2 is a block diagram of a television that is adapted to provide a retrospective EPG.

FIG. 2 shows an example of a television that is adapted to implement a retrospective EPG. This includes a CPU 3 that is connected to a data bus 4 and able to communicate with a flash RAM 5, a DRAM 6, an IR receiver 7 for receiving user selections from the television remote control, a real time clock 8 (RTC), an on-screen display generator 9 for generating the EPG, a teletext or P3.1 decoder 10, a PDC/WS decoder 11 and a programmable tuner 12. Software for generating the electronic program guide is stored in the DRAM 6 and television listings data is stored in either of the flash RAM 5 or the DRAM 6. The CPU 3 uses the EPG software and the listings data to generate and send signals to the on-screen display generator 9, thereby to cause the EPG to be displayed on screen. Typically, this is done in response to a user command which is received at the IR receiver 7.

Connected to the programmable tuner 12 is a PAL/SECAM video decoder 13, which is in turn connected to a video scaler 14 that feeds signals to a video mixer 15. Also connected to the video mixer 15 is the on-screen generator 9, so that EPG and other such data can be mixed with the video signal for display on the television screen.

Figure 3:
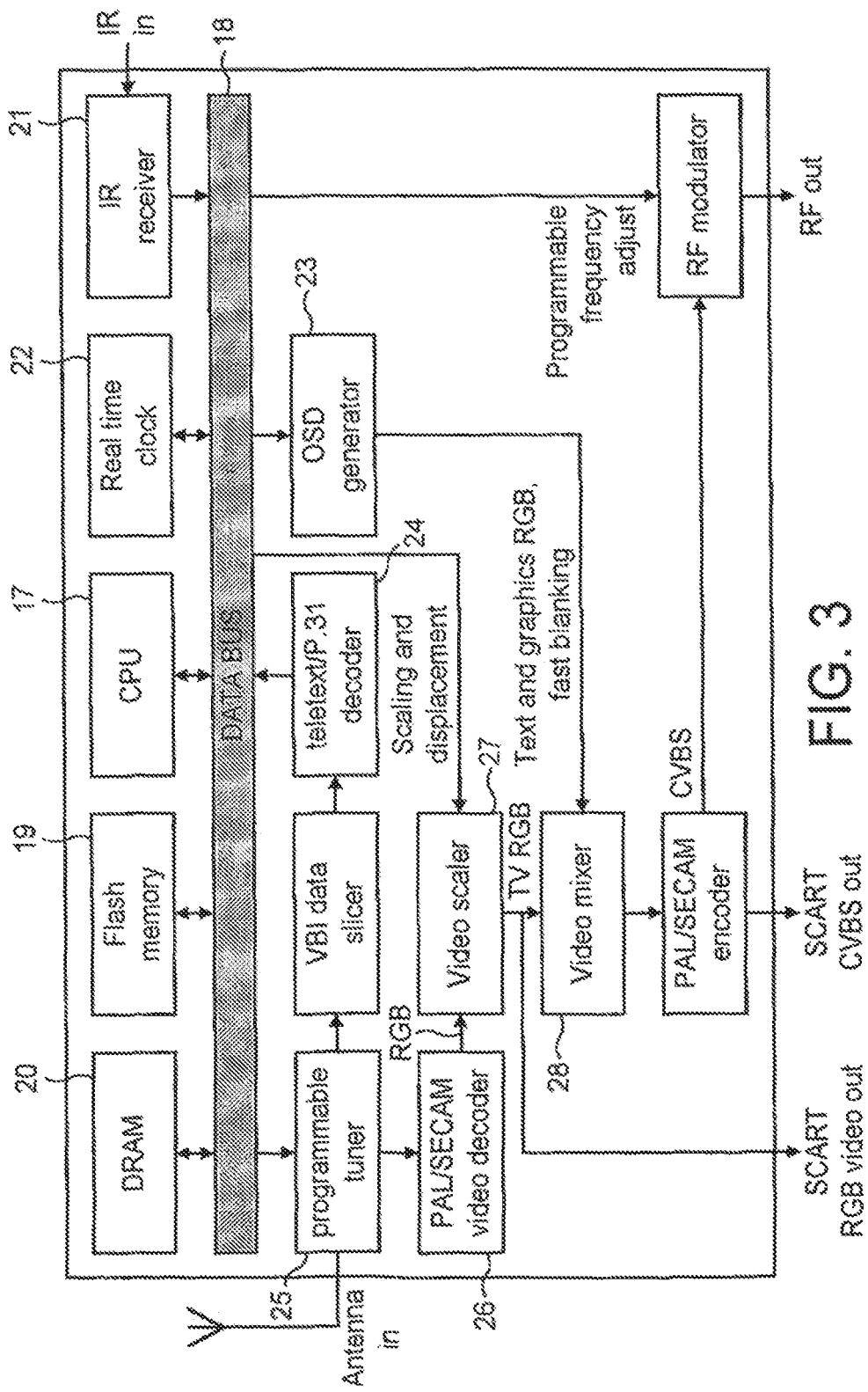
FIG. 3 is a block diagram of a set top box that is adapted to provide a retrospective EPG.

FIG. 3 shows an example of a set top box that is adapted to implement a retrospective EPG. As described above for the television of FIG. 2, the set top box of FIG. 3 includes a CPU 17 that is connected to a data bus 18 and able to communicate with a flash RAM 19, a DRAM 20, an IR, receiver 21 for receiving user selections from the set top box remote, a real time clock (RTC) 22, an on-screen display generator 23 for generating the EPG, a teletext or P3.1 decoder 24 and a programmable tuner 25. As before, software for generating the electronic program guide is typically stored in the DRAM 20 and television listings data is stored in either the flash RAM 19 or DRAM 20. The CPU 17 uses the software and the listings data to generate and send signal to the on-screen display generator 23, thereby to cause the EPG to be displayed on screen. Typically, this is done in response to a user command which is received at the IR receiver 21.

Connected to the programmable tuner 25 is a PAL/SECAM video decoder 26, which is in turn connected to a video scaler 27 that feeds signals to a video mixer 28. Also connected to the mixer 28 is the on-screen display generator 23. The EPG is displayed by generating a video signal using the OSD 23 and combining it with the TV video signal before re-encoding and modulating to give an RF output or, alternatively/additionally, outputting directly in RGB or CVBS form to the TV via a SCART connector.

Television listings data for the EPG is typically downloaded in the vertical blanking interval (VBI) of a pre-determined channel and stored within the EPG system in the Flash RAM 5, 19 in advance of a user's interaction within the EPG System. This is the so called "cache" method. Alternatively, listings data may be broadcast repetitively, again-typically in the VBI of a pre-determined channel, and downloaded to the EPG system during interaction with the user. This is the so called "carousel" method. In either case, the CPU 3, 18 of FIGS. 2 and 3 is operable to execute a firmware program within memory that causes it to power up from standby when triggered by the real time clock 8, 22 or by a user selection.

After power up, the CPU 3, 18 causes the programmable television tuner to tune the television channel carrying the EPG listings data and receive the downloaded television listings. During the download period, the VBI portion of the video signal for each line in each video raster is converted to a bit stream by the VBI data slicer and further decoded to extract the service data. In the embodiment described this is performed by decoding according to the WST Packet 31 IDL-A and IDL-B data formats. After decoding, this data is stored in DRAM and/or Flash memory and selectively processed as described earlier.

Figure 4:
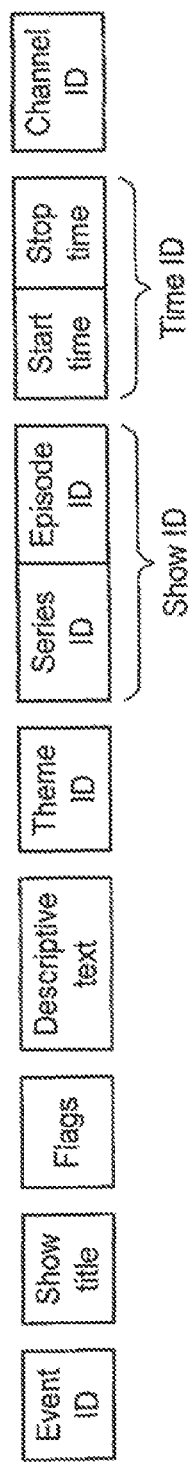
FIG. 4 is an example of a program listing datum.

Each program listing datum that is downloaded typically includes the following:
- an event ID, which is indicative of a unique broadcast event (e.g. live coverage of a sports event);
- a title ID, which is indicative of the show title;
- flags that are indicative of the broadcast format, e.g. PAL/stereo etc;
- a descriptive/narrative text that describes the program;
- a theme ID, which identifies the theme of the program, e.g. sports or film or soap opera etc;
- a show ID which includes a series ID and, where appropriate, an episode ID;
- a time ID, which includes start and stop times for the program;
- a channel ID that is indicative of the channel of the program;

An example of a listing datum is shown in FIG. 4.

In prior art systems, television listings associated with past broadcasts are not downloaded or are deleted from memory as soon as the television broadcast is finished. In order to implement a retrospective guide, however, it is important that the EPG has access to data on past broadcasts. In order to ensure this, in the case of the cache method, each listing datum is retrospective for a pre-determined retention period after the program is broadcast, before it is erased. In this case, retrospective data is identified by comparing the start and stop times in the listing datum with the time indicated by the real time clock or by receiving a real time signal. For the carousel method, broadcast of each program's listing continues for the retention period after the program itself has been broadcast. Listings that refer to such previously broadcast programs are referred to hereafter as "retrospective" listings. Listings that relate to programs to be broadcast in the future are referred to as "future" listings. In this way, television listing information for past programs is made available to the user for a pre-determined time after the programs are finished.

Figure 5:
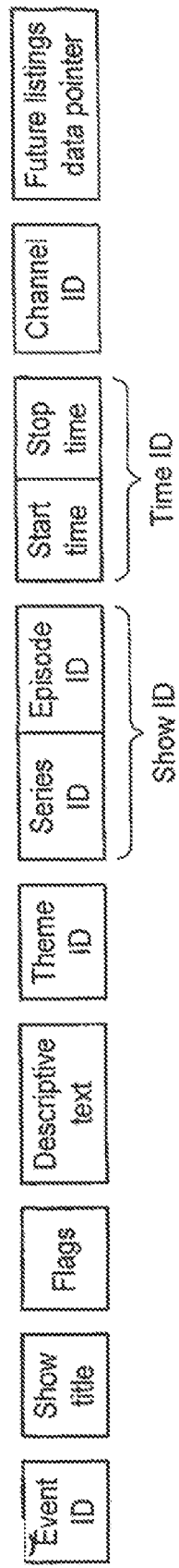
FIG. 5 shows the program listing datum of FIG. 4, including a pointer to a future television program.

Upon completion of a cache download of the listings data, the CPU 3, 18 scans through each program identifier belonging to the retrospective listing data to determine whether a match exists with the identifiers belonging to the future listings data. Each retrospective listing datum where a match is found is tagged with a non-null numerical data pointer to the future listing, for example the program identifier shown in FIG. 5, which uniquely points to a single item of program content (e.g. "Citizen Kane") or series/episode combination ("New Avengers", episode 6). Otherwise, if a match is not found, the pointer is tagged with a null value. When the matching process is complete, unmatched retrospective listings data may optionally be erased to conserve memory.

A similar process occurs for the case of carousel downloading. In this case, some or all of the broadcast retrospective listings data are downloaded. The CPU 3, 18 then scans through each program identifier belonging to the retrospective listing data to determine whether a match exists with the identifiers belonging to the future listings data. This occurs in real time as the future listings data is being received. Again, each matched retrospective listing datum is tagged with a non-null numerical data pointer to a future listing.

Once the appropriate retrospective and future listings data is received, the CPU 3, 18 can construct the retrospective EPG in response to a user selection of the guide. The preferred method of display is as an array or grid of irregular cells 30, where each cell denotes a retrospective or a future listing whose length along one dimension represents a program's duration. This is shown in FIG. 6.

Figure 6:
FIG. 6 is an example of a retrospective EPG that is in a grid format.

Each cell 30 of the EPG of FIG. 6 is marked with the program's title. The EPG is responsive to commands which are typically received from a remote control, associated with either of the set top box or the television. A user presses up, down, left or right cursor keys on a remote control unit to switch focus backwards or forwards between cells in time in one dimension (vertical columns or horizontal rows of cells) and, optionally, through channels in another dimension (horizontal rows of cells or vertical columns respectively). The cell under focus is differentiated in colour, shading or style from unfocussed cells. A portion of the descriptive and/or narrative information of the listings information, that corresponds to the program denoted by the cell under focus, is displayed in a second area that does not overlap the grid of cells, for example at the top of the guide as shown in FIG. 6.

The user may activate either a watch or record process for the program cell of focus. Systems for doing this are known and so will not be described herein in detail. In the present invention, however, watch or record functions can be activated for a past or a future program, by pressing a key on the remote control unit that corresponds to the respective function. In the case of past programs, the CPU identifies the datum listing for the selected past program and looks for the future listings data pointer, which points to the listing for the future program that corresponds to the selected retrospective listing. Once this future listing is identified, it is used to set up the function selected by the viewer. When a future program is selected, the listing associated with that program is itself used to set up the function selected by the user. In this way, on receipt of a user selection the CPU is operable to control the system to automatically set up the necessary hardware to carry out the requested function, regardless of whether the program selected is a past or future broadcast.

The EPG can be generated in such a manner as to allow users to scroll seemlessly between past and future programs, as shown in FIG. 6. Alternatively, the EPG may be adapted to present and future listings as a default setting and include an interactive "history" or "missed" button, which when selected causes the CPU to generate and cause the display of a dedicated past programs EPG. In either case, prior to presenting a program listing datum on screen, the EPG system determines whether its pointer to a future listing datum is non-null. If so, the cell is differentiated in appearance from cells which represent programs that are not definitely to be repeated (e.g. by displaying it in a different shade, colour, border etc.), thereby making past programs that are to be repeated, readily identifiable by viewers. The CPU causes a user selectable interactive hot-key button to be displayed that represents a watch and/or record function that is activated by the user pressing a corresponding key on a remote control unit.

When a user selects a watch or record function, the EPG system looks up the future listing datum that is pointed to by the retrospective listing pointer and marks it for recording by setting a logical data flag associated with it in non volatile memory for later access by the watch and/or record functions. Alternatively, the time and channel of the future program is committed to non-volatile memory. Optionally, cells may change appearance in order to signify that a watch/record function has been selected.

The system is additionally adapted to allow a user to select the watch and/or record function for retrospective listing cells whose programs are not definitely to be repeated. In this case, user selectable hot-key buttons representing watch and/or record functions are displayed to the screen also for these cells. Where the cell under focus is not definitely to be repeated, the CPU causes the retrospective listing's program identifier to be stored to non-volatile memory together with an identifier for the type of operation to be performed (e.g.

record, watch). Additionally, descriptive listings information (such as title, text description) may be stored alongside the identifier in order to enable a facility for users to review and cancel programs that they have set to record and/or watch. During each successive download of future listings data, the EPG system compares the stored retrospective listing's program identifier with the downloaded information and attempts to find a match between that stored retrospective listing identifier and those of the future listings. If in time a suitable match is found, the function selected by the user is activated.

Figure 7:
FIG. 7 shows an example of an onscreen display that is presented when a viewer selects the search option in the EPG of FIG. 6.

In addition to accessing schedule information using the EPG of FIG. 6, the system is operable to allow a user to search for a program according to its theme (e.g. sports, movies). This is typically done by pressing keys on a remote control unit to focus on a cell that denotes a theme of interest. To enable this, the EPG of FIG. 6 includes an interactive "search" button, which when selected presents the user with various theme options that are available. As shown in FIG. 7, these may include movies, sport and children and additionally news, gardening cooking etc. When a user selection of one of the theme options is received by the CPU, a list of further more detailed options is presented. FIG. 7 shows an example of a list that is presented when the "sports" option is selected. In this case, the further selections that are available include:
   all
   football
   tennis
   motorsport
   boxing
   skiing.

Included in the interface of FIG. 7 is an interactive "missed" button, which when selected causes the CPU to search for and display programs meeting the selected theme criteria and which were broadcast in the past.

Figure 8:
FIG. 8 shows an example of an on-screen display that is presented when a viewer selects the "all" option in the on-screen display of FIG. 7.

Upon selecting a desired cell in the interface of FIG. 7, the EPG system displays another interface that has an array of further cells corresponding to programs that belong to the selected theme. For example, if the "all" option of FIG. 7 is selected, the CPU searches all of the retrospective and the future listings and presents a list of the programs identified, as shown in FIG. 8. A portion of the descriptive and/or narrative of the listings information, that corresponds to the program denoted by the cell under focus, is displayed in a second area that does not overlap the listings array. As before, to change focus between the cells the system is adapted to recognise commands from the remote control, which commands are generated by pressing the appropriate keys. In particular, the watch or record function for the program in focus can be selected by pressing a key on the remote control unit that corresponds to that function.

Figure 9:
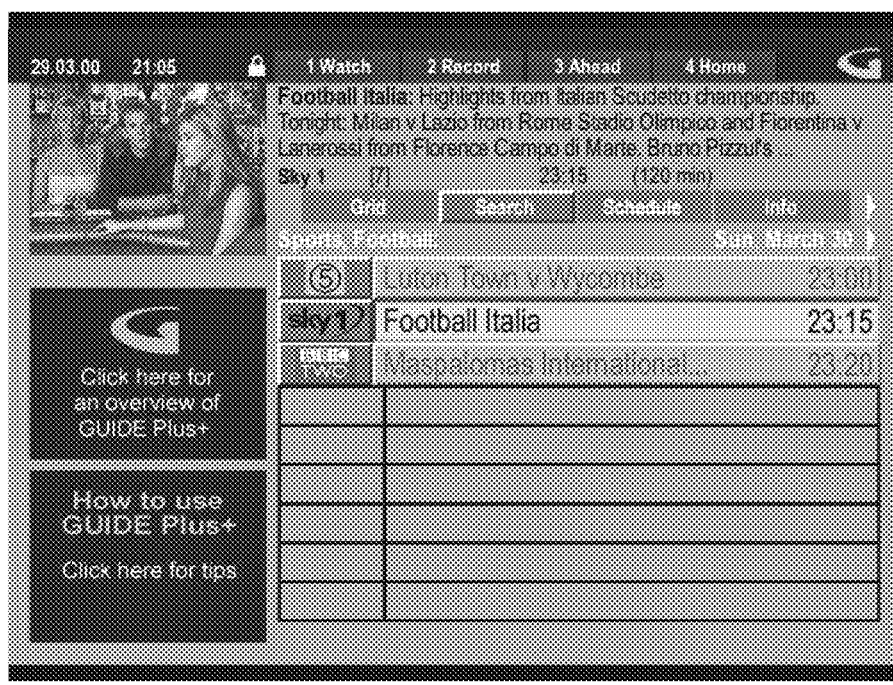
FIG. 9 shows an example of an on-screen display that is presented when a viewer selects the "football" option in the on-screen display of FIG. 7.
Figure 10:
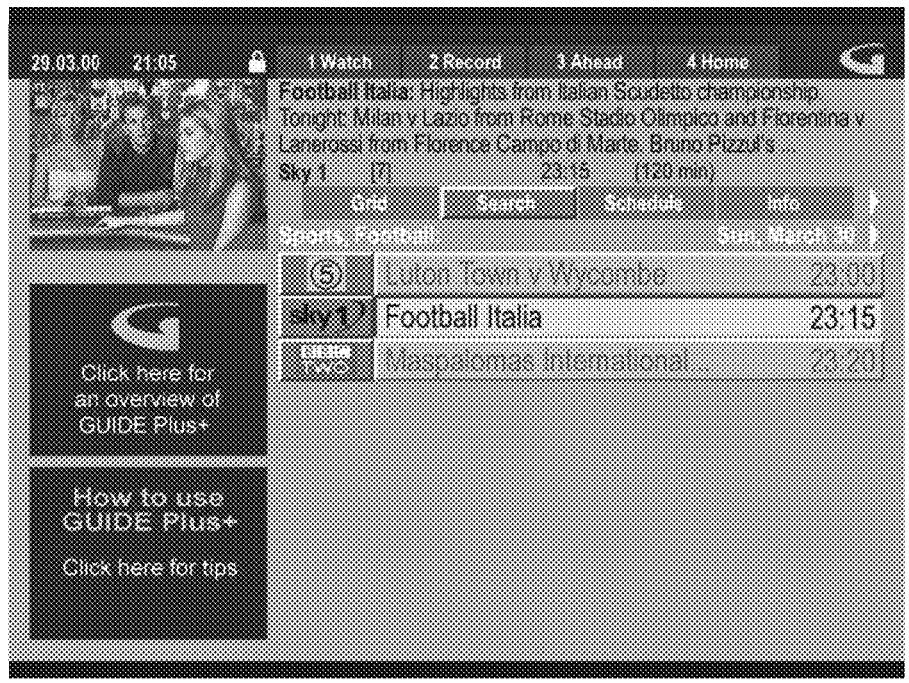
FIG. 10 shows an example of an on-screen display that is presented when a viewer selects the "missed" option in the EPG of FIG. 9.

As another example, if the "football" option of FIG. 7 is selected, the CPU searches all of the retrospective and the future listings and presents a list of the programs identified, as shown in FIG. 9. If the "missed" button is then selected, the CPU searches the listings presented to identify and cause the display of those that correspond to retrospective listings information. An example of this is shown in FIG. 10. As before, programs that are to be repeated in the future are highlighted, e.g. "Football Italia" in FIG. 10, so that if desired, the user can select that future repeat for watching or recording. This is done by moving the cursor onto the desired program and selecting the "schedule" option. It should be noted, however, that the only program that is definitely to be repeated in the EPG of FIG. 10 is "Football Italia".

Figure 11:
FIG. 11 shows an on-screen display that is presented when a viewer selects the "schedule" option in the EPG of FIG. 10.

When the desired program is highlighted and the schedule option selected, the screen shown in FIG. 11 is presented to the viewer. The viewer is then given the option of either selecting the program for watching or recording. If the viewer selects "record", the CPU automatically sets up the system to record the selected program. If the viewer selects "watch", the CPU automatically sets up the system to generate an icon for presenting to the viewer prior to broadcast of the selected program, thereby to alert the viewer the imminent broadcast of the program. Alternatively, the system could be adapted to automatically cause the television to tune to the selected program at the time of broadcast.

By providing a retrospective EPG, the user has the option of identifying programs that they missed for possible future viewing or recording on another occasion. This enhances the functionality of the EPG and provides the user with an easy way of selecting and viewing desired programs. This is advantageous.

Embodiments of the electronic program (EPGs) embodying the invention are responsive to commands that may be received from a remote control associated with the television or set-top box (STB). A preferred EPG shows a display comprising a plurality of labelled cells, some of which are "interactive" in the sense that a user may initiate "actions" associated with them. Only one of said cells, the "focussed" cell, is interactive at a given time. The focussed, interactive cell is differentiated from the other interactive cells by means of rendering it differently in some visual way, e.g. by giving it a different colour font or background, or some combination of these and other methods. A user may choose which interactive cell to place in focus by "navigating" to it by pressing up, down, left and right on a remote control unit.

Keys may be pressed directly on the remote control to perform actions relevant to the focused cell, and include four "hot" keys coloured red, green, blue and yellow whose action labels are displayed inset within their on-screen graphical key representations on an action menu.

Figure 12:
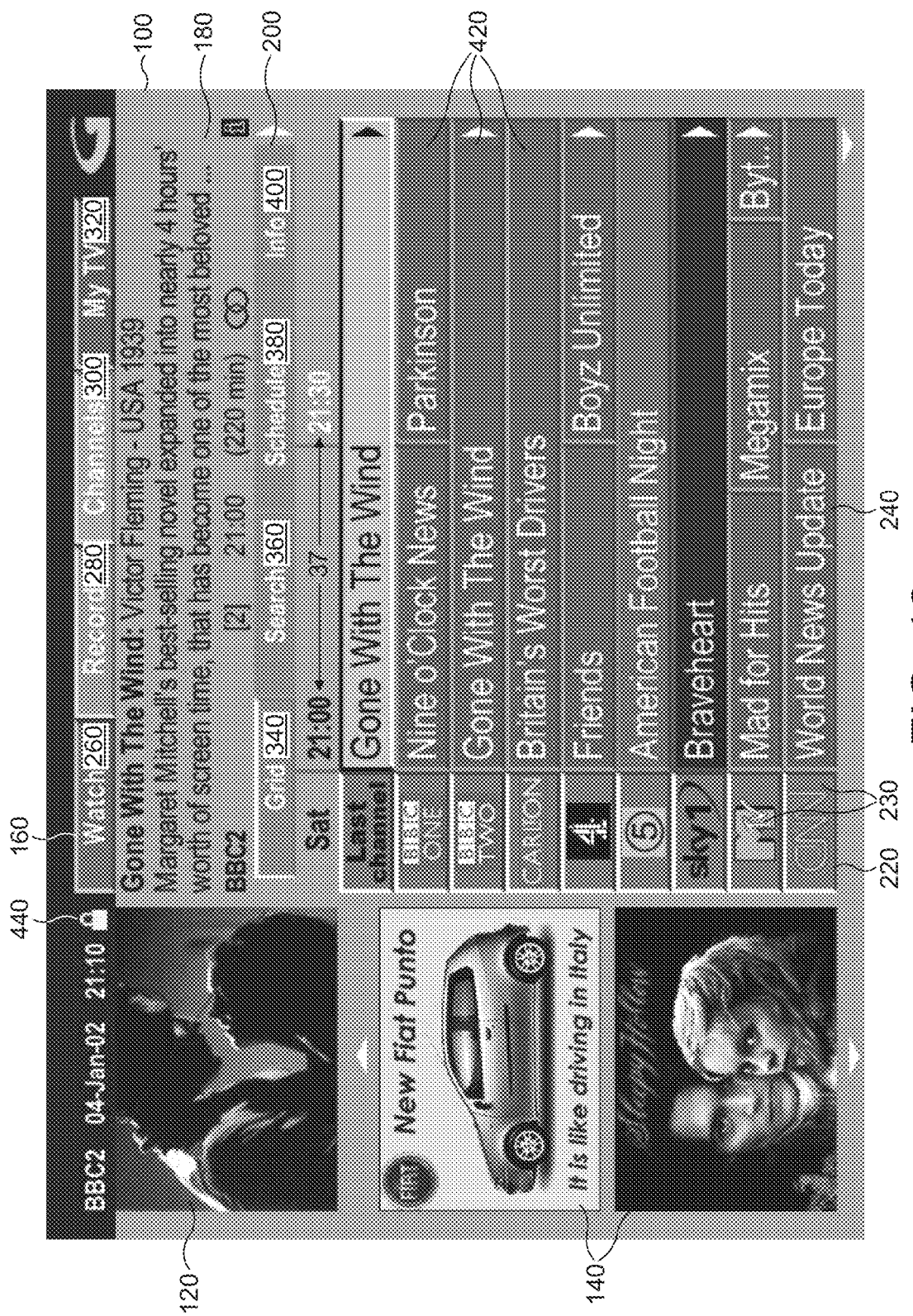
FIG. 12 is an example of an on-screen display presented when viewing the home page of an EPG embodying a further aspect of the invention where the "Telecast" mode is selected.

FIG. 12 shows an example of an on-screen display that is presented as the first "home" page 100 of an electronic program guide (EPG) embodying a further aspect of the invention when an EPG key on a user's television remote control is pressed. This displays the EPG in "Telecast" mode where telecast television programs are plotted as program title labelled cells against scheduled time and telecast channel.

The home page 100 includes a "picture-in-graphic" box 120, one or more advertisement panels 140, an action menu 160 comprising a plurality of action labels, an information panel 180, a menu bar 200, a channel panel 220 consisting of channel icon cells 230 and a program title grid 240.

The actions available through the action menu 160 on the home page 100 comprise a "watch" option 260, a "record" option 280, a "channels" option 300 and a "My TV" option 320. The action menu 160 may be located at the top of the page spaced horizontally across the display. The information panel 180 may be located below the action menu 160 on the display and may display textual information pertinent to the focused cell. This textual information contains program notes (e.g. synopsis, mono, telecast channel, duration) where the focused cell corresponds to a program. Otherwise it corresponds to descriptive, explanatory text (typically termed "context help") to assist usage of features associated with the focused cell.

The menu bar 200 may be located below the information panel 180 and is coloured blue or otherwise rendered in a distinctive style to denote that it is associated with the EPG "Telecast" operating mode. The menu bar comprises a row of cells denoting sub-operating modes: "Grid" 340, "Search" 360, "Schedule" 380 and "Info" 400. The "program title" grid 240 comprises an array of cells 420, each cell carrying a different program title. The cells 420 may be of varying horizontal lengths, the length of each cell 420 denoting the duration of the program whose title is displayed in the cell. Each row of cells is allocated to a different channel. Different categories of programs such as sports and movies may be colour coded to assist the user in immediate identification of different program types. Highlighting a particular program title cell 420 results in the information panel 180 displaying program notes concerning the highlighted program and may include a portion of the listings information corresponding to the selected program cell, as shown in FIG. 12.

The channel panel 220 comprises a vertical column of single channel cells 230, each cell 230 denoting a telecast channel and carrying either a channel logo or an alphanumeric call-sign as a means of identification. Horizontally adjacent each channel cell are the program cells 42Q carrying the program title of each program scheduled to be telecast on that channel at a particular time. In a position above the program title grid 240, there is an indication of the day of the week and the time of day given in half hour indications 370 enabling the user to identify the start and finish times of particular programs. An indication of the precise date and current time may also be displayed on screen.

The picture-in-graphic box 120 displays the program currently being telecast on the channel corresponding to the row in which a program cell is in focus, allowing the user to surf channels and simultaneously consult the EPG. Additionally, the channel to which the user is tuned may be fixed to a particular channel by selecting a "lock" action when the desired channel's cell 230 is in focus, as indicated on-screen by a padlock icon 440.

The advertisement panels 140 may contain access (for example, links) to further information regarding the subject matter being advertised, and which may be obtained in different ways by focussing upon them and actioning them in various advertisement specific ways using the keys corresponding to the actions or the "select" key.

The home page 100 includes the currently tuned channel and displays programs starting from the current time. A user may press a right or left cursor key on the remote control to scroll the display of programs to be telecast ahead or back in time, and press the up or down cursor keys to scroll the display up or down within a list of telecast channels.

Figure 13:
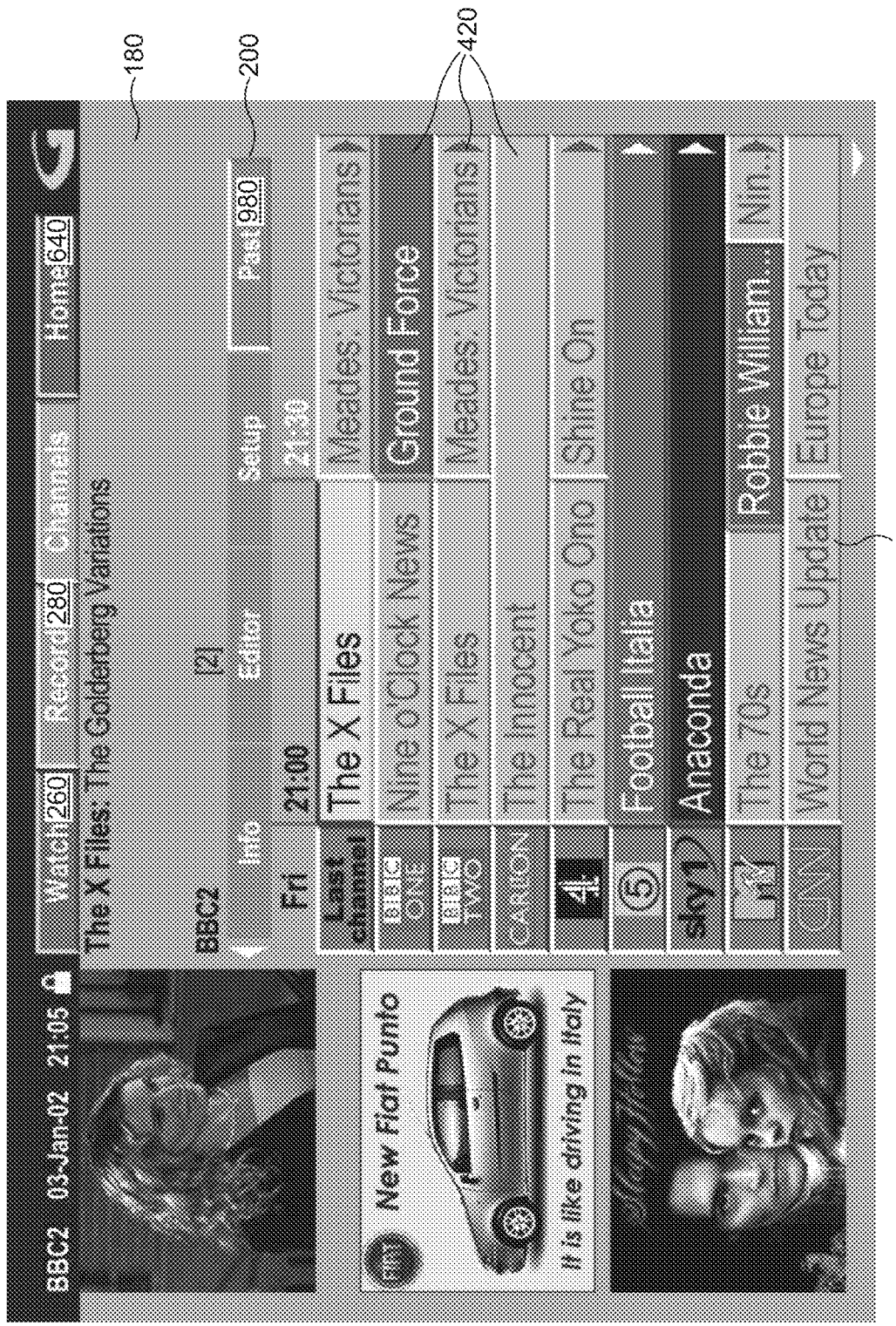
FIGS. 13 and 13a are examples of an on-screen display of the EPG in FIG. 12 in "Telecast" mode with the "Past" sub-mode selected with one of a list of program titles in focus.
Figure 13A:
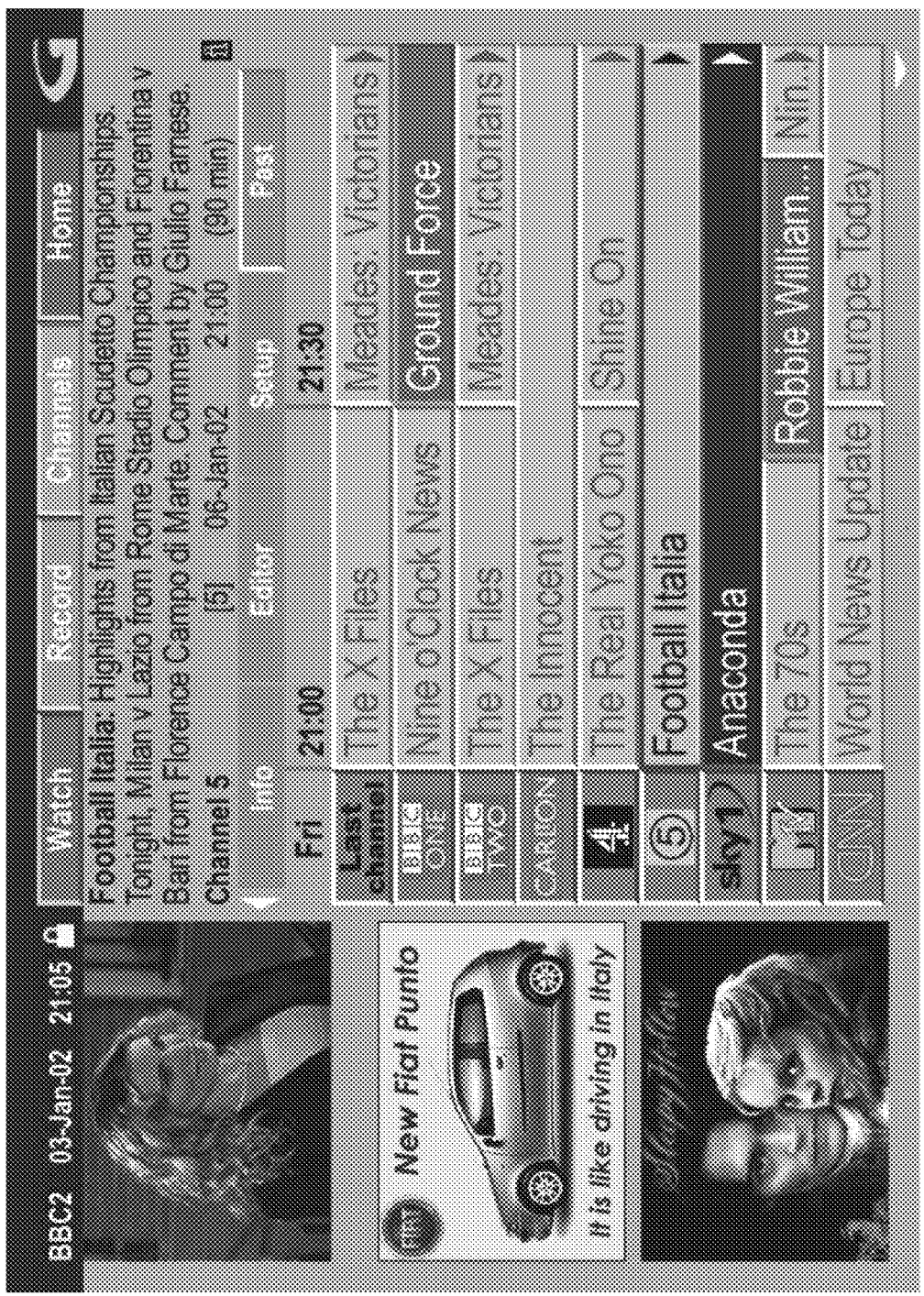
Figure 13B:
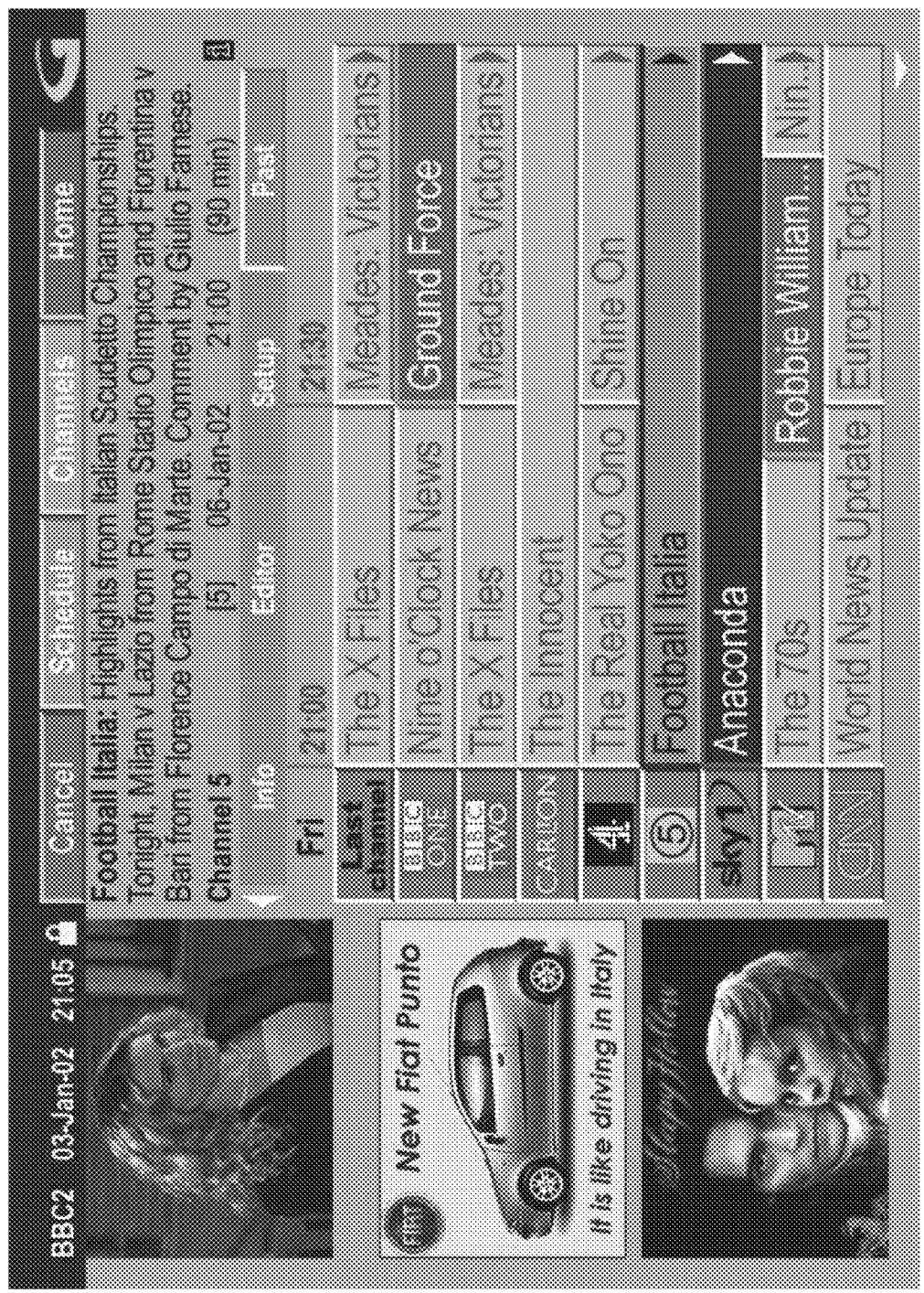
FIG. 13b is an example of an on-screen display of the EPG in FIG. 12 in "Telecast" mode with the "Past" sub-mode with one of a list of program titles in focus that changed the colour due to a scheduled recording.

In a further preferred embodiment, an additional sub-mode feature to the "Telecast" mode is provided whereby it is possible to program future recording of programs which the user may have missed previously. As shown in FIG. 13, the above function is achieved by selecting the "Past" option 440 on the menu bar 200. The information displayed on screen changes to that which would have been displayed 24 hours previously. A grid of cells 240 denoting program titles 420 is displayed, the horizontal length of which denotes the duration of the program concerned. Cells that match future repeats of the same program stored within the EPG schedule memory (that, typically, contain details of program schedules for up to two weeks into the future) may be shown in their regular program category coded colour, whereas cells corresponding to programs which are not repeated in schedule memory may be shown in grey with the font in the colour of its program category, as shown in FIG. 13. Highlighting a particular program cell 420 causes the corresponding program note to be displayed in the information panel 180 and the user is provided with the option of setting a future recording of or a reminder to watch (the "Watch" action) a selected program. Once the "Watch" 260 or "Record" 280 action has been selected, the focused program cell is rendered in a different colour, shade or style to enable the user to see at a glance which programs have been so actioned, as shown in FIGS. 13a, 13b. If a program is not scheduled to be repeated, it is possible for the user to program the system to record the desired program, should the program ever be repeated in the future.

In a preferred embodiment of the present invention, the recorded program may be stored to, for example, Flash memory, or DRAM, or a bulk non-volatile store such as a hard disk or optical storage device.

Figure 14:
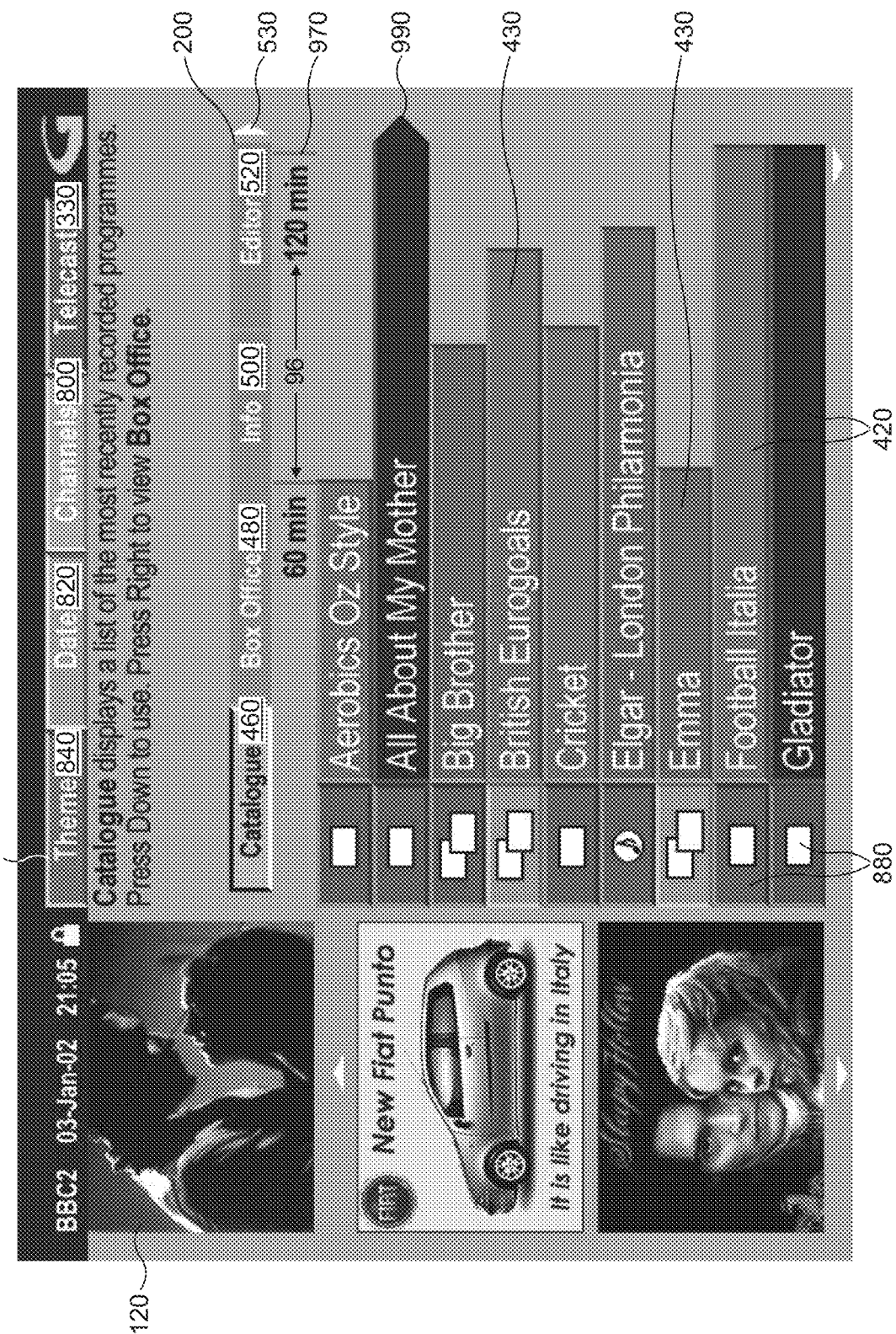
FIG. 14 is an example of an on-screen display of the EPG of FIG. 12 in "My TV" mode with the "Catalogue" sub-mode selected.

In a further preferred embodiment, the EPG may be switched from the "Telecast" mode shown in FIG. 12 to a "My TV" mode as shown in FIG. 14. This is achieved by pressing the key on the remote control corresponding to the "My TV" action 320 or, alternatively, by pressing a fixed key on the remote control that is labelled for the purpose.

Figure 14A:
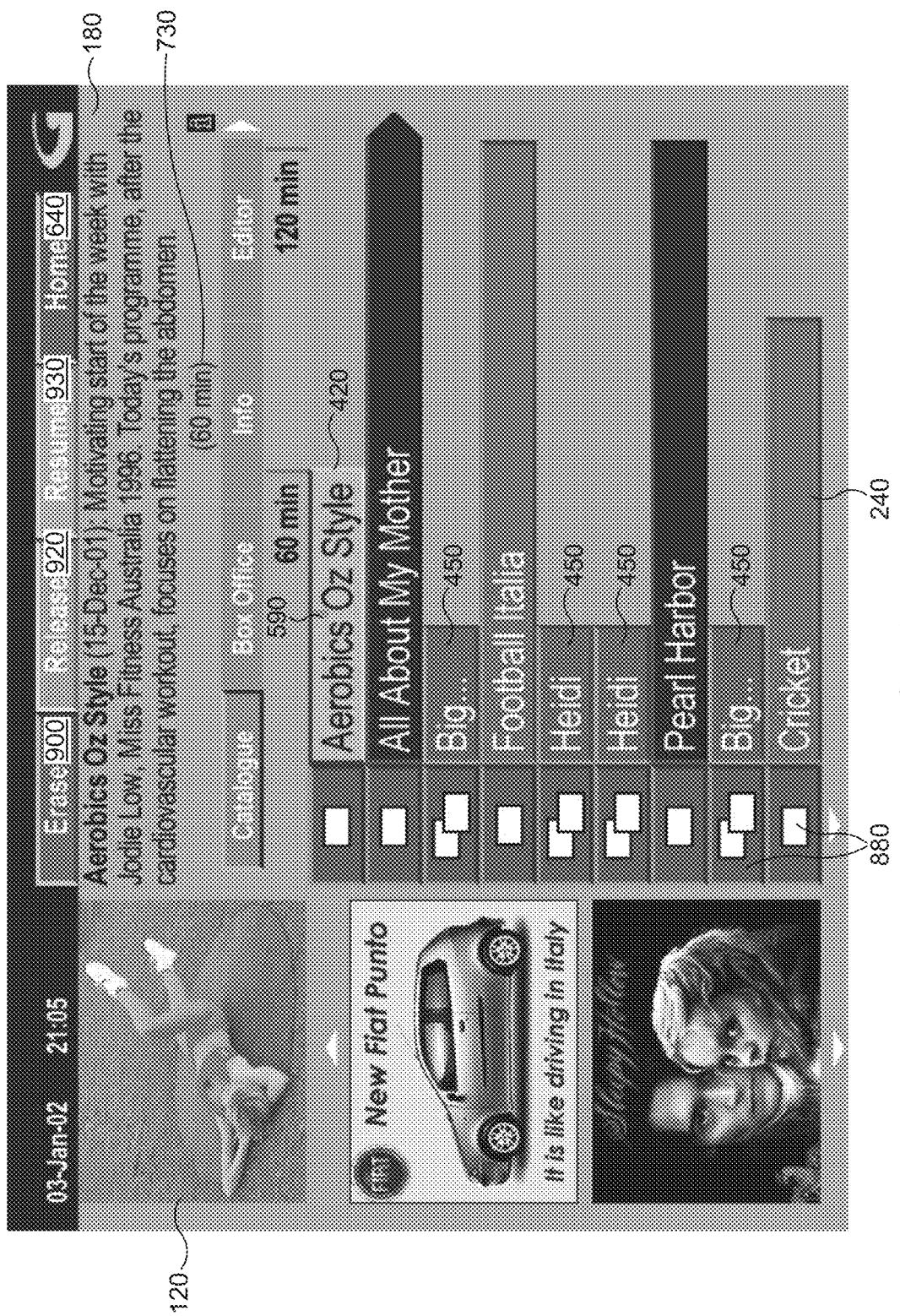
FIG. 14a is an example of an on-screen display of the EPG of FIG. 12 in "My TV" mode and "Catalogue" sub-mode with one of a list of program titles in focus.

It is possible to return to the on-screen display of the "My TV" mode home page at any time during use of the EPG in "My TV" mode by selecting the "Home" action 640, as shown in FIG. 14a et sec. Whilst on the respective home page, display of the "Home" label is replaced by display of the "Telecast" 330 or "My TV" 320 actions to switch between the EPG's two operating modes "My TV" and "Telecast" respectively.

In "My TV" mode, the home page displayed on screen shows a different colour (red) menu bar 200 from that displayed in the "Telecast" mode. The menu bar 200 displays the following "My TV"'s submodes: "Catalogue" 460, "Box Office" 480, "Info" 500, and "Editor" 520. Further "My TV" sub-modes may be viewed by using the right and left cursor keys on the remote control to scroll along the menu bar 200 and thereby reveal further sub-modes. On screen arrows 530 indicate whether there are further options available to be accessed by scrolling right or left respectively.

At any time, only one of the sub-modes denoted on the menu bar may be active. The user activates a particular sub-mode by moving focus to a cell on the menu bar 200 that corresponds to a desired sub-mode and then switches focus away from the cell in a downward direction. While no longer in focus, the cell corresponding to the active sub-mode remains displayed differently to other sub-mode cells to denote the sub-mode the EPG is in.

Highlighting the "Catalogue" cell 460, as shown in FIG. 14, causes a block of program title cells 420 and/or program series title cells 430 to be displayed on screen corresponding to those programs or program episodes of a series which have been recorded, and stored, for example, to flash memory, DRAM, or bulk non-volatile storage such as a hard disk or optical storage device.

The program and series title cells are presented together in alphabetical order. Programs and series are distinguished on-screen via their status icon 880 according to whether they have "kept" or "unkept" status. Programs or program episodes within series that are marked "unkept" are automatically deleted in cases where, the unused storage space (for example disk space) is insufficient to make a new recording. In such cases, the oldest unkept program (i.e. which was recorded first) is deleted. The horizontal cell lengths of the program cells 420 represent the durations of the programs concerned. This is useful to give users a quick at-a-glance appreciation for the duration of programs. Moreover such methods of representation must accommodate all permutations of short and long program durations displayed at the same time. For example, simultaneous display to scale of a cell depicting a 5 minute news bulletin may be impractical alongside a cell depicting, say, a 6 hour rock conceit because the horizontal scale of the news bulletin cell may be too small to accommodate the width of its title.

In a preferred embodiment, the scaling of the horizontal time axis is partially adaptive to the displayed program with the longest duration. Two sets of time marker and tick 960 located above the program cells label the mid and end duration axis points. In cases where the longest displayed program duration equals or exceeds an upper threshold duration (preferably 2 hours), the end axis duration label 970 is marked with the upper threshold duration and all program cell widths are represented accordingly. Cells whose durations exceed the upper threshold duration are displayed as "cut-off", where their right edges are depicted to show that their true duration spills beyond the upper threshold tick, as illustrated by reference numeral 990 in FIG. 14. In cases where the longest displayed program duration is less than a lower threshold duration (preferably 1 hour), the end axis duration label is marked with the lower threshold duration and all program cell widths are represented accordingly (not shown).

A viewer's progress into playing a partially viewed program may be shown graphically by rendering the played segment of the program cell bar 420 in a different colour, shade or style compared to the un-played segment. Or, alternatively, the boundaries between played and un-played segments may be marked with a line, tick or some other symbol (not shown).

The program title cells 420 and series title cells 430 may be colour coded by theme category (such as sport, movies and children) to provide the user with an instant means of identifying the category to which a program or series relates. Highlighting a particular program title cell 420 causes the relevant program note to be displayed in the information panel 180, as shown in FIG. 14*a* where the focused cell title is "Aerobics Oz Style". The program note information displayed in "My TV" mode may include details 730 of if, and, if so, when the program is scheduled to be deleted and/or other information such as program labels like stereo, subtitles or black/white (FIGS. 14*a*, 14*c*, 14*d*, 14*e*, 14*f*, 16, 16*a*, 18*b*, 21*b*, 22*a*).

While a program title cell 420 or episode title cell 450 is in focus, still frames from the program's or episodes' video track are displayed in sequence to the picture-in-graphic window 120. The display of each frame persists for a short period or a second to a few seconds before it is replaced by the next in the sequence. Once the last frame in the sequence is played, the display rotates back to the first frame and so forth until the user moves focus away from the program or series cell. The frames may be snap-shots taken from the program or series episodes' video at regular intervals of a minute to 10 minutes, or they may be key frames selected by some other means. A moving marker or indicator tick 590 within a program title cell 420 or episode title cell 450 may show the time within the program to which the currently displayed frame relates, as shown in FIG. 14*a*.

The user may cause the program corresponding to the cell in focus to be played to the full screen by pressing the "OK" or "Play" key on the remote. Alternatively or additionally, an action label "Play" may be displayed in the action menu. Both the "pause" and "stop" keys on the remote causes playing of the program to stop and be displaced by the EPG display in "My TV" mode, "Catalogue" sub-mode, with the cell corresponding to the played program in focus. In the case where the Pause button was pressed, a "Resume" action 930 may be displayed to allow the user to resume viewing. This is useful to the user because it immediately causes display of information that is likely to be most pertinent to another play selection. Other keys or key combinations for the actions "Reverse", "Fast Reverse", "Forward" and "Fast Forward" may be included on the handset and may be operable both on a program played back in full screen video and on a program displayed in picture-in-graphic mode, corresponding to the program title cell 420 or episode title cell 450 in focus, using the EPG "My TV", "Catalogue" sub-mode.

Figure 14B:
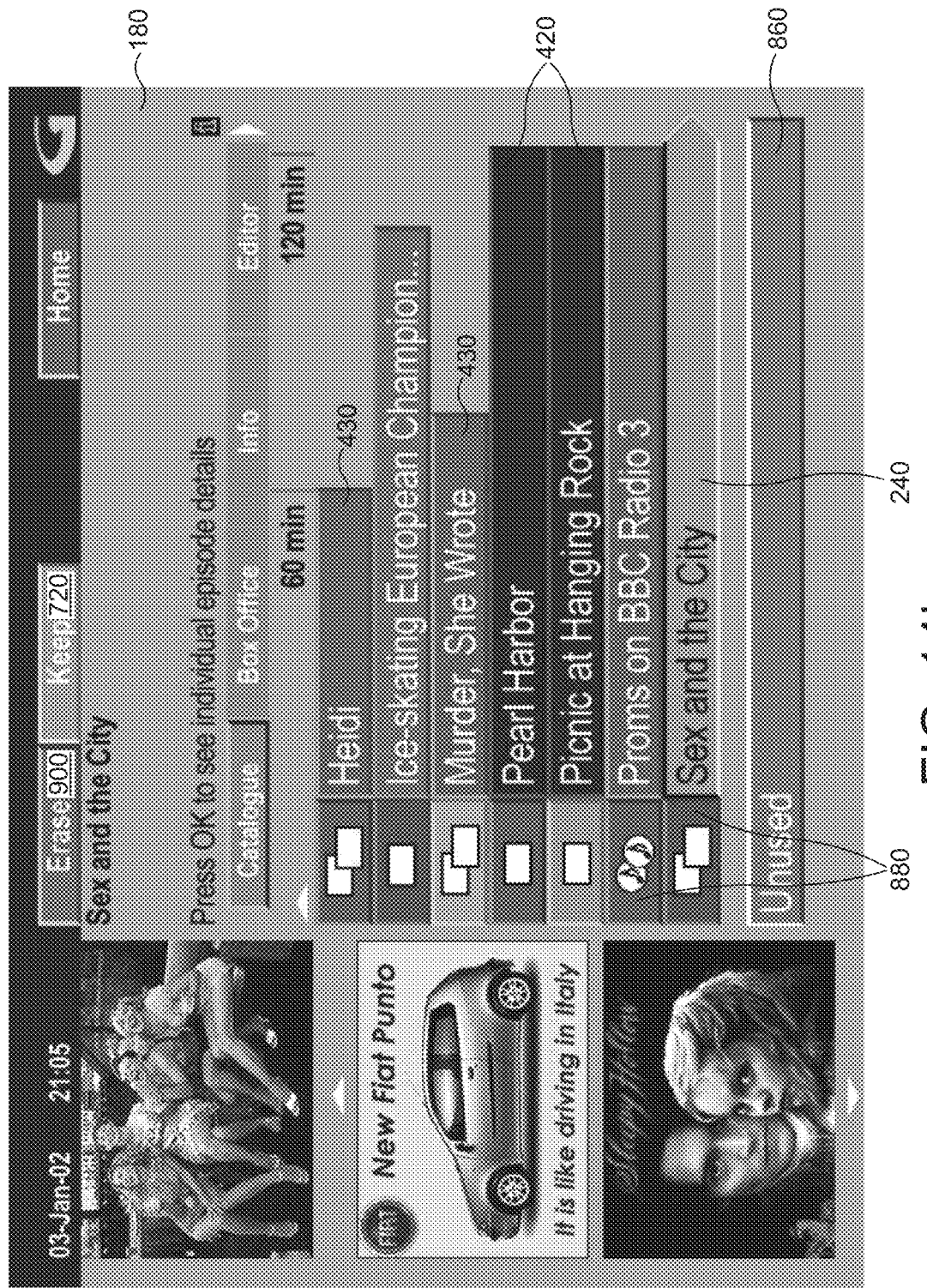
FIG. 14b is an example of an on-screen display of the EPG of FIG. 12 in "My TV" mode and "Catalogue" sub-mode with one of a list of series titles in focus.
Figure 14C:
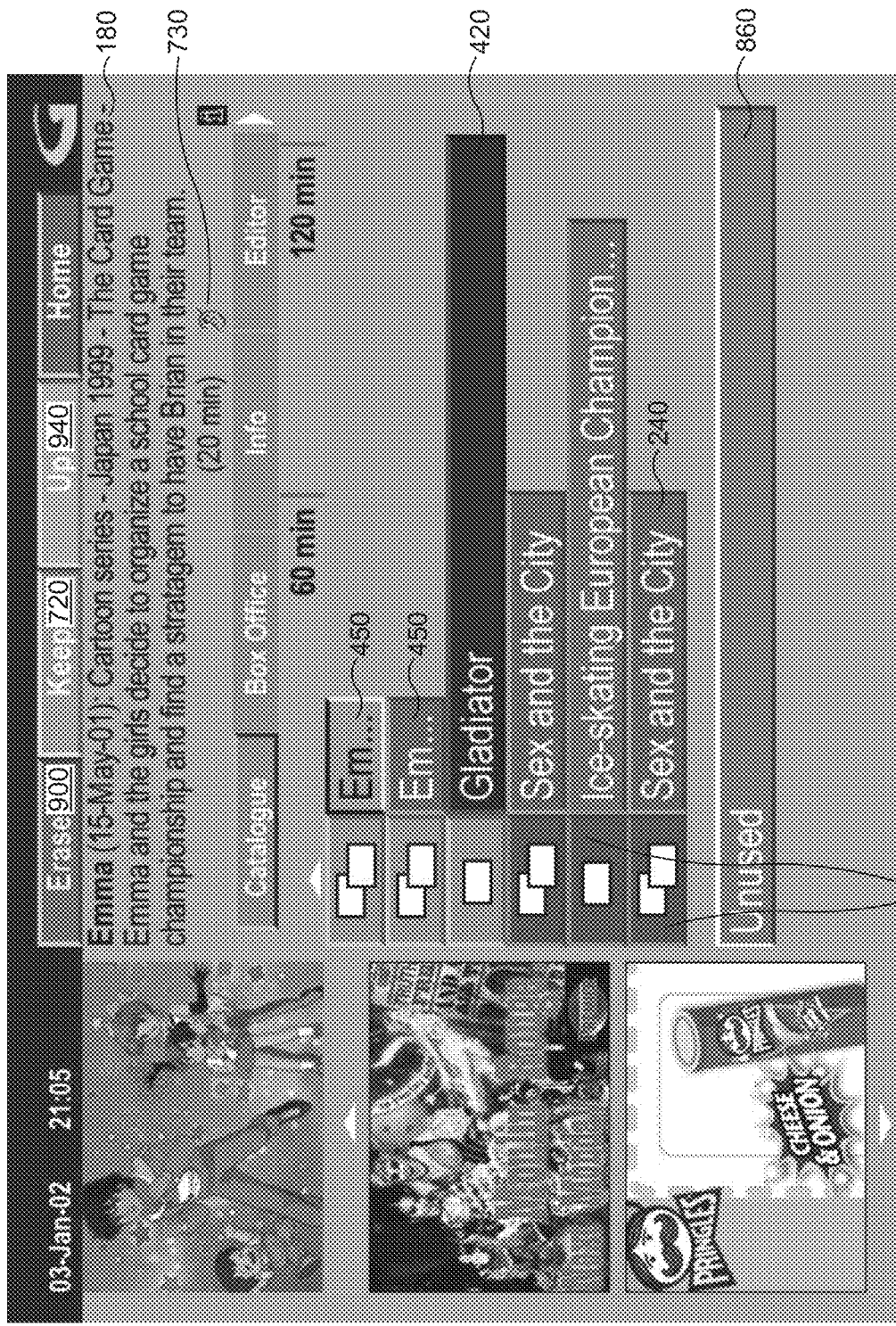
FIG. 14c is an example of an on-screen display of the EPG of FIG. 12 in "My TV" mode and "Catalogue" sub-mode with one of a list of episodes titles in focus.
Figure 14D:
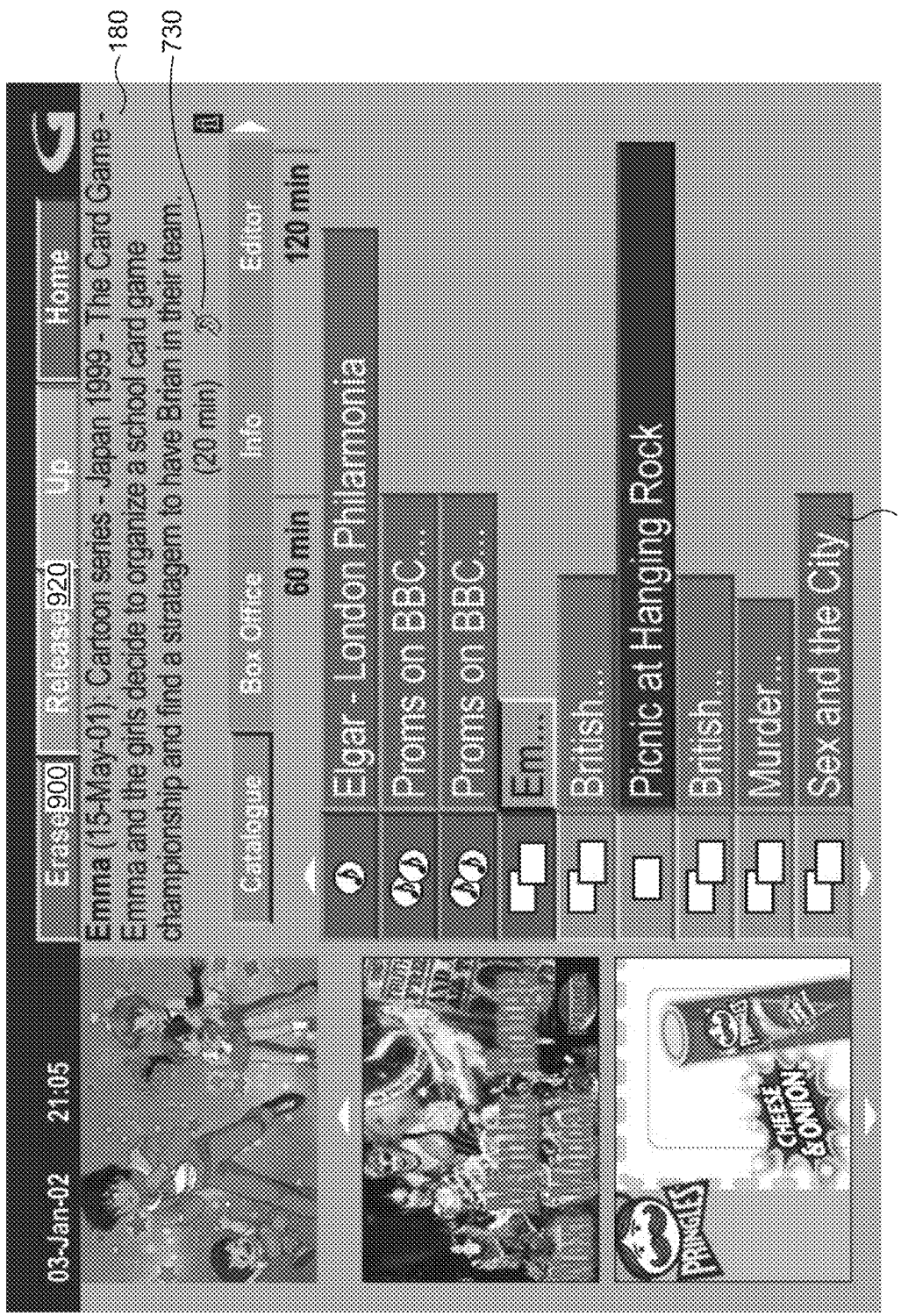
FIG. 14d is an example of an on-screen display of the EPG of FIG. 12 in "My TV" mode and "Catalogue" sub-mode with one of a list of episodes titles in focus after the "keep" action has been activated.

The "Keep" action 720 is displayed where an "unkept" program or series title cell is in focus, as shown in FIG. 14*b*. A user may cause an unkept program or series title cell that is in focus to be "kept" by selecting the "Keep" action 720. In such cases, selecting the "Keep" action causes the program or series title cell 420 to be redisplayed, still in focus, within the stack of 'kept' programs with its precise location depending on the time and date of recording (the latest recorded program on top and the earliest recorded program at the bottom of the list), with the "Keep" action label replaced by the "Release" action label 920 (FIGS. 14*c*, 14*d*). Simultaneously the relevant portion 730 of its program or series note 180 is updated and re-displayed. If there is insufficient unused storage space (for example disk space) for a new telecast program, additional space is found by deleting the oldest recorded, unkept program.

Figure 15:
FIG. 15 is an example of an on-screen display of the EPG of FIG. 12 in "My TV" mode and "Catalogue" sub-mode with one of a list of program titles in focus after the "Erase" action has been activated.

An "Erase" action 900 appears when a program title cell 420 or episode title cell 450 is highlighted while the EPG is in "MY TV" mode and "Catalogue" sub-mode (FIGS. 14*a*, 14*b*, 14*c*). When the "Erase" action 900 is selected a message 750 is displayed on screen in the information panel 180 requiring the user to confirm that he wishes to erase the recorded program. This is shown, for example, in FIG. 15. The user may confirm his intention by pressing the "OK" key on the remote control, in which case the recorded program is deleted. In the event that the user decides not to proceed with erasing the selected program, he may ignore the message and continue to navigate through other cells, causing display of the message to be removed.

Figure 16:
FIG. 16 is an example of an on-screen display of the EPG of FIG. 12 in "My TV" mode and "Catalogue" sub-mode with one of the status icons in focus.

Status icons 880 (FIGS. 14, 14*a*, 14*b*, 14*c*) communicate at-a-glance the status of each program title cell 420, series title cell 430, or episode title cell 450 to indicate whether it is kept or unkept, and whether it represents a television recording or a recording from another source (e.g. a broadcast radio program) and whether they represent a single program event or a series of programs. When the status icon 880 is in focus, the information panel 180 shows technical, non-content related information associated with the program such as recording quality, length of recording, channel, time and date when the recording is scheduled to be made as well as if and, when the program may be deleted, as shown in FIG. 16.

A "series" is a plurality of programs that share a main title. Individual programs within the series are referred to as episodes. While the EPG is in "MY TV" mode and "Catalogue" sub-mode, as shown in FIGS. 14*a*, 14*b*, 14*c*, multiple episodes of a series are depicted using one series title cell 430 that bears a common series title. A series title cell 430 may be displayed in a different style compared to a program cell 420 (not shown). Alternatively they may be distinguished by their status icons 880.

The length of a series title cell 430 corresponds to the sum of the lengths of each recorded episode and is displayed according to the same cut-off rules previously described for program cells whose duration exceeds an upper threshold. The representation of the status icon 880 is according to the first episode to be deleted, if any. For example, if a series is comprised of three individual episodes records, two of which have been 'kept' and one of which will be automatically deleted, the status icon will indicate that a deletion will follow in due course.

When the status icon 880 of a series title cell 430 is in focus, the information panel 180 shows, where possible, a summary of the information parameter associated with the recorded episodes. For example, if four episodes were recorded in "fine" quality and one in "basic" quality, then information panel 180 may contain an extract "Quality: 4×Fine, 1×Basic". As another example, information panel 180 may refer to only the shortest and longest episode durations (not shown).

Figure 16A:
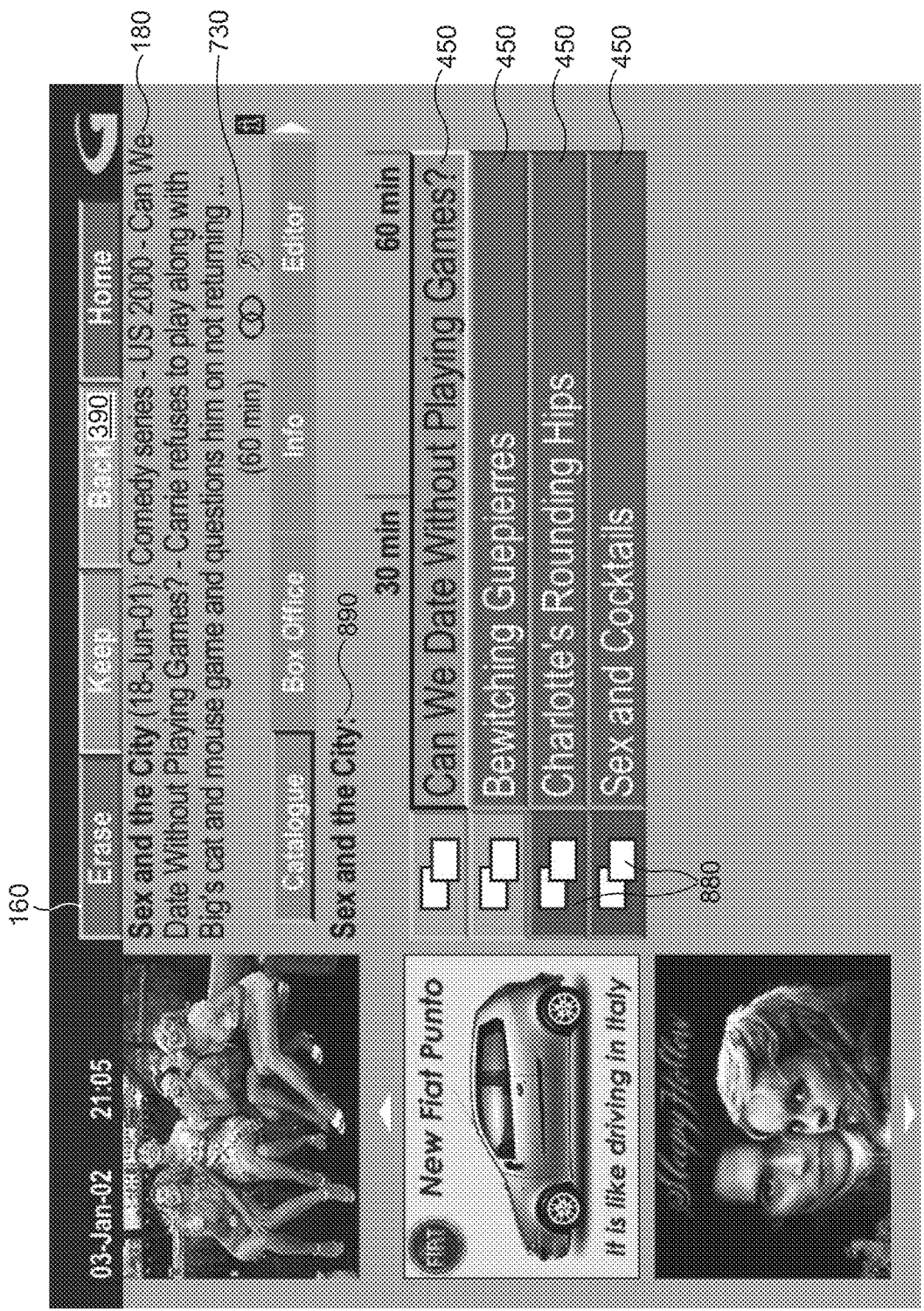
FIG. 16a is an example of an on-screen display of the EPG of FIG. 14b in "My TV" mode and "Catalogue" sub-mode with one of a list of episodes titles in focus after the OK button was pressed on a series title (shown in FIG. 14b)

Information and actions concerning individual episodes are accessed by focusing upon the series program title cell 430 (FIG. 14*b*) and selecting it by pressing the OK button. A new display, as described in FIG. 16*a*, is then shown that lists individual episode title cells 450 for the selected series together with their series title 890, associated status icons 880, relevant action buttons 160 and episode program notes 180. Activating the action button "Back" 390 will cause the display to revert to the previous screen as shown in FIG. 14*b*.

Figure 17:
FIG. 17 is an example of an on-screen display of the EPG of FIG. 14 in "My TV" mode and "Catalogue" sub-mode with the "Unused" cell in focus.

If free storage (for example, disk) space for recording exists, a cell labelled "Unused" 860 is displayed beneath the block of program or series title cells as illustrated in FIGS. 14*b*, 14*c*. A user may focus on the "Unused" cell 860 to cause information concerning the amount of free disk space to be displayed in the information panel 180 (FIG. 17).

Figure 18:
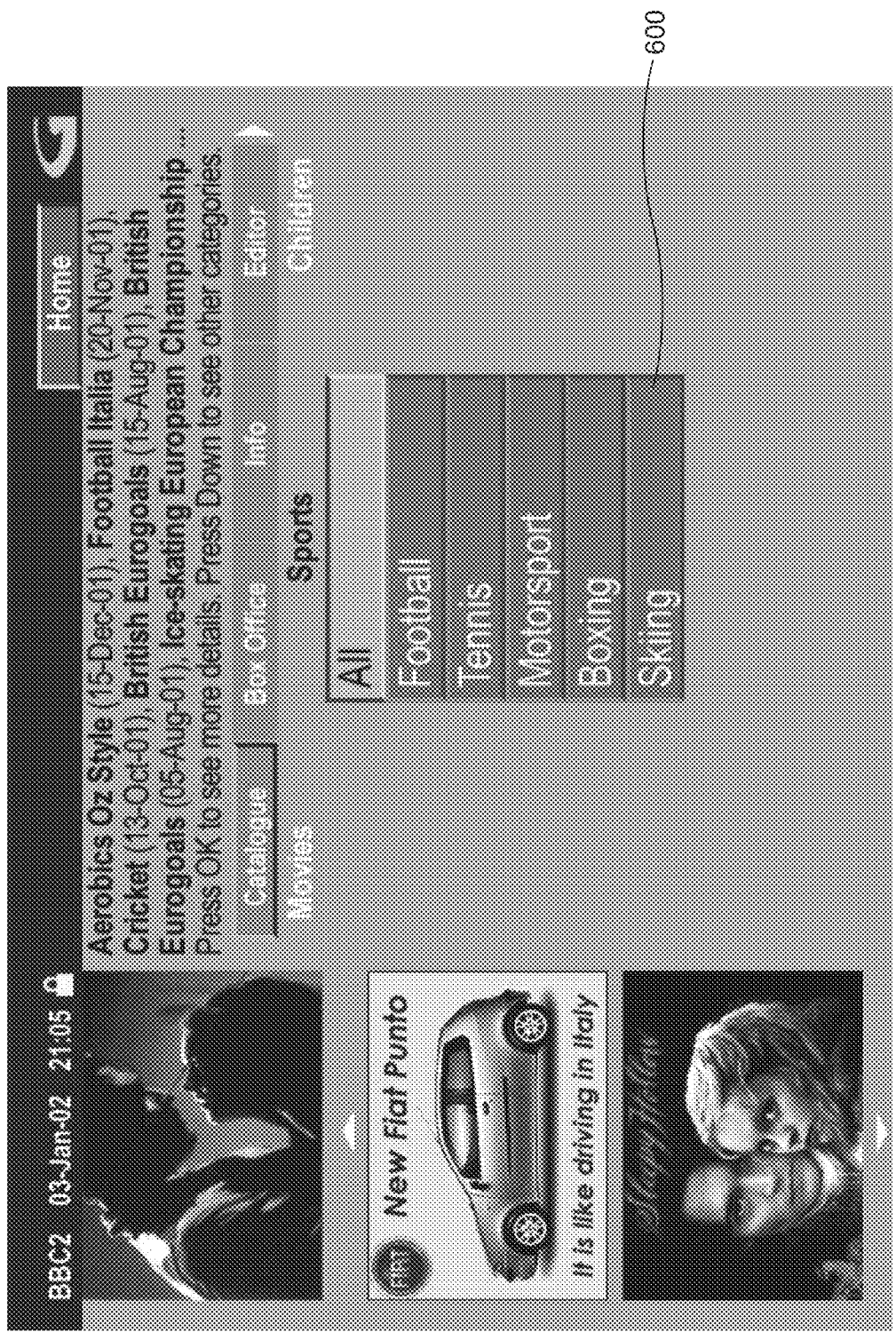
FIGS. 18 and 18a are examples of an on-screen display of the EPG of FIG. 14 with the "Theme" action selected with a theme sub-category cell in focus.
Figure 18A:
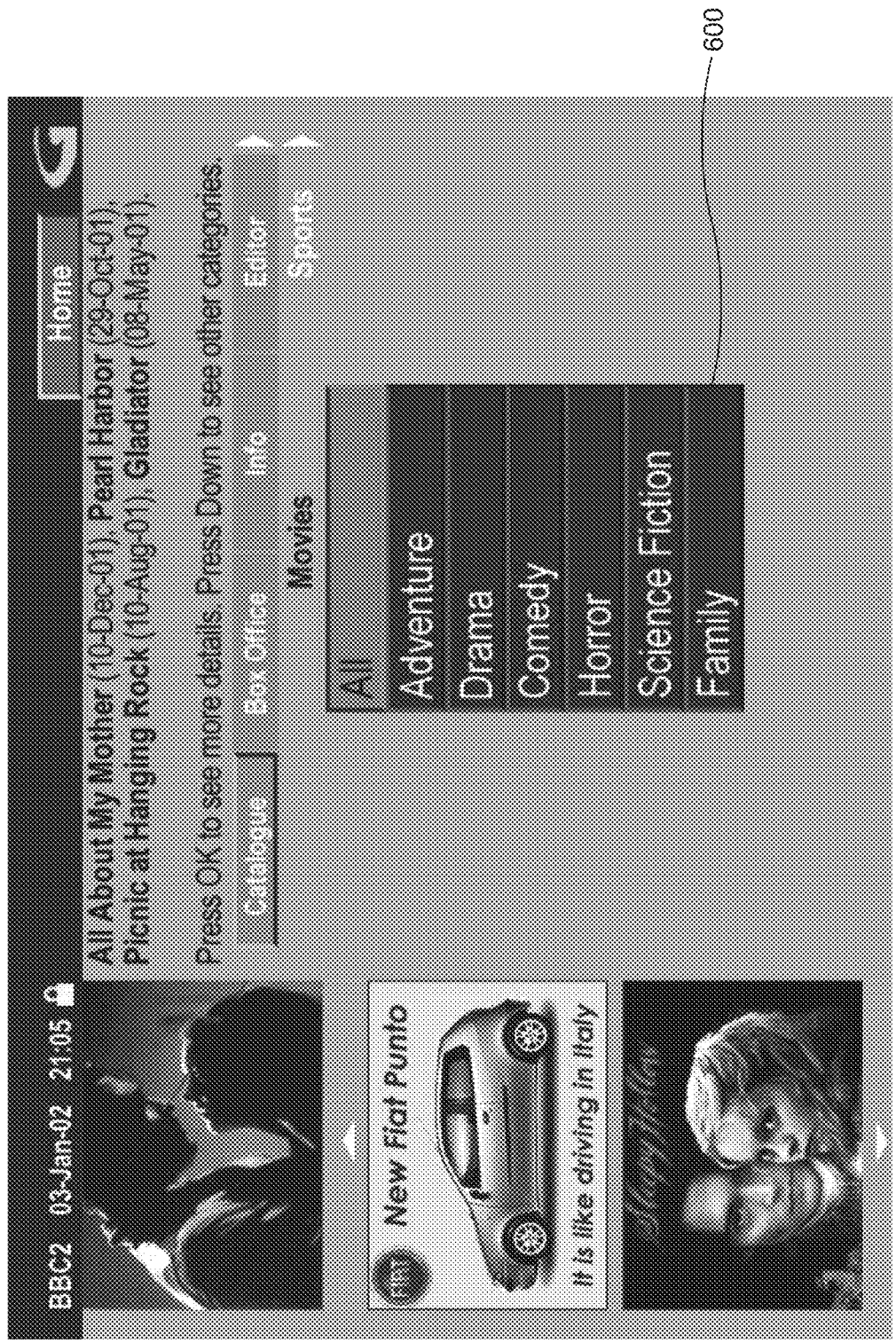
Figure 18B:
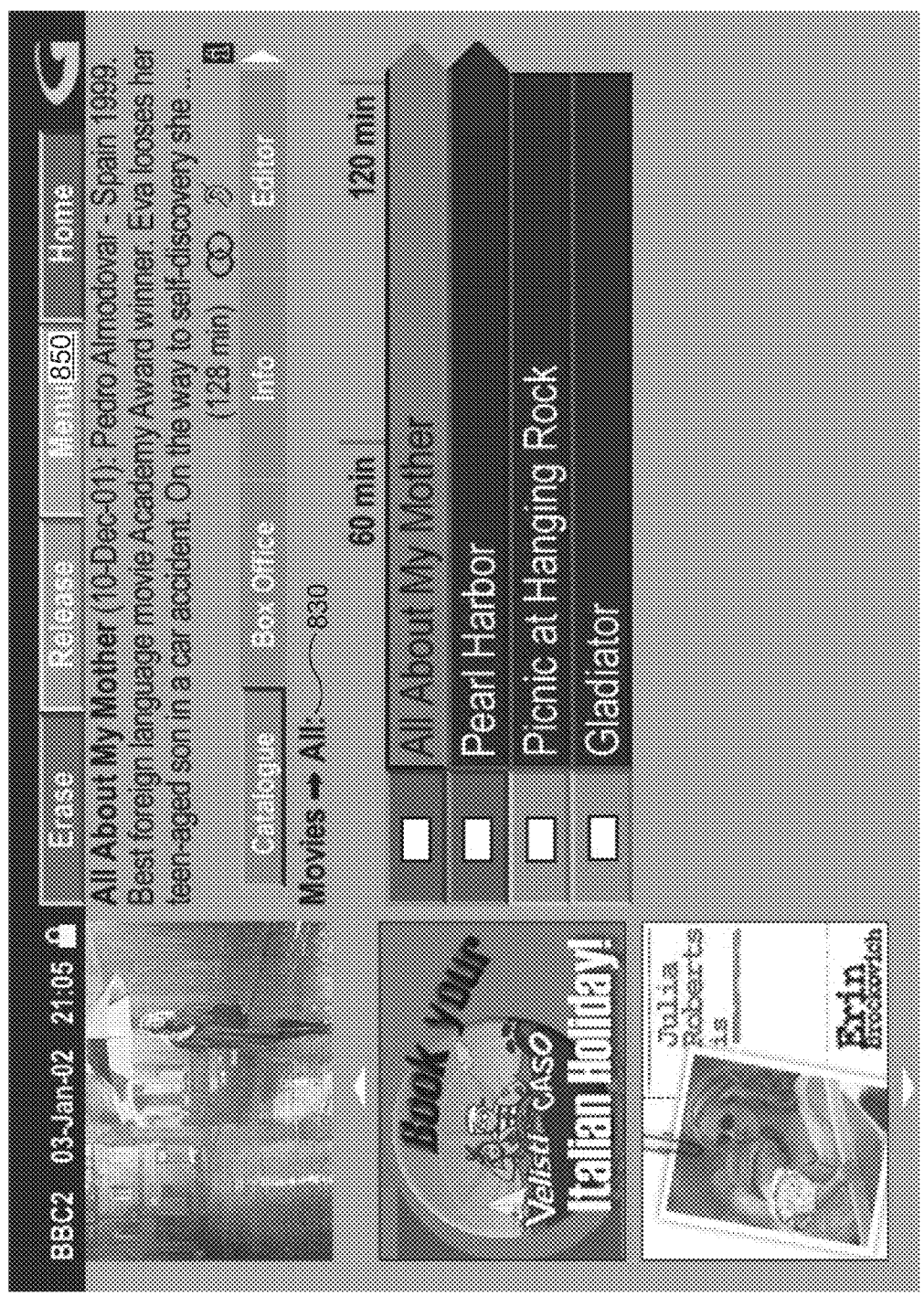
FIG. 18b is an example of an on-screen display of the EPG of FIG. 18a with the "Theme" action selected and after a theme sub-category has been selected.

With the "Catalogue" sub-mode cell in focus, a user may select from various search criteria via hot 'keys' on the action menu 160. These may include "Theme" 840, "Date" 820 and "Channels" 800 (FIG. 14). Upon pressing the "Theme" action button 840, the user may search for recorded programs from various categories such as Movies, Sports and Childrens' programs (FIG. 18). When a user makes a selection from a menu of vertically listed sub-categories 600 (FIGS. 18, 18*a*), a new screen is displayed (FIG. 18*b*) showing all programs recorded that belong to the chosen sub-category. A header 830 may display information about the chosen selected category and sub-category. Upon pressing the action button "Menu" 850 (FIG. 18*b*) the display will revert to the previous menu page (FIG. 18*a*)

Figure 19:
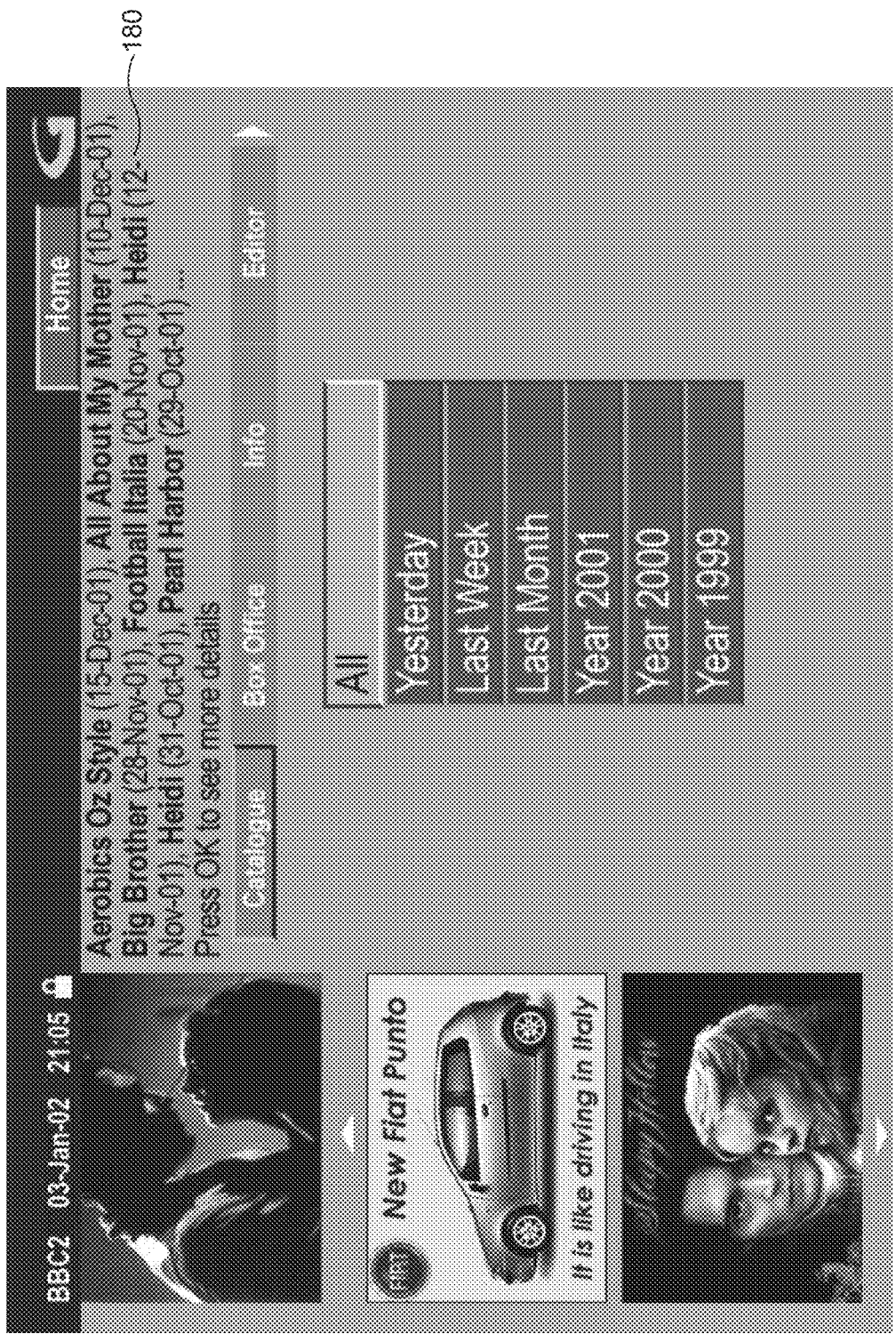
FIG. 19 is an example of an on-screen display of the EPG of FIG. 14 with the "Date" action selected with the option "All" being in focus.

Upon pressing the "Date" action button 820 with the "Catalogue" sub-mode cell in focus (FIG. 14), the user may search for programs recorded during a particular time period. FIG. 19 describes how, responsive to selection of the "Date" action, a vertical arrangement of cells is displayed beneath the horizontal sub-mode menu bar. The first cell, closest to the sub-mode menu bar is labelled "All" and is followed beneath by other cells labelled with historic date ranges of progressively increasing durations (e.g. "Yesterday", "Last Week", "Last Month", "Year 2001") with distance from the sub-mode menu bar.

Figure 19A:
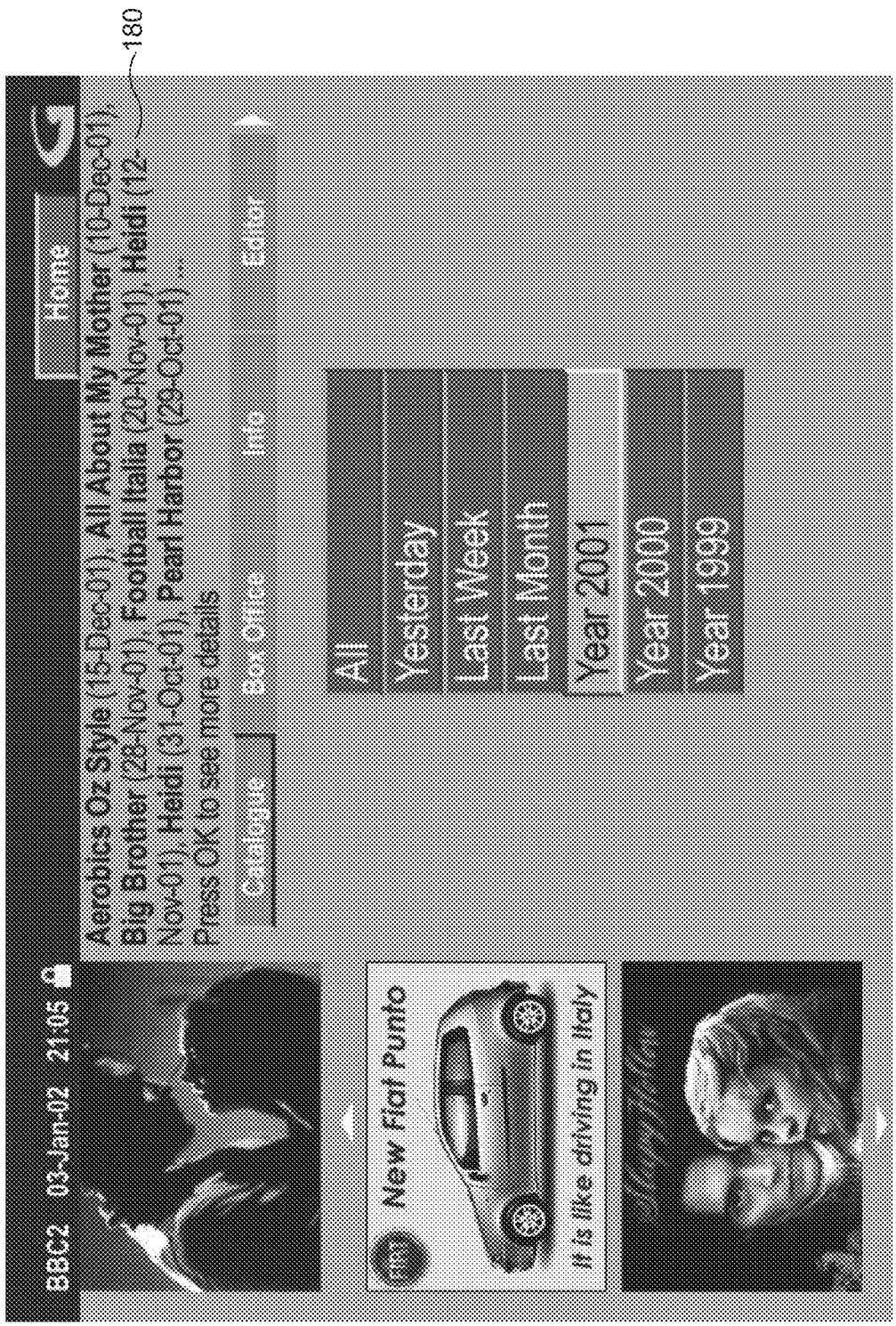
FIGS. 19a, 19b and 19c are examples of an on-screen display of the EPG of FIG. 19 with further "Date" options selected.

The user may use the cursor keys to change the date range cell under focus (FIG. 19*a*).

Figure 19B:
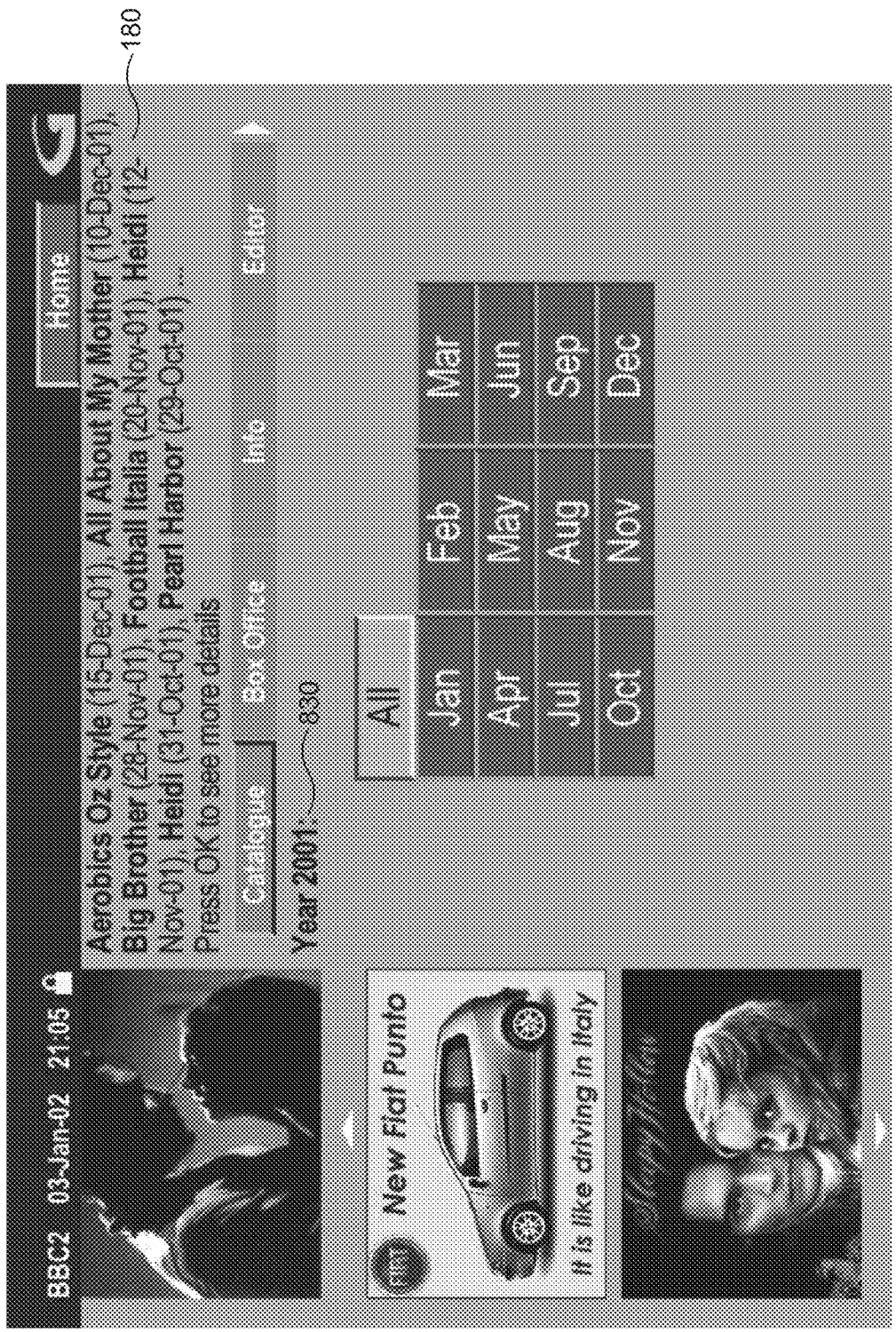

Responsive to selection of a date range cell that corresponds to a range longer than a day, a successive group of cells is displayed that divides the selected date range into cells corresponding to shorter non-overlapping date sub-ranges. Additionally a cell is displayed in focus corresponding to the full duration of the previously selected data range (FIG. 19*b*). Date ranges that correspond to periods in the future are greyed out or not displayed at all, and cannot be focused upon (not shown).

Figure 19C:
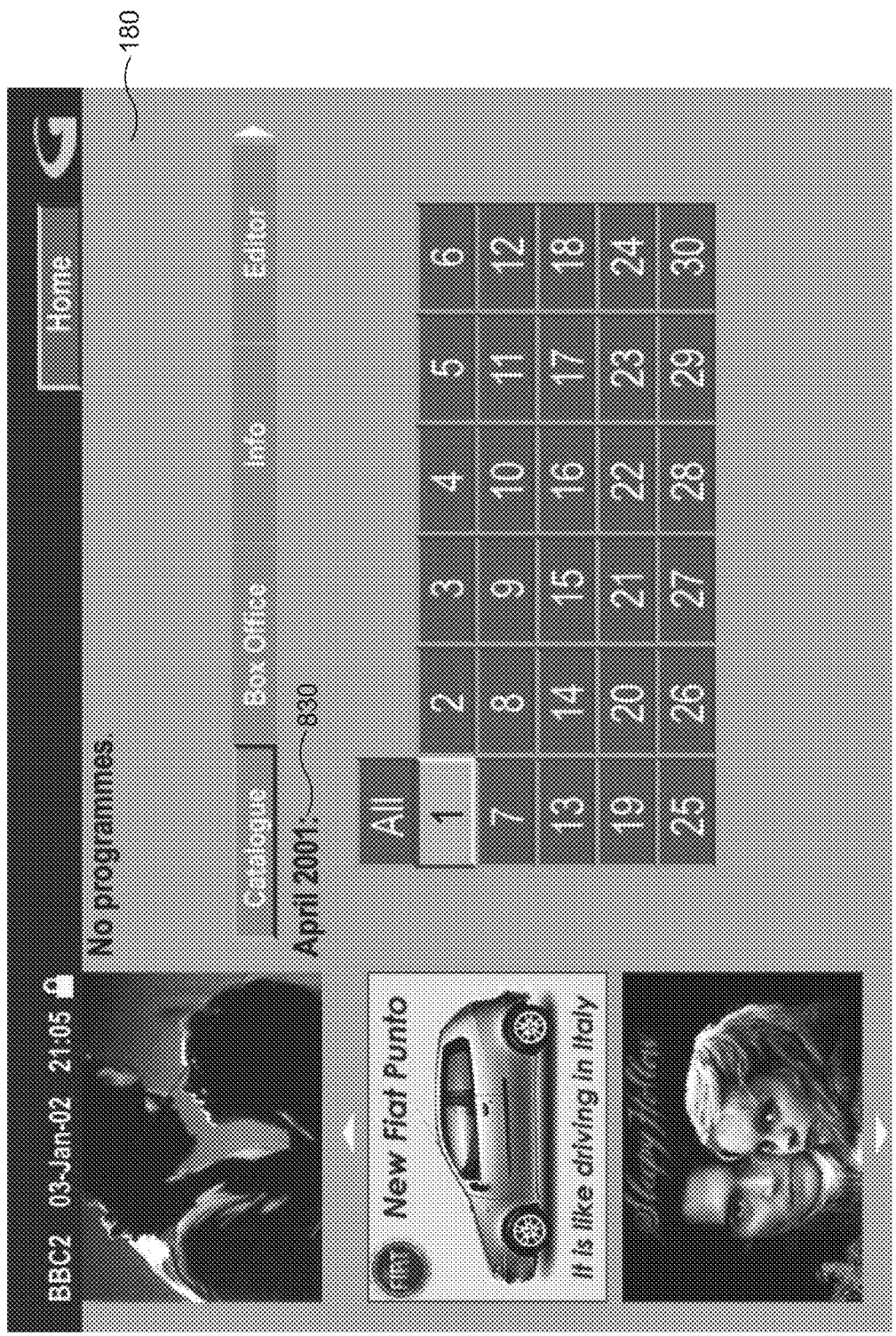

FIGS. 19*a* and 19*b* describe an example where a user has selected "Year 2001" to cause display of sub-ranges "All", "Jan", "Feb" etc. and where the "All" cell is immediately placed in focus. FIG. 19*c* describes the case where a month cell in FIG. 19*b* has been selected to cause the cell "All" and a cell for each day of the selected month to be displayed.

Simultaneous to focusing on a date sub-range, titles of programs that correspond to the date range are displayed together with other optional information (such as date of recording or telecast channel) in the information panel 180. FIG. 19 shows an example where a user has put the "ALL" cell in focus. The user may further select a focused date range cell by pressing the remote control "OK" key to cause display of a vertical arrangement of program cells that correspond to programs recorded during the selected date range, as illustrated in FIG. 14*a* for the case of selecting the "All" cell shown in FIG. 19. The vertical arrangement 240 of program cells 420 or episode cells 450 lists program titles in sequence according to whether they are kept or unkept. Cells corresponding to kept programs are displayed together uppermost in reverse chronological order of time of recording (i.e. the most recently recorded program title is displayed at the top of the block of kept program cells). Unkept programs are displayed below the "kept" programs in reverse chronological order according to when they were recorded. (i.e. the most recently recorded program title being displayed at the top of the block of unkept program cells).

The user may use the cursor keys to navigate focus between program cells. Simultaneous to focusing on a cell, contextual help information and/or program notes corresponding to the focused cell are displayed in the information panel 180.

Figure 14E:
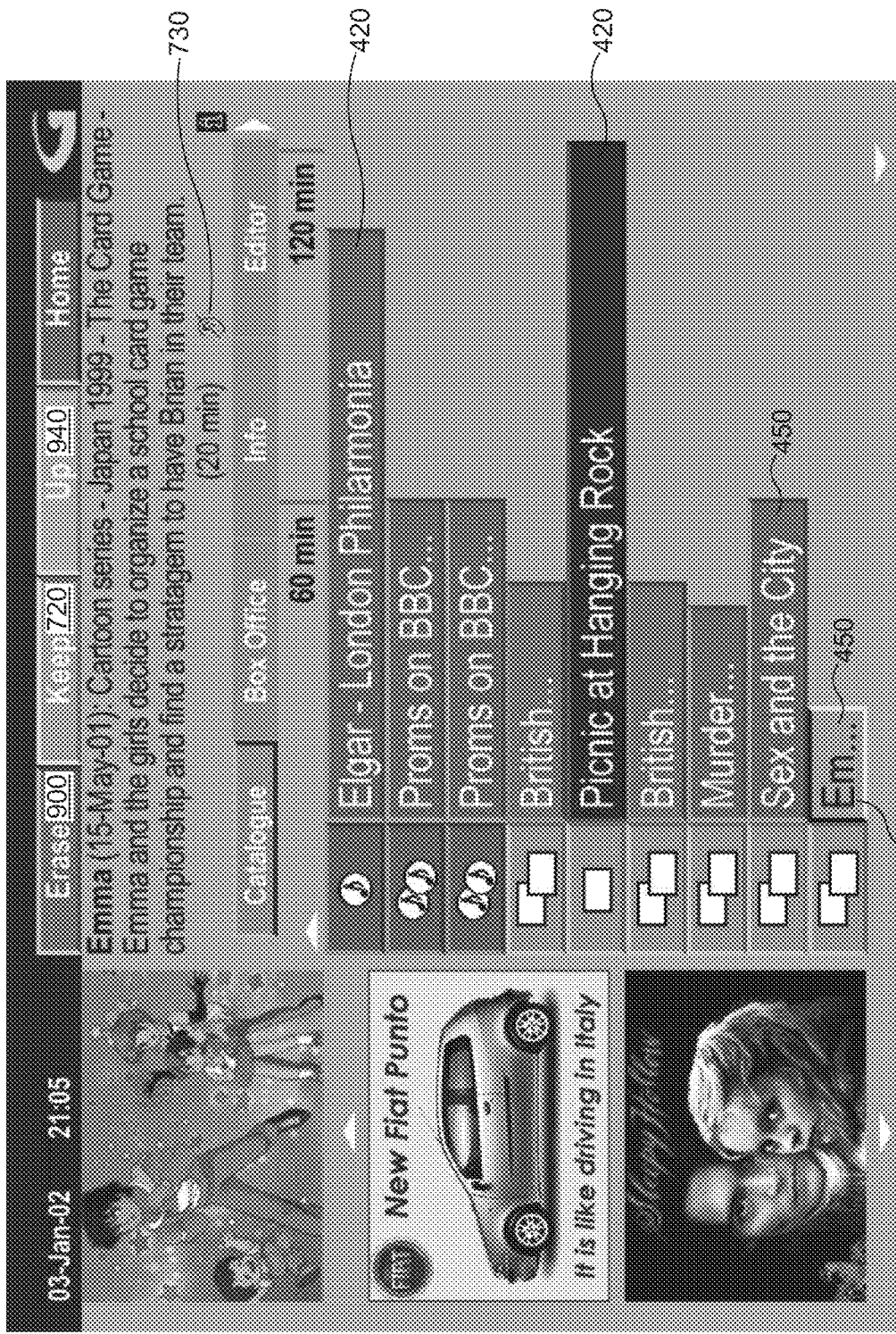
FIG. 14e is a further example of an on-screen display of the EPG of FIG. 12 in "My TV" mode and "Catalogue" sub-mode with one of a list of episodes titles in focus.
Figure 14F:
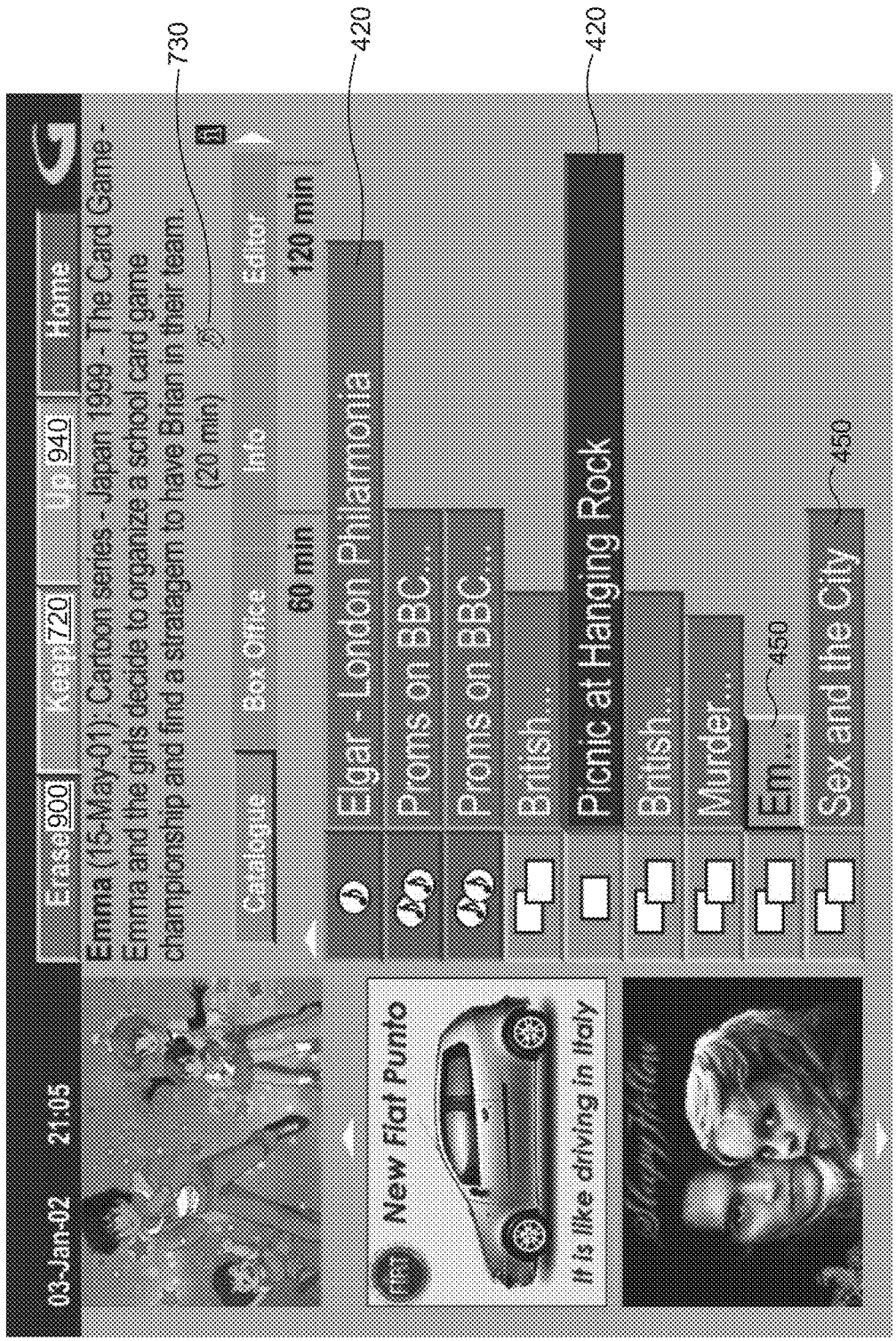
FIG. 14f is an example of an on-screen display of the EPG of FIG. 12 in "My TV" mode and "Catalogue" sub-mode with one of a list of episodes titles in focus after the "up" action has been activated.

The "Up" action 940 may be selected for a focused program cell 420 or episode program cell 450 to promote it up through the program title grid 240 and thereby to demote its position in the queue for deletions needed to make space for new program recordings (FIGS. 14*e*, 14*f*). Each press of the "Up" action 940 causes the focused episode program cell 450 to be displayed in a position swapped with the unkept program above it and maintained in focus. Simultaneously the relevant portion 730 of its program note 180 may be updated and re-displayed (FIGS. 14*e*, 14*f*).

A "Release" action 920 is displayed where the program cell in focus has been kept (FIG. 14*a*). Selecting the "Release" action causes the cell in focus to be demoted vertically down in the program block 420 to the top of the unkept program block. Simultaneously the relevant portion 730 of its program note 180 may be updated and re-displayed (not shown).

Figure 20:
FIGS. 20 and 21a are examples of an on-screen display of the EPG of FIG. 14 with the "Channel" action selected with a particular channel cell in focus.
Figure 21A:

Selecting the "Channels" action in the "Catalogue" sub-mode causes a grid 740 of channel cells 620 to be displayed on screen, each cell carrying the logo of a particular channel, as shown in FIG. 20. The user may use the cursor keys to change focus between the channel cells 620. Simultaneous to which, contextual help information and/or program notes corresponding to details of the programs that have been recorded on the particular channel are displayed in the information panel 180 (FIG. 21*a*).

Figure 21B:
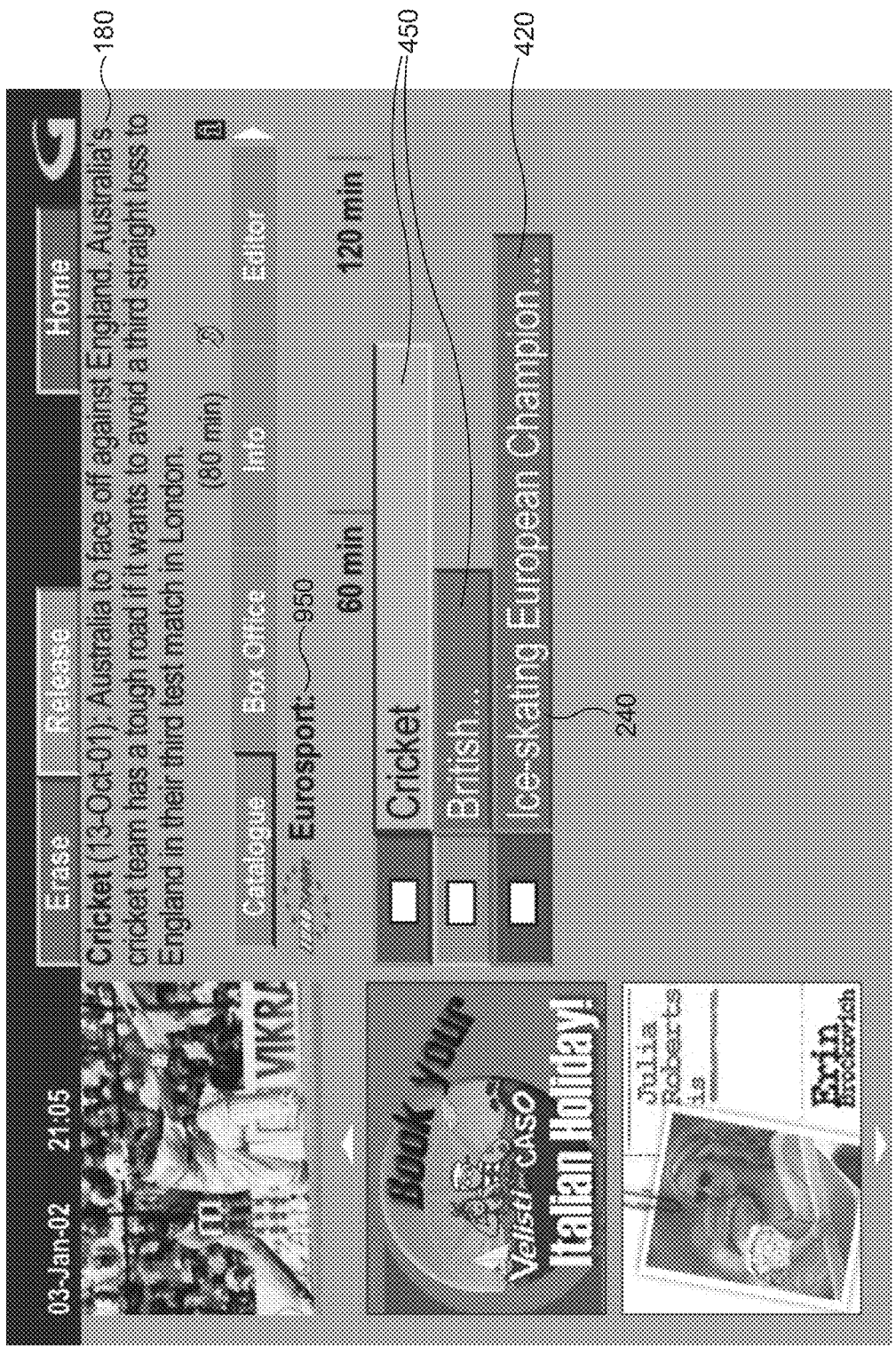
FIG. 21b is an example of an on-screen display of the EPG of FIG. 21a with a specific channel having been selected and with a program title cell in focus.

Selecting a focused channel logo cell 620 causes a vertical arrangement 240 of program title cells 420 or episode program cells 450 to be displayed denoting the programs which have been recorded from the selected channel on the storage medium, for example disk, as shown in FIG. 21*b*. Highlighting a particular program cell 420 or episode program cell 450 results in the relevant program note being displayed in the information panel 180. The channel logo 950 or any other form of representation of the relevant channel may be displayed to indicate which channel has been selected.

Figure 22:
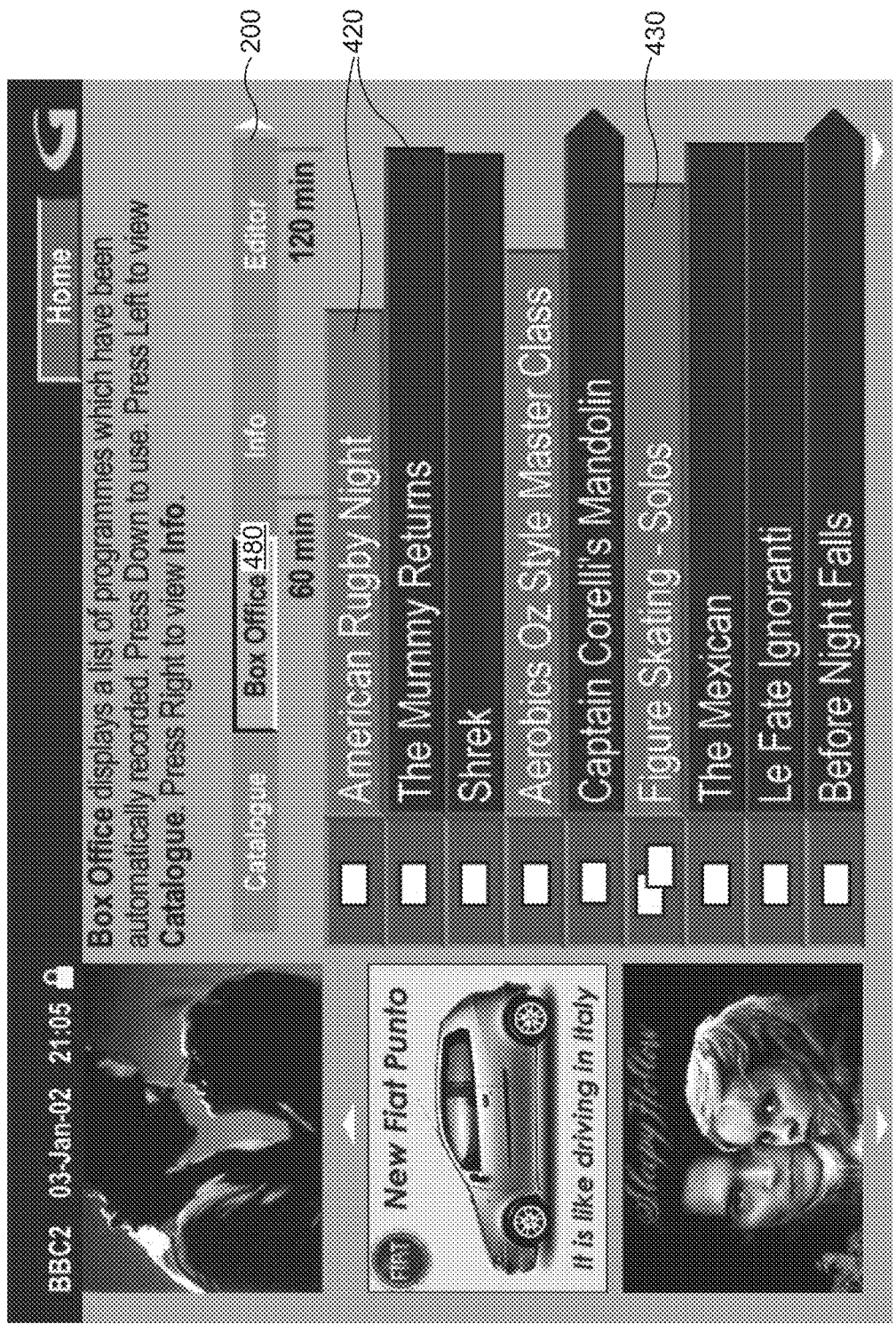
FIG. 22 is an example of an on-screen display of the EPG of FIG. 14 with the "Box Office" sub-mode selected.
Figure 22A:
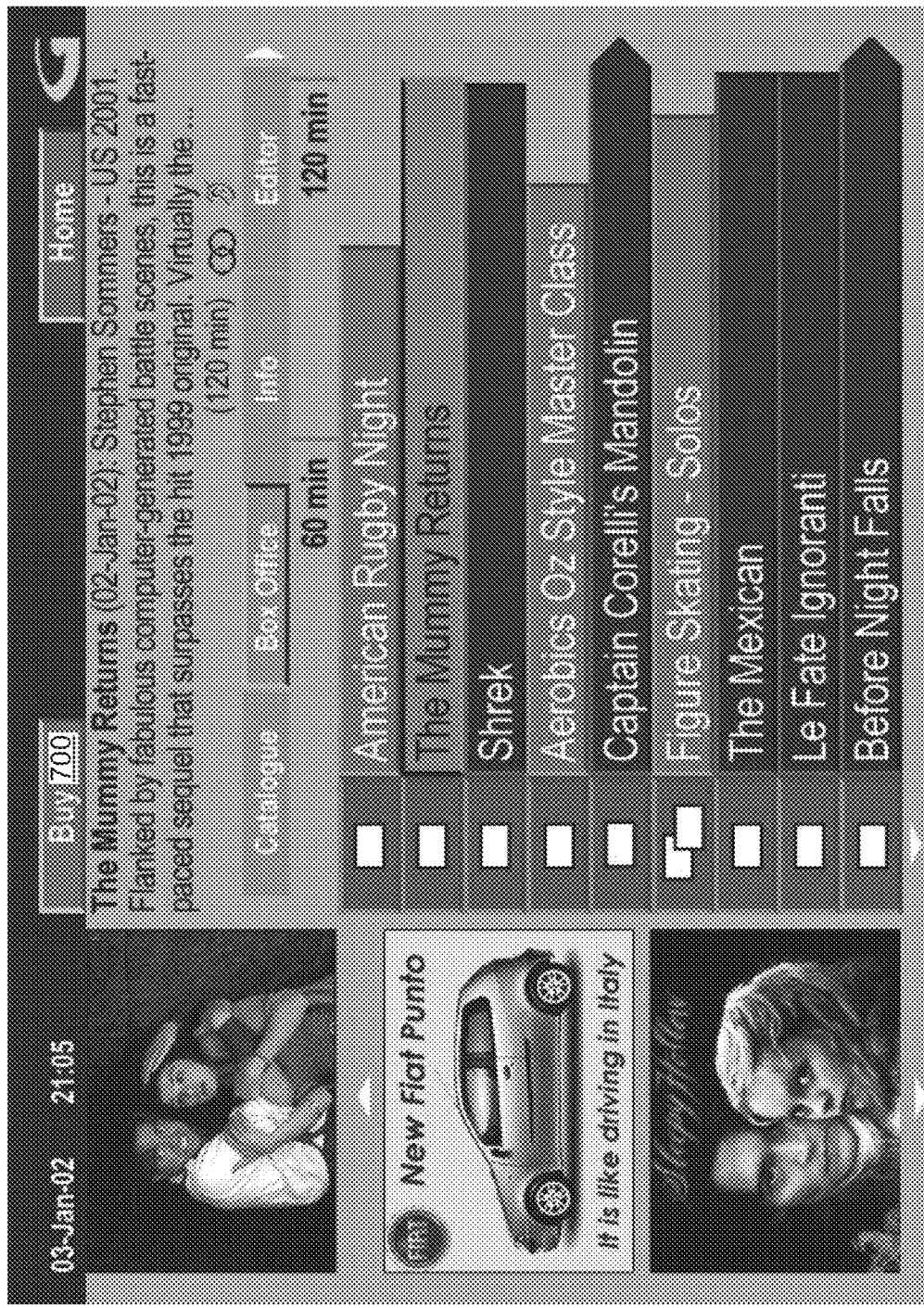
FIG. 22a is an example of an on-screen display of the EPG of FIG. 14 with the "Box Office" sub-mode selected and a particular program title cell in focus.

In a further preferred embodiment, the system includes a sub-mode, "Box Office", for receiving and recording programs and related program or series note information that may be addressed by a television program service provider to a particular set-top-box (STB). These recorded programs and series may be accessed by focusing on the "Box Office" sub-mode 480 on the menu bar 200, as shown in FIG. 22, from within "My TV" mode. User interaction with programs, series, episodes and other EPG functionality is similar to the functionality described for the "Catalogue" sub-mode except that the recording of programs and the display of the program title cells associated with them is managed by and at the discretion of a service provider. Consequently, a user does not have facility to "Keep", "Erase" or adjust a recorded program's position in a queue for deletion in order to make way for a new recordings using the "Up" action described for the "Catalogue" sub-mode.

In the preferred embodiment, the service provider causes automatic, unattended recording of certain programs or series of episodes considered to be of interest to the user. The titles corresponding to these are displayed in the program cells 420 or series cells 430.

At the option of the service provider, a program may be designated "pay-per-view" and incur a one-off payment before it is viewed. A "Buy" action 700 is displayed for such programs when they are in focus. Upon selection by the user of the "Buy" action 700 the user may be requested to confirm the purchase and identify himself by entering a personal identification number (PIN) using keys on the remote. Thereafter the recorded program is responsive to playing in the same manner using the "Play" and "Stop" keys as described for the "Catalogue" sub-mode (not shown).

Figure 23:
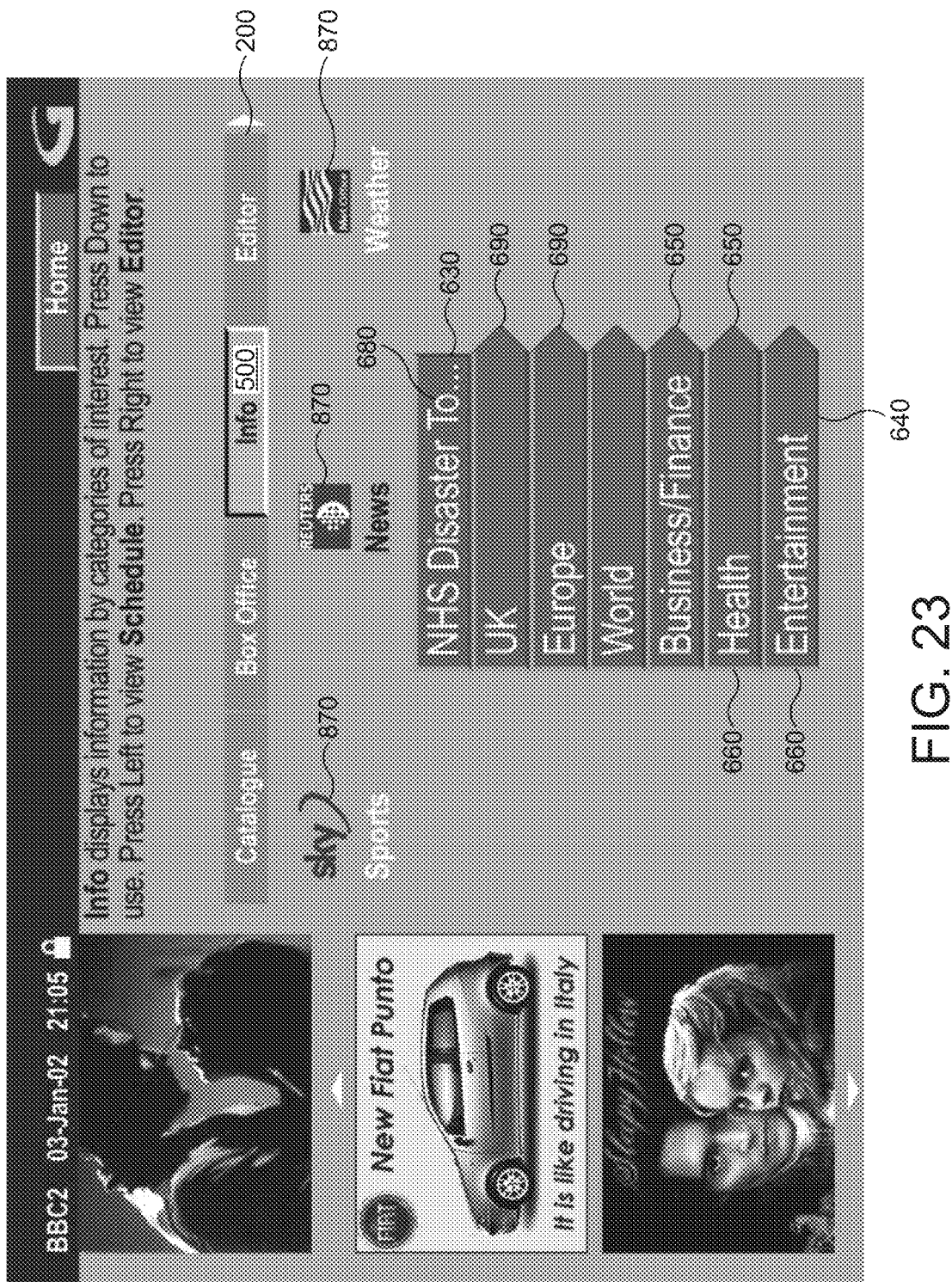
FIG. 23 is an example of an on-screen display of the EPG of FIG. 14 with the "Info" sub-mode selected.

In a further preferred embodiment, means may be provided whereby the user can access detailed information regarding subjects such as the weather, news, sport or films. This feature is accessed by focusing upon the cell corresponding to the "Info" sub-mode 500 on the menu bar 200, as shown in FIG. 23. Information is displayed as articles. Each article comprises one or more pages of hypertext and graphical information displayed in the expanded information panel 190 of FIGS. 23*a*, 23*b*, 23*c*.

Selection of the "Info" sub-mode causes the on-screen display of various information categories, such as news, or sports, or weather. The subsequent selection of a particular category results in the display of a list of related sub-categories 690, each denoted by a particular cell, as shown in FIG. 23. Each information category is represented as a vertical column or block 640 that is subdivided into horizontal, row like cells 660 that represent either articles 680 or sub-categories 690 of articles 680. An article cell 630 is labelled with the title of the article 680 that it represents whereas a subcategory cell 650 is labelled with the title of the subcategory 690 that it represents.

Figure 23A:
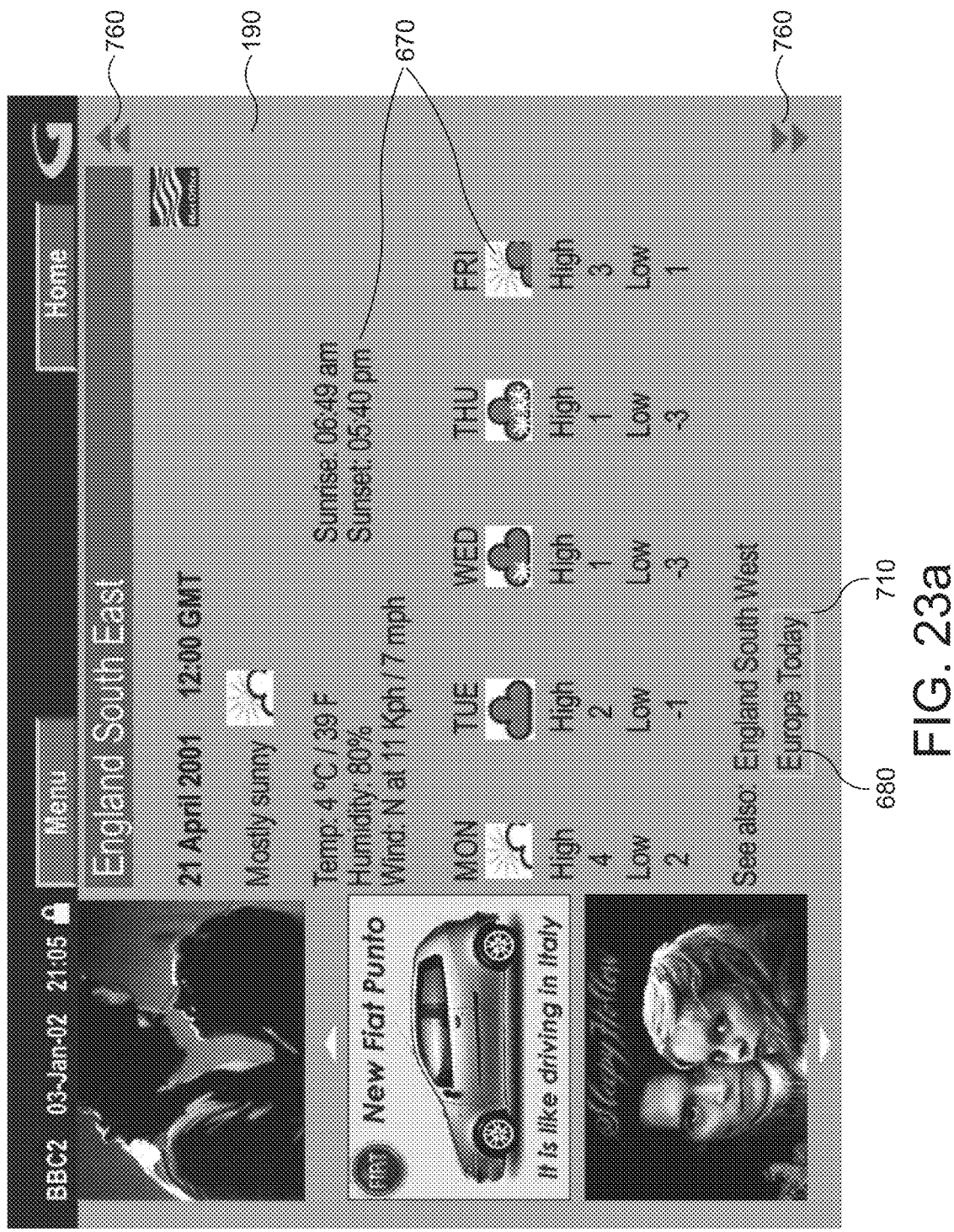
FIGS. 23a, 23b, 23c and 23i are examples of on-screen displays of the EPG of FIG. 23 as a result of the selection of various articles.
Figure 23B:
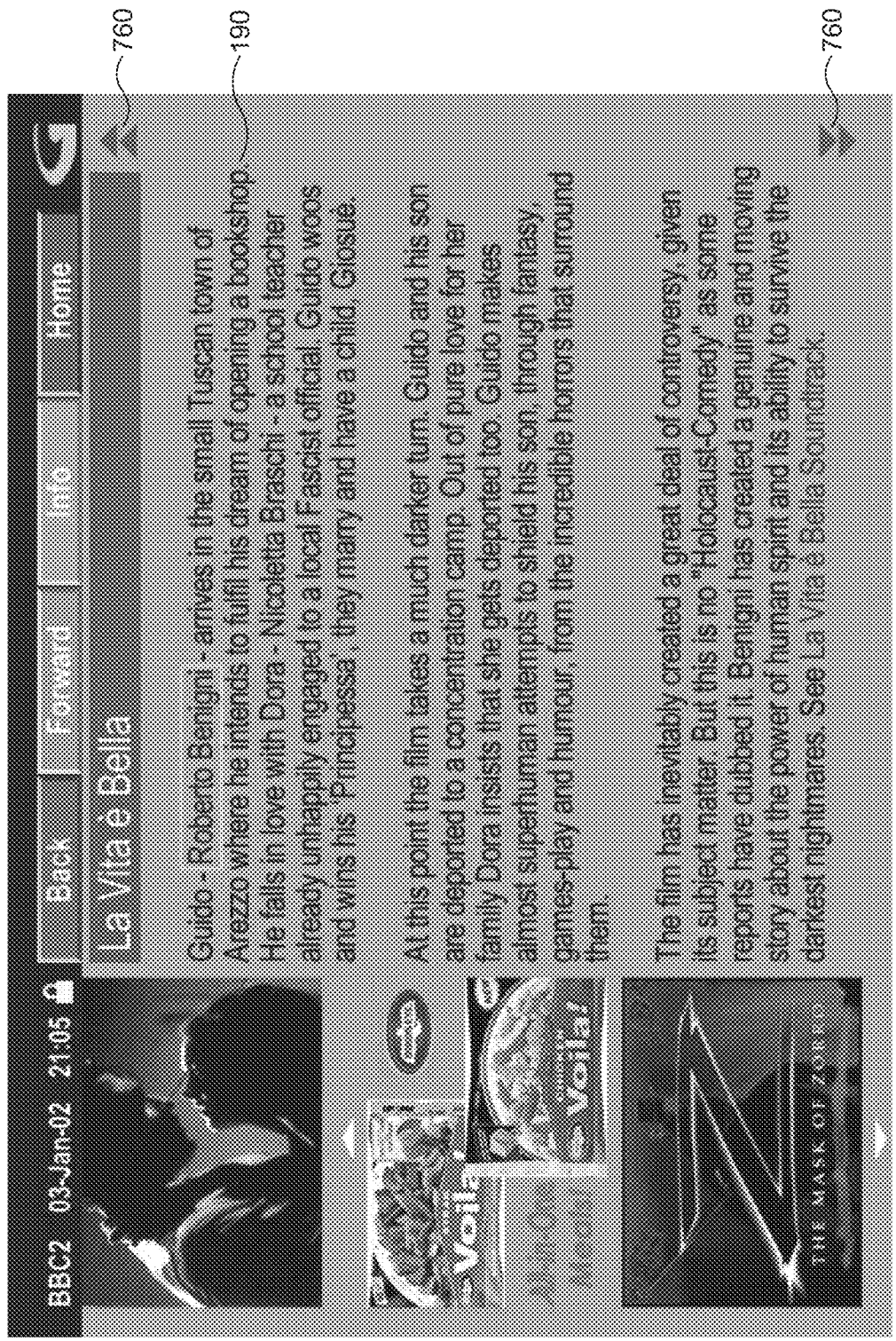

A user may cause an article to be displayed by navigating focus to its respective cell and selecting it for display by pressing the "OK" key on the remote. The article comprises text and graphics information 670 with links 710 to positions within the same or different articles 680. A link 710 may be represented by a text or graphics object which, when placed in focus by the user, is rendered differently using a border, reverse colour or some other style of highlighting as illustrated in FIG. 23*a*. Links may point to different types of objects within the EPG, such as to a program title cell, or to an information article or page. The user may navigate focus between links by using the remote cursor keys.

The type of object pointed to by a link may be represented by the colour or style of the rendering of the link's display. This is useful to assist a user in making a decision whether to select a link. For example, a segment of text that links to a program cell 420 may be displayed in a red font, while links to advertisements may be shown in a green font (FIGS. 23*b*, 23*f* and 23*c*, 23*d*).

"Scroll" links 760 and 770 may be displayed in the right margin of article pages to assist the user to page up or down quickly between articles and article pages. Focusing upon and selecting a scroll link depicted as a single up pointing arrow 770 or single down pointing arrow 770 causes either the previous or following article page within the same article to be displayed respectively. Focusing upon and selecting a scroll link depicted as a double up pointing arrow 760 or double down pointing arrow 760 causes the first page in either the previous or following article to be displayed respectively, where the ordering of articles is determined according to the order in which their article title cells 630 (FIG. 23*h*) are displayed (for example shown in FIGS. 23*a*, 23*b*, 23*c*).

Figure 23C:
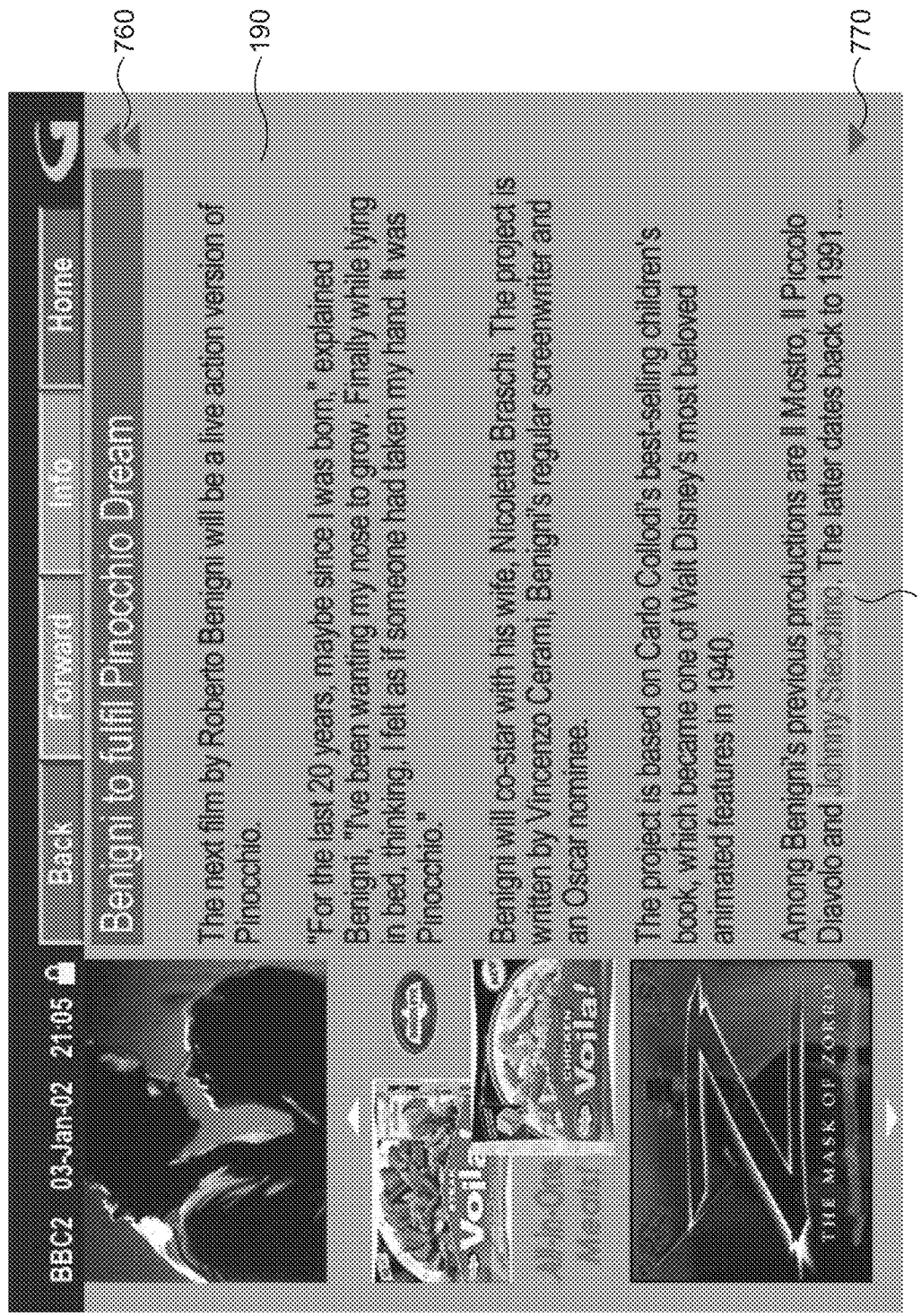
Figure 23D:
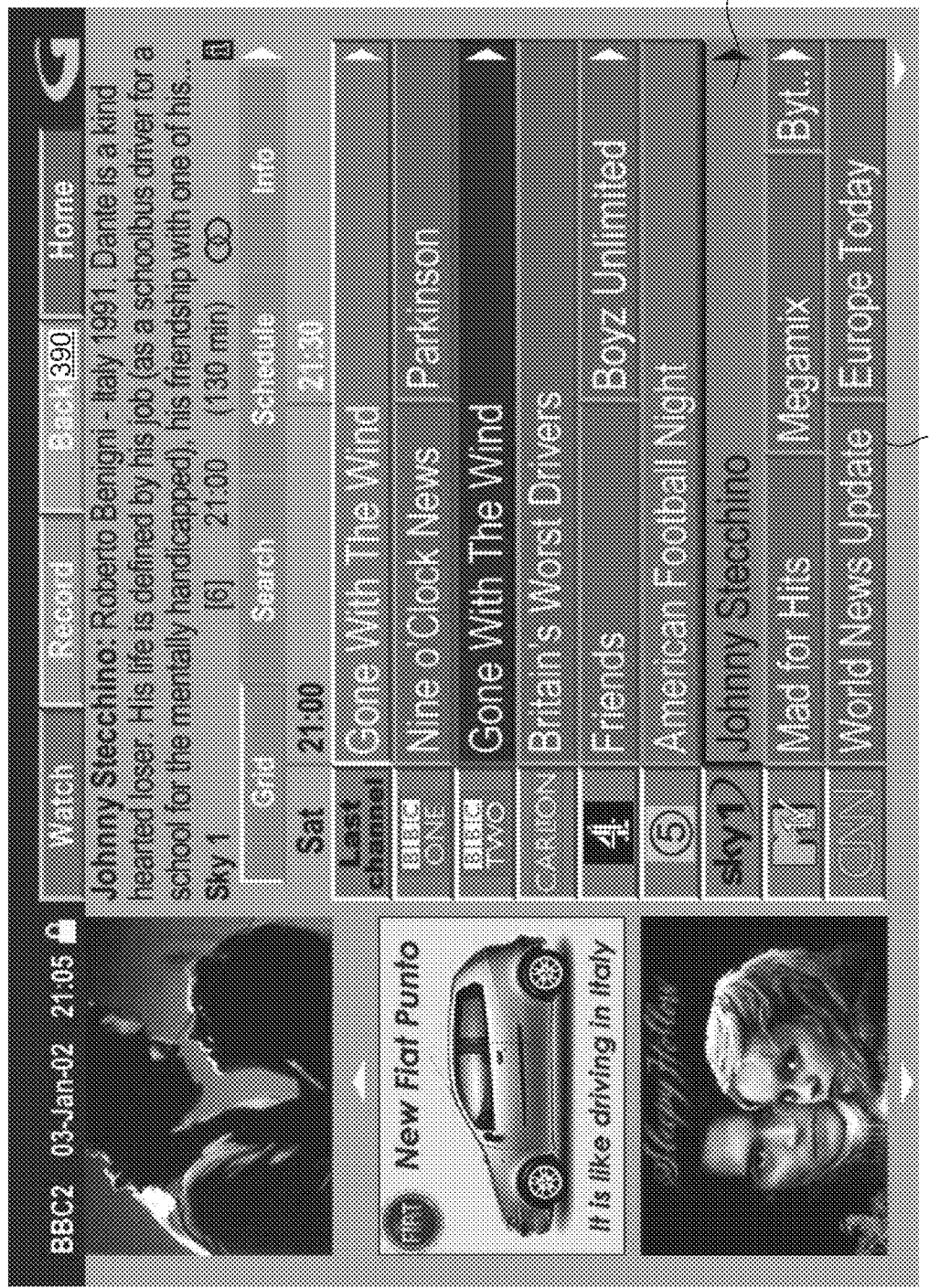
FIG. 23d is an example of an on-screen display of the EPG of FIG. 12 with the link in FIG. 23c selected and with the focus on the programme title cell of the selected link.

An article page may contain "Telecast" or "My TV" program links, or "Advertisement" links. FIGS. 23*c* and 23*d* describe how "Telecast" link 780 points to a particular program title cell 420 in "Grid"240, where user selection of it causes the EPG to change display to "Telecast" mode in "Grid" sub-mode with the linked program cell 420 in focus. A "Back" action label 390 is displayed to allow the user to return to the article page with the link back in focus, as illustrated in FIG. 23*d*. A "My TV" program link has the same functionality as a "Telecast" program link except that it points to a recorded program title cell or series title cell displayed in "My TV" mode and "Catalogue" sub-mode (not shown).

Figure 23E:
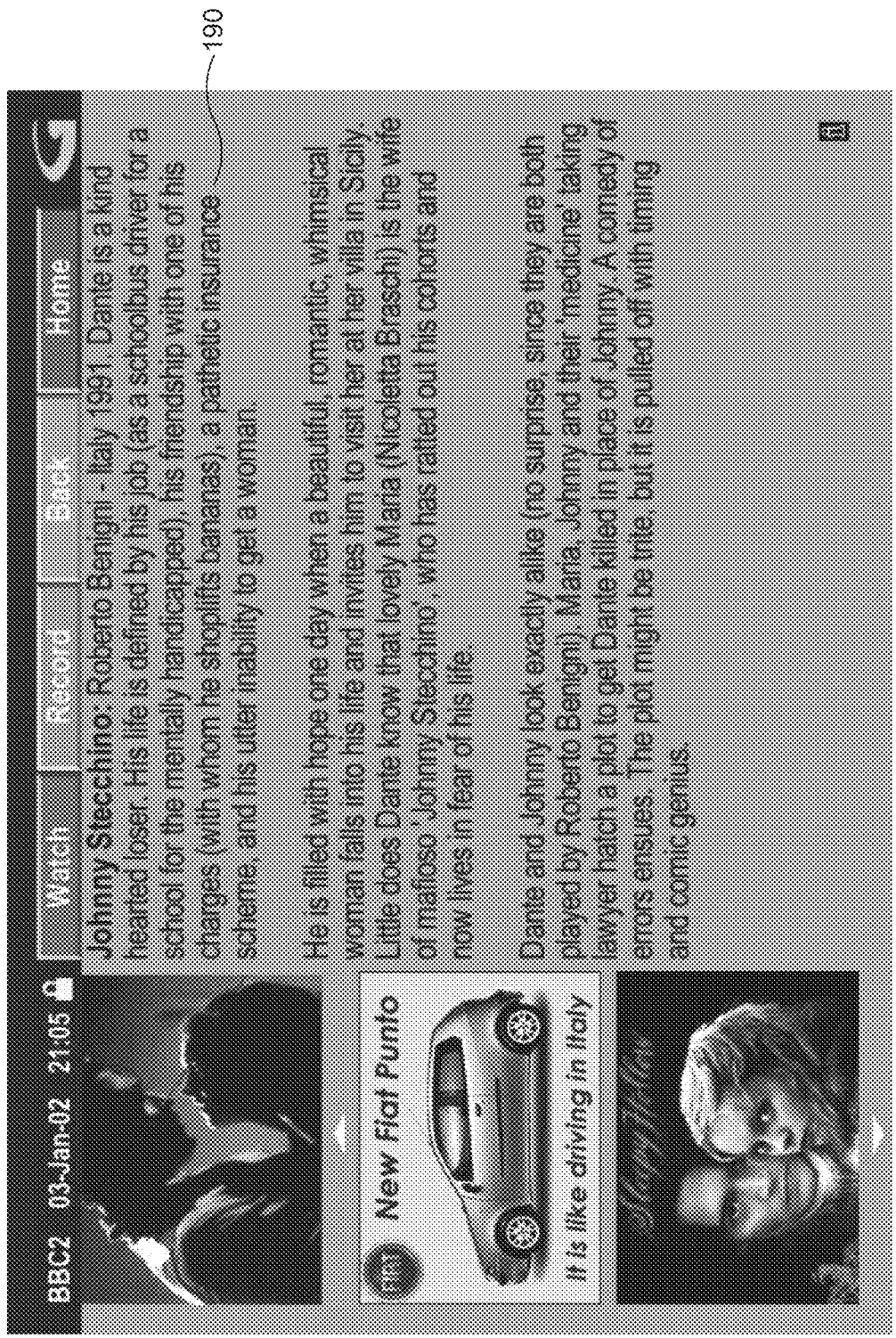
FIG. 23e is an example of an on-screen display of the EPG of FIG. 12 where the link in FIG. 23c was selected resulting in the information panel being expanded for the description of the selected program title cell.

Further embodiments of program links may cause the EPG to switch to any specified mode, sub-mode or display mode according to the values of parameters embedded within the link object. For example, a program link to a program to be telecast may require that it be displayed with its program notes expanded 190 such as described in FIG. 23*e*. Other embodiments to program links may instead or additionally cause certain specified actions to be performed on the program pointed to by the link according to the values of parameters embedded within the link object. For example, selection of a program link may cause the pointed to program to be recorded (not shown)

Figure 23F:
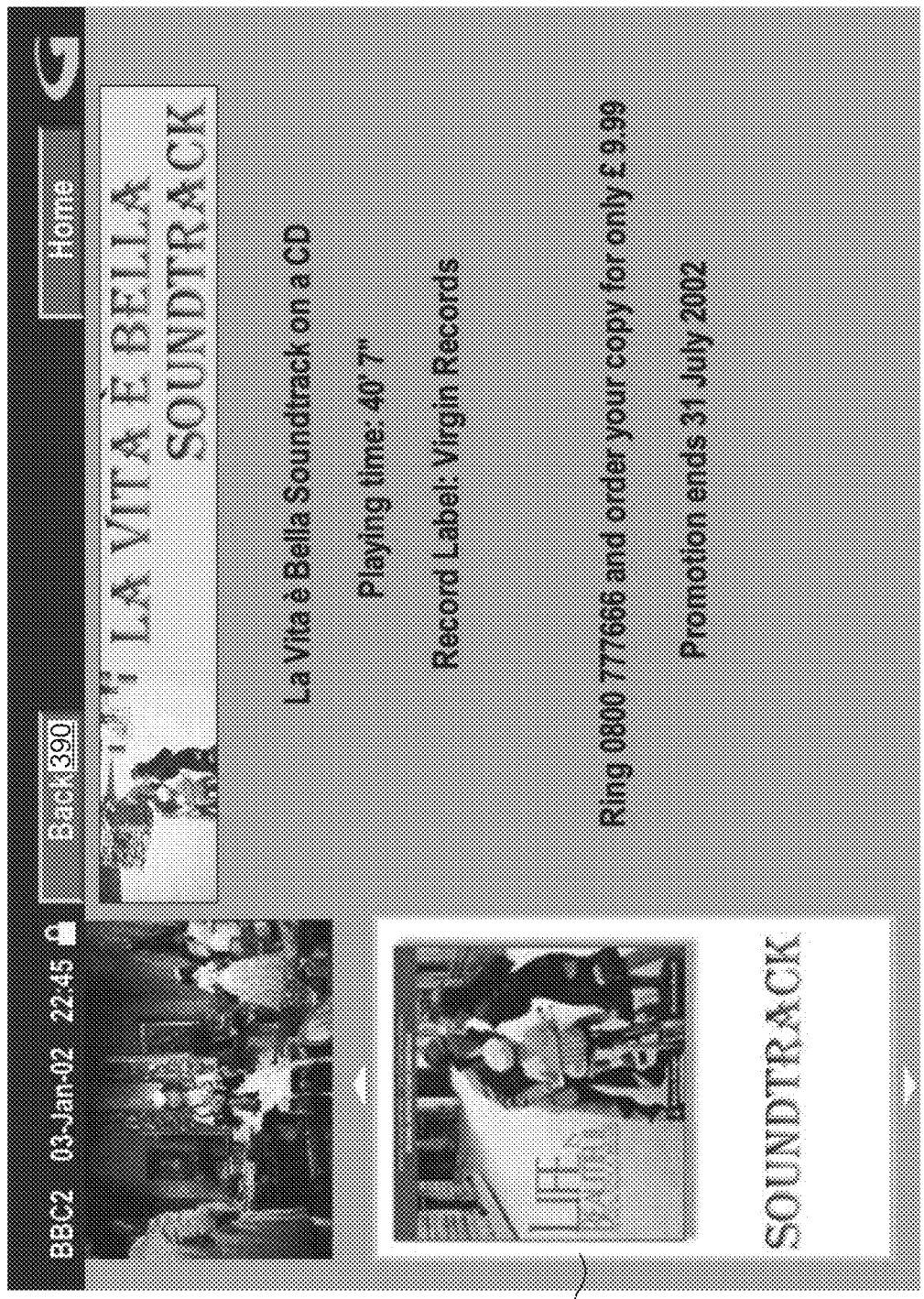
FIG. 23f is an example of an on-screen display of the EPG of FIG. 12 with the link in FIG. 23i selected and with the focus on the linked advertisement panel.
Figure 23G:
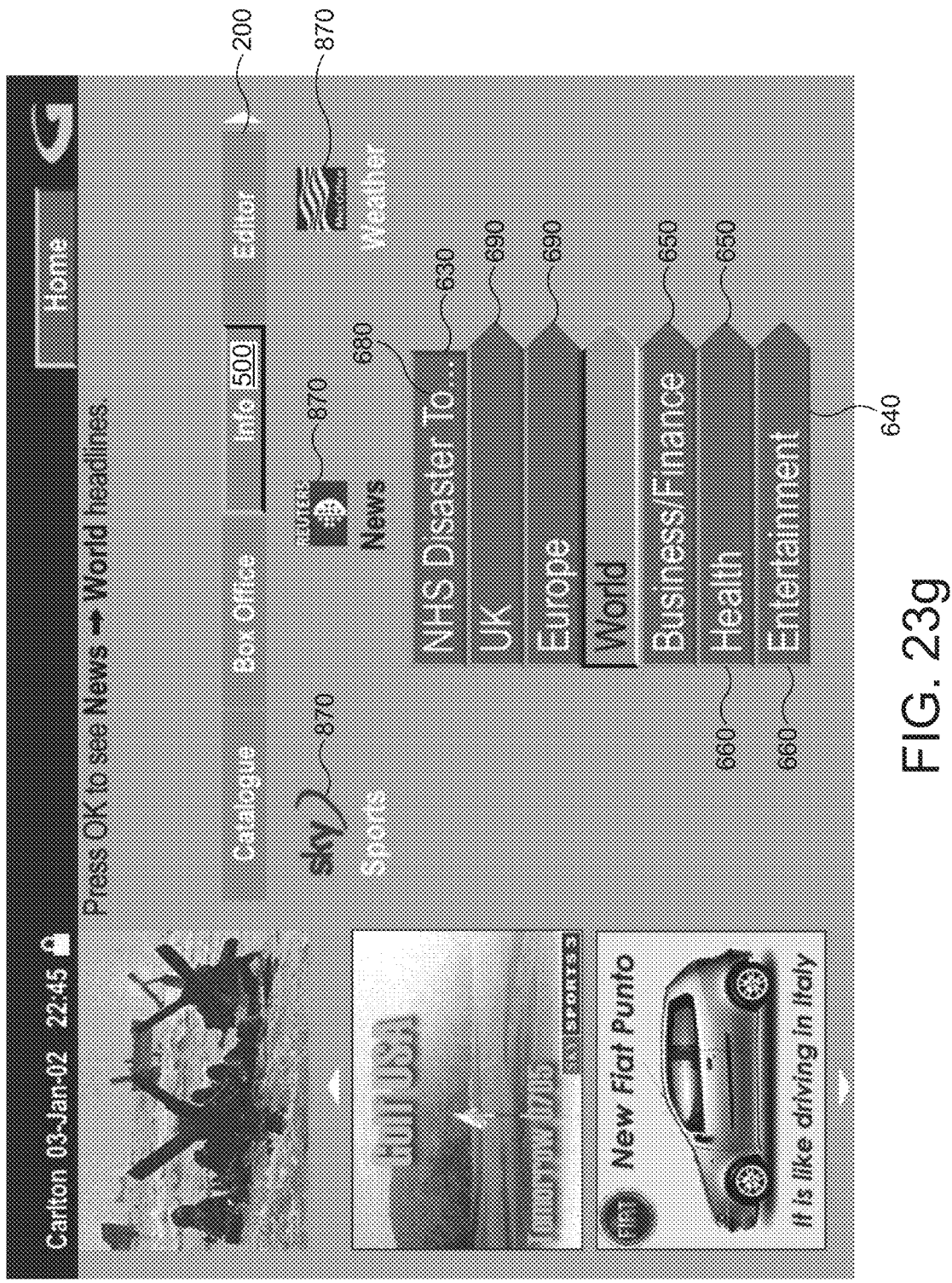
FIG. 23g is an example of an on-screen display of the EPG of FIG. 23 with the "Info" sub-mode selected and with the focus on a sub-category.

An "Advertisement" link 810 (FIG. 23*j*) points to an advertisement panel 140 where user selection of it causes the EPG to display the advertisement pointed to (as shown in FIG. 23*f*). An action button "Back" 390 will revert the display to the previous screen. Further embodiments of advertisement links may cause the EPG to display the advertisement in any of a number of states according to the values of parameters embedded in the link object Selection of an advertisement link 810 may cause the pointed advertisement to be displayed in one of multiple possible modes. For example, an advertisement link may have parameter values embedded within it that cause the advertisement to be displayed in an expanded form 190. In another example, the selecting of an advertisement link may cause the response portion of a home shopping advertisement to be partially completed with user order details (not shown).

Figure 23H:
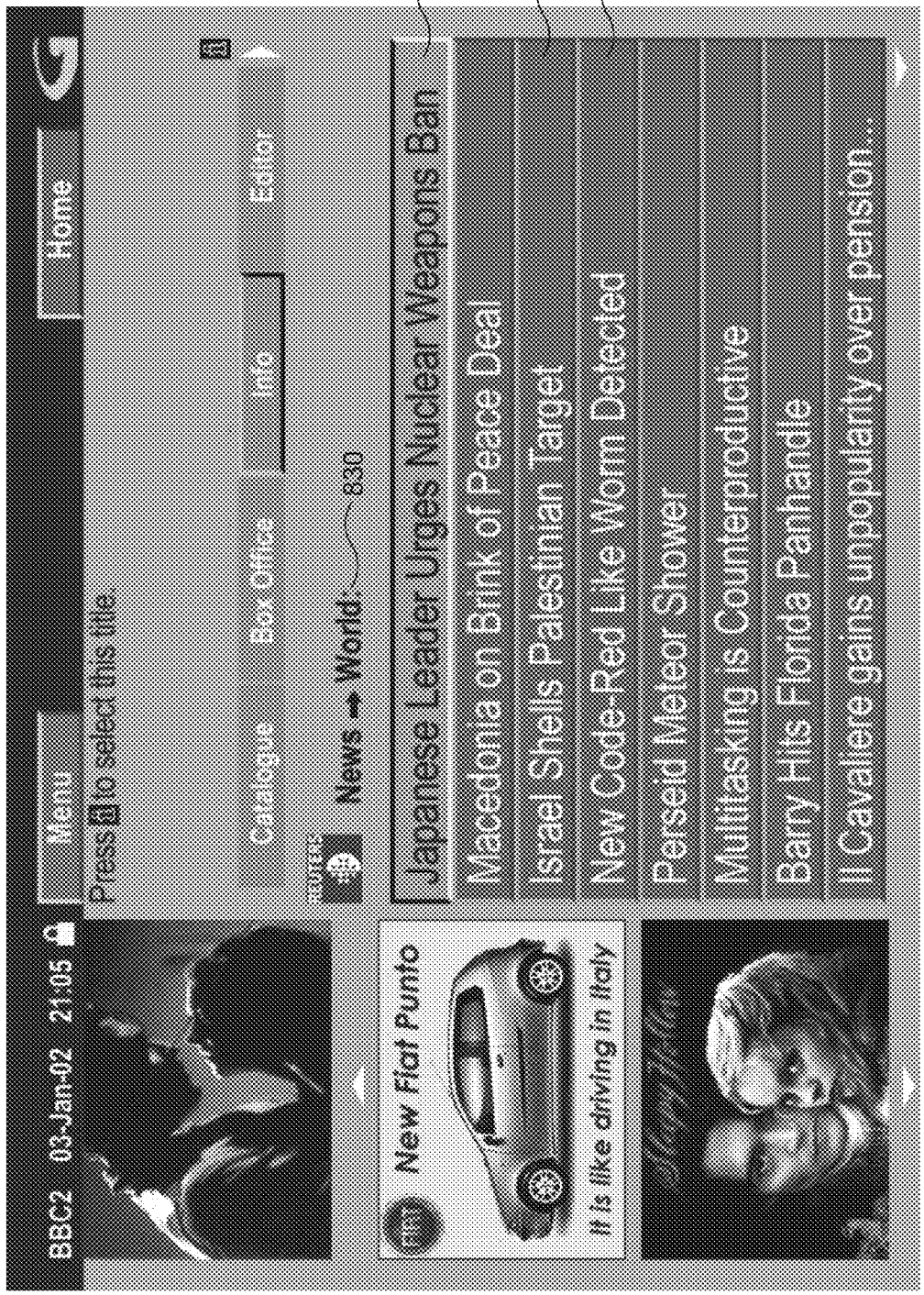
FIG. 23h is an example of an on-screen display of the EPG of FIG. 23g with the "Info" sub-mode selected displaying articles of a chosen sub-category with the focus on the top article.
Figure 23I:
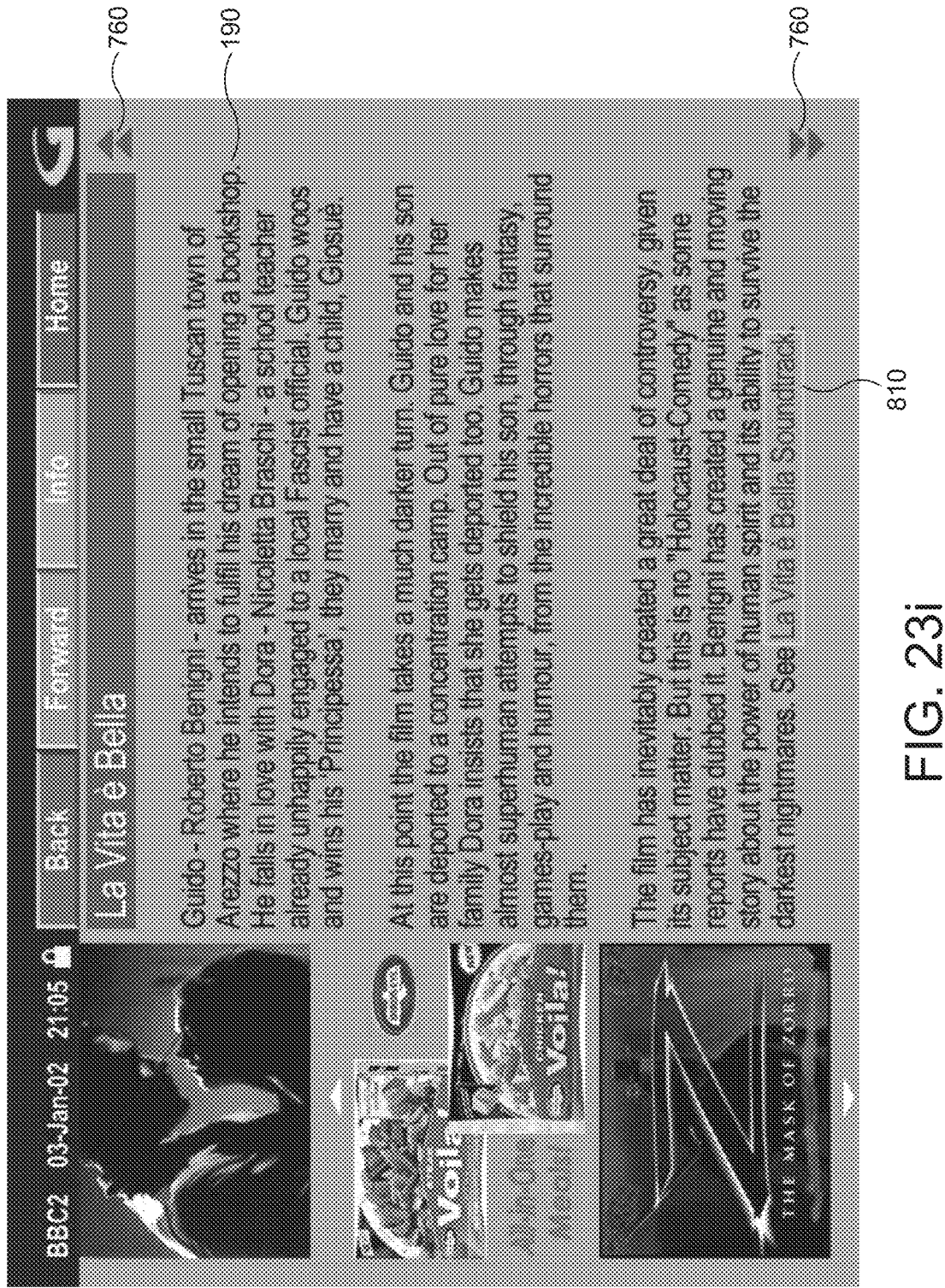
Figure 23J:
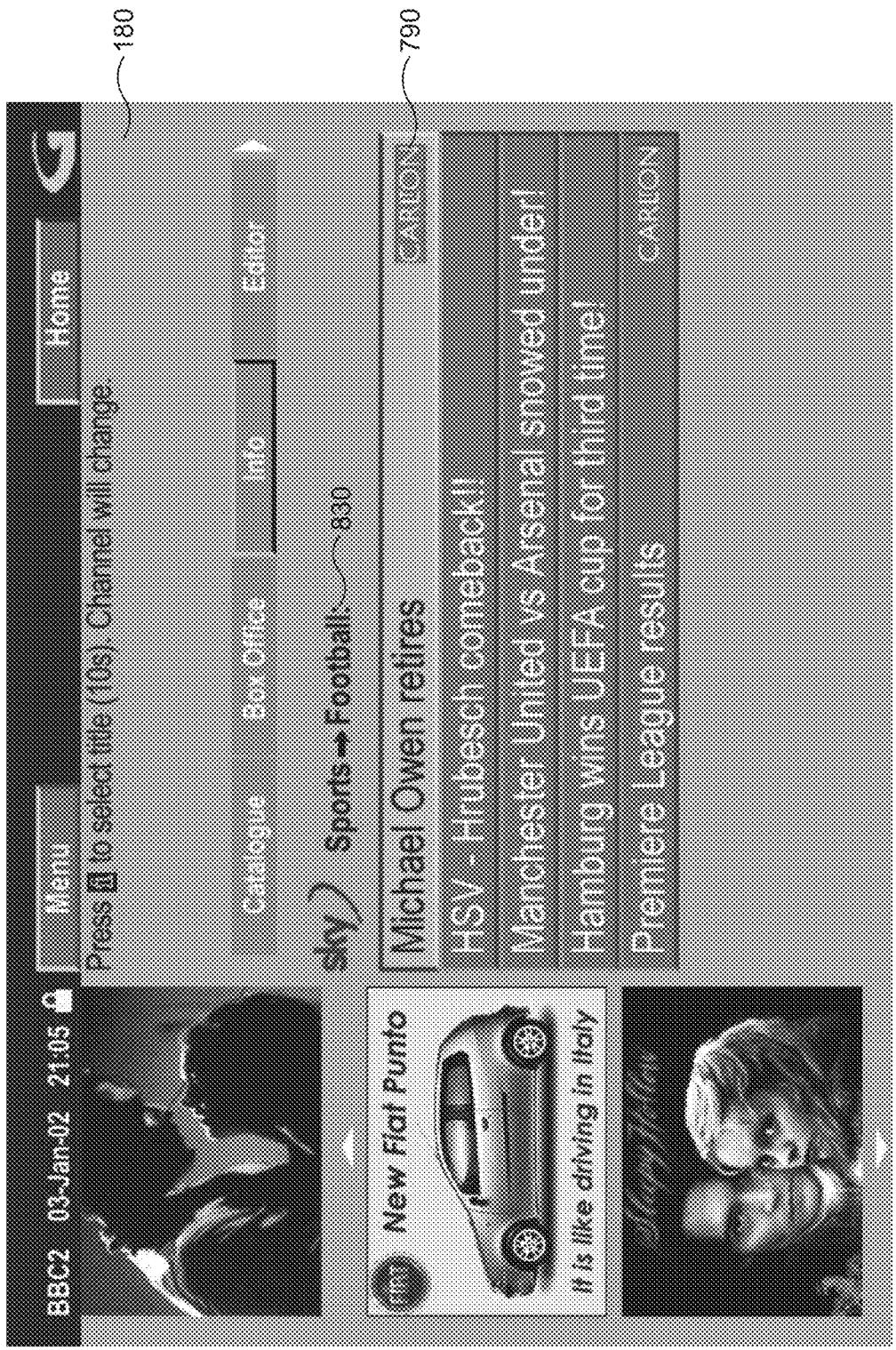
FIG. 23j is an example of an on-screen display of the EPG of FIG. 23 with the "Info" sub-mode selected displaying articles of a chosen sub-category with the focus on the top article.

A subcategory 690 may have one or more articles associated with it. For example, the "News" category may contain sub-categories such as, for example, "UK" or "Europe". Category and sub-category cells are rendered differently in colour, shading, shape or style to article cells (being displayed as a right arrow in FIG. 23). A user may cause the display of the article title referred to by a sub-category cell by focussing upon, then selecting it with the "OK" remote key. Pressing the "OK" key causes the category block 640 to be smooth scrolled to the left, and replaced entirely with the article cells 630 referred to by the focused sub-category 690 (FIG. 23*g*) smooth scrolled into position from the right, with focus switching to the top article 540 as illustrated in FIG. 23*h*. The user may use the remote cursor keys to navigate focus between article cells, simultaneous to which, excerpts of the focused article may be displayed simultaneously in information panel 180 (not shown). An article may be selected for display by pressing the "OK" key or the 'info' key on the remote control.

Certain article titles and content are time critical or frequently changing (for example sports results, weather information or breaking news). Consequently, they must be downloaded to the STB in real time immediately following a user's selection of a category, sub-category or article for display. Such titles and content are downloaded into the STB immediately following their selection by the user from a source pointed to by a broadcast network carousel address, internet URL or some other form of network pointer that is present in the STB immediately prior to the user's selection of the article.

The categories, sub-category, title and article content information may have been stored on the user's storage medium, for example disk, and may be individually "addressed" either to a specific user or to a group of users for automatic downloading to the storage medium. Addressing is performed by broadcasting data headers for each item of information (e.g. a category, an article). Contained within each header is a logical function of parameters and variables names that correspond to associated data values stored within each STB at the point when the expression is evaluated. An example of such an expression is "PostCode='SL* AND Version='123.4' AND STBFreeMemory>=512" (which would be evaluated true by STBs with Version ID "123.4" whose postcode locations both have an "SL" prefix and have, say, 512 kBytes or more of free memory). The STB downloads the header sod executes the logical expression therein to determine whether it is true or false. The information item is downloaded if the expression is evaluated as true. Expressions that refer to parameters not recognised by a particular type or version of STB are evaluated as false.

In the preferred embodiment, information that is not overly time sensitive is broadcast with other EPG information such as program listings or advertisements three to four times daily and received by the STB when it is in standby. Other, time sensitive information may be received live from a broadcast or downloaded in real-time immediately after it is selected for display by a user. The different sources of the information may be denoted visually on screen, for example, article titles available from a live broadcast carousel may be marked with a channel logo 790 denoting the channel from which they are available (FIG. 23*j*) and the maximum time delay before downloading of the article is complete may be indicated in the information panel 180.

Figure 24:
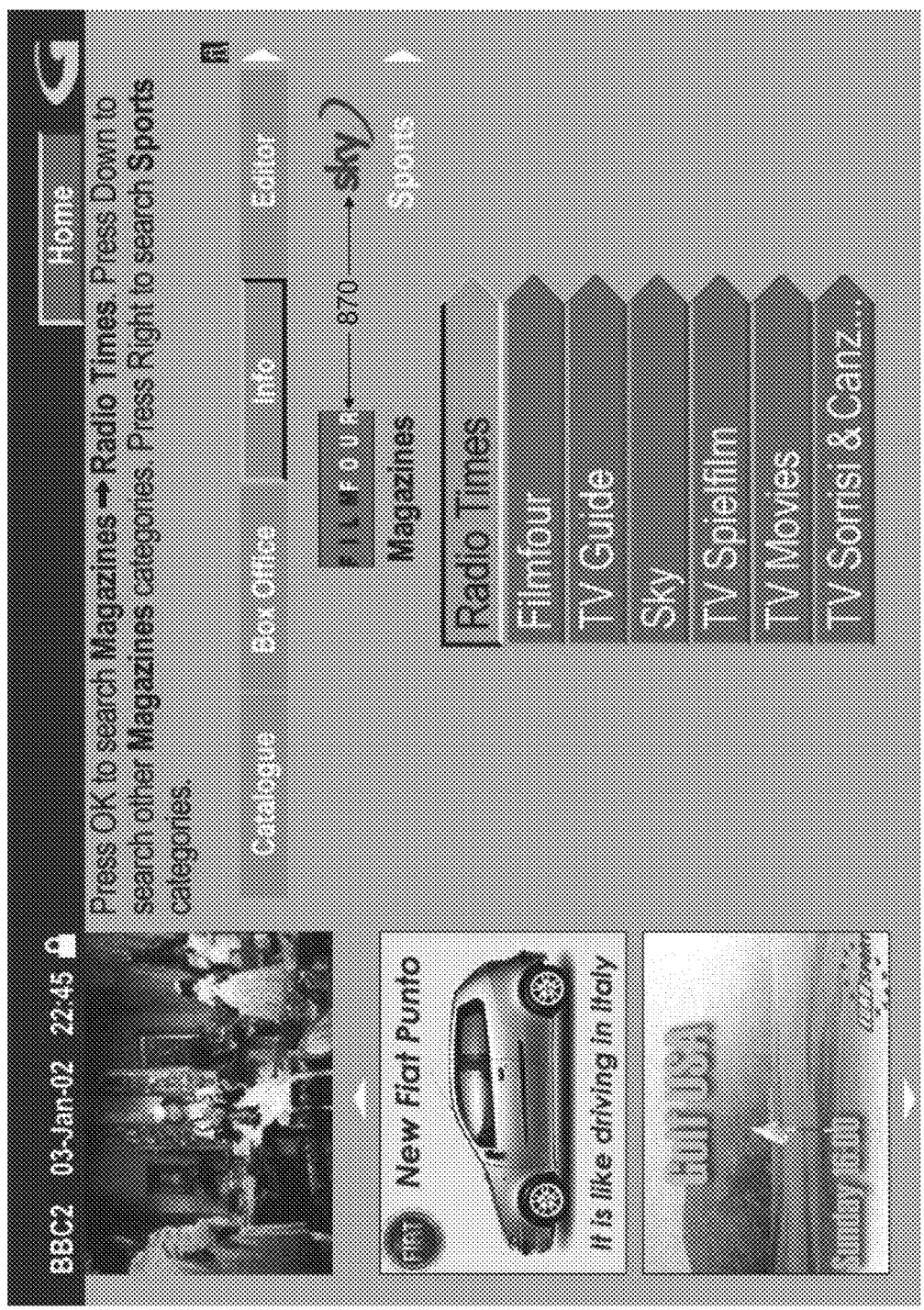
FIGS. 24 and 25 are examples of an on-screen display of the EPG of FIG. 23 with the "Info" sub-mode selected, and with the focus on a sub-category.
Figure 25:
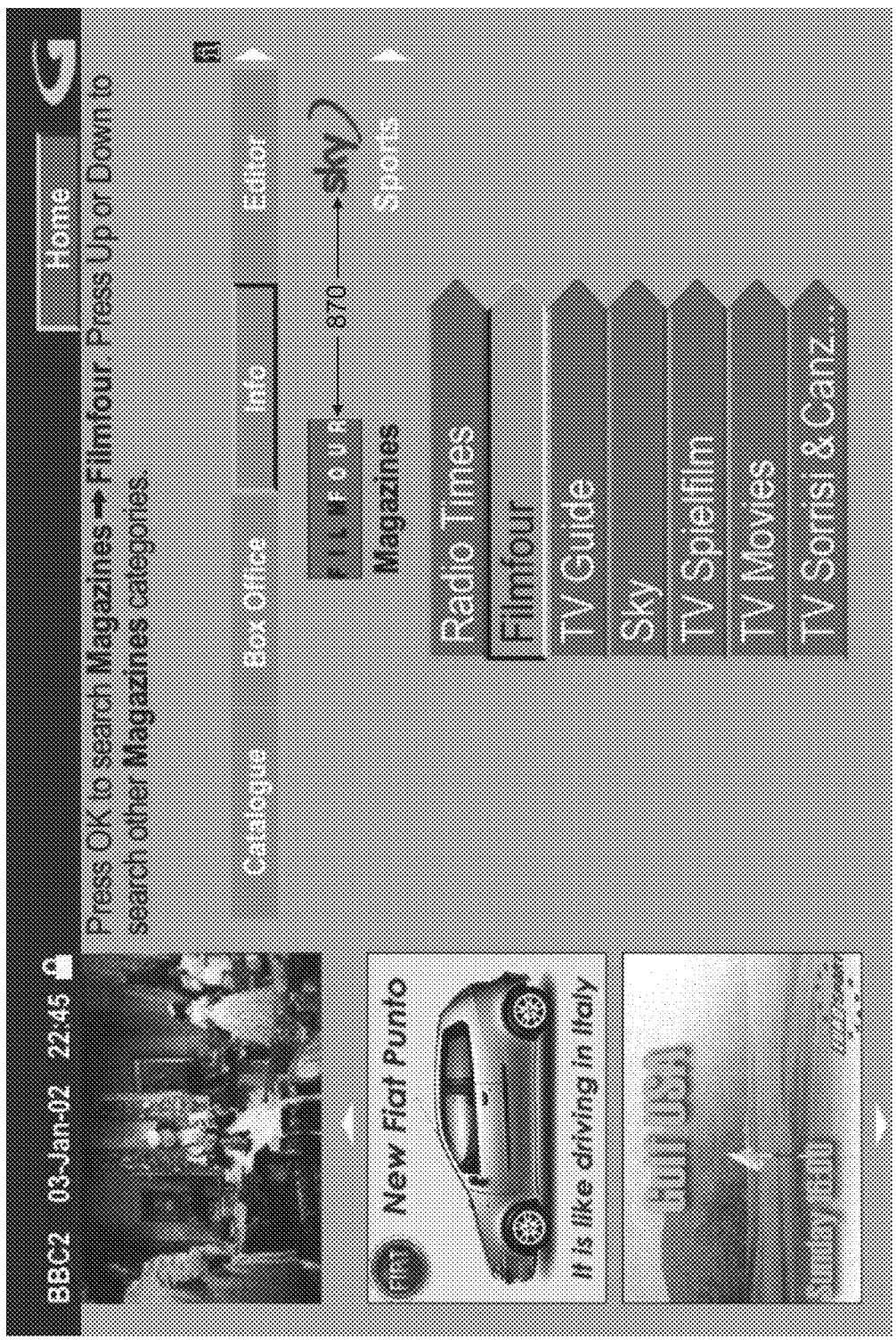
Figure 26:
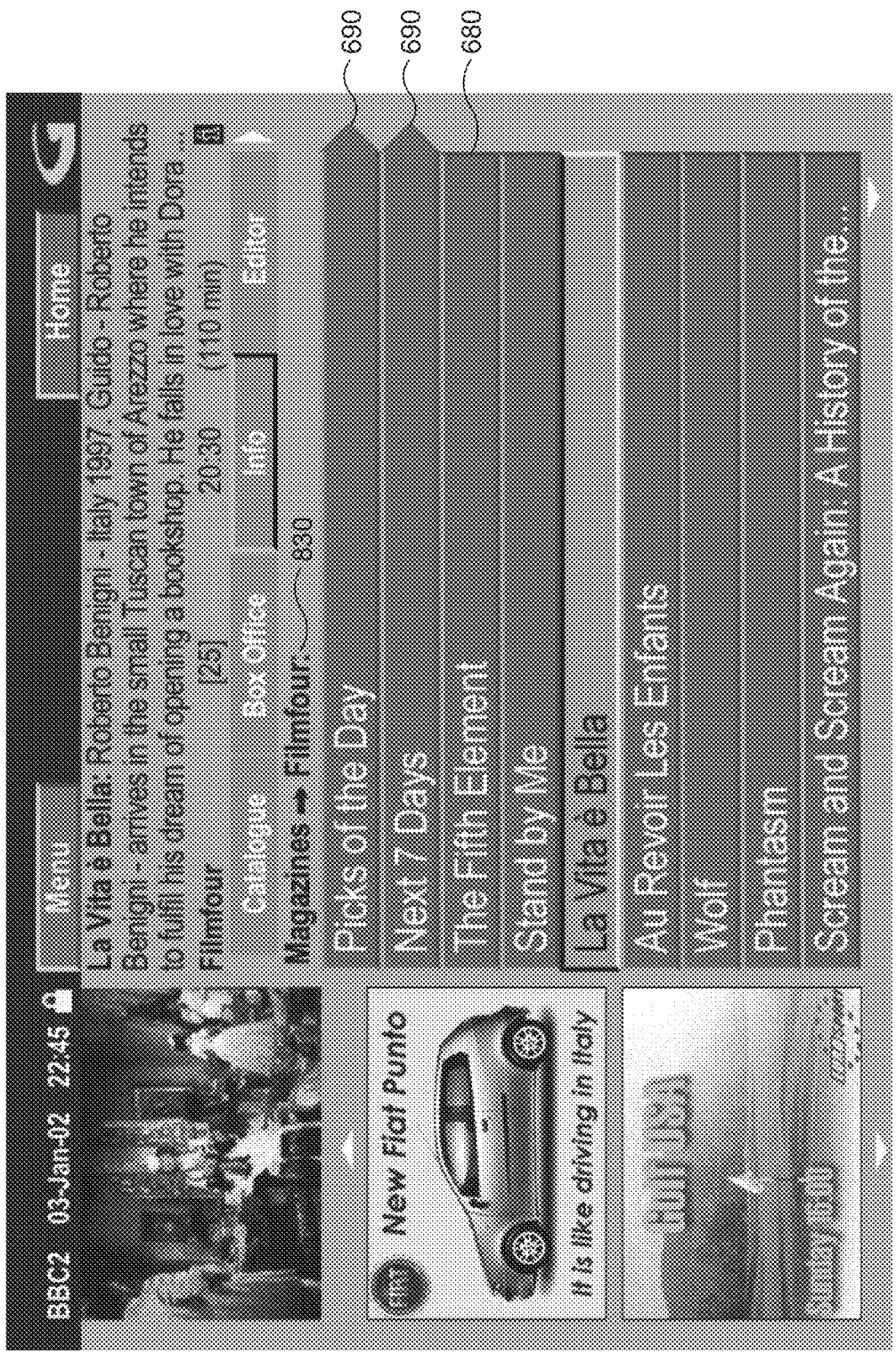
FIG. 26 is an example of an on-screen display of the EPG of FIG. 23 with the "Info" sub-mode selected displaying articles and sub-categories of a chosen sub-category.

A further information category which may be provided is entitled "Magazine". This category may provide on-screen access to particular magazine titles such as TVGuide™, the Radio Times™ and Sky™ that give program reviews and viewing recommendations such as that shown in FIGS. 24 to 26. A sponsor's logo 870 may be included for each relevant category.

Each magazine title is allocated to a particular subcategory and may contain multiple articles therein. Similar to that previously described for other information categories, the system may be arranged such that a particular STB downloads only magazines appropriate to its requirements and that these may be conditionally downloaded to STB non-volatile memory (such as a hard drive or flash memory) where their associated logical header expression is evaluated by the STB to be true. For example, a requirement for downloading of the Sky™ magazine sub-category, and its articles therein, may be that the EPG is configured to include either the "Sky One" or "Sky Sports" channel and that the STB has in excess of 10 Mbytes of free, non-volatile memory.

Figure 27:
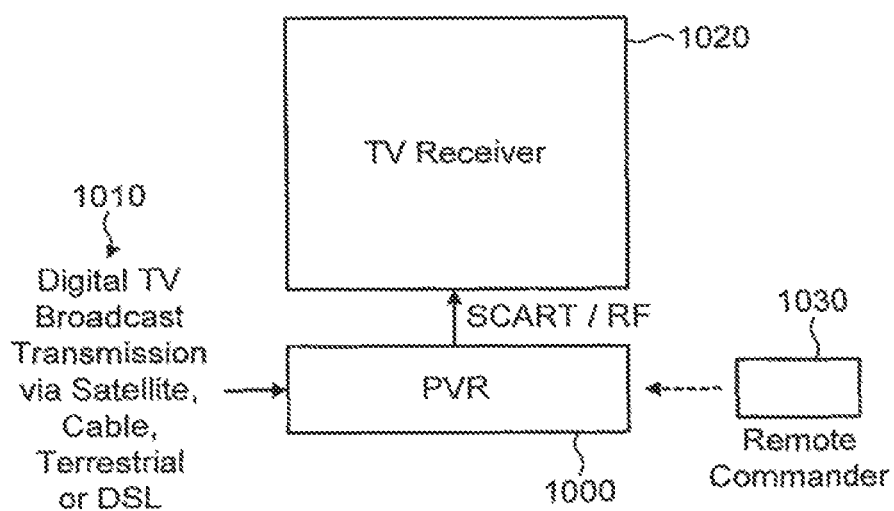
FIG. 27 is a block schematic of a personal video recorder (PVR) system for use with the EPG system embodying the invention.
Figure 28:
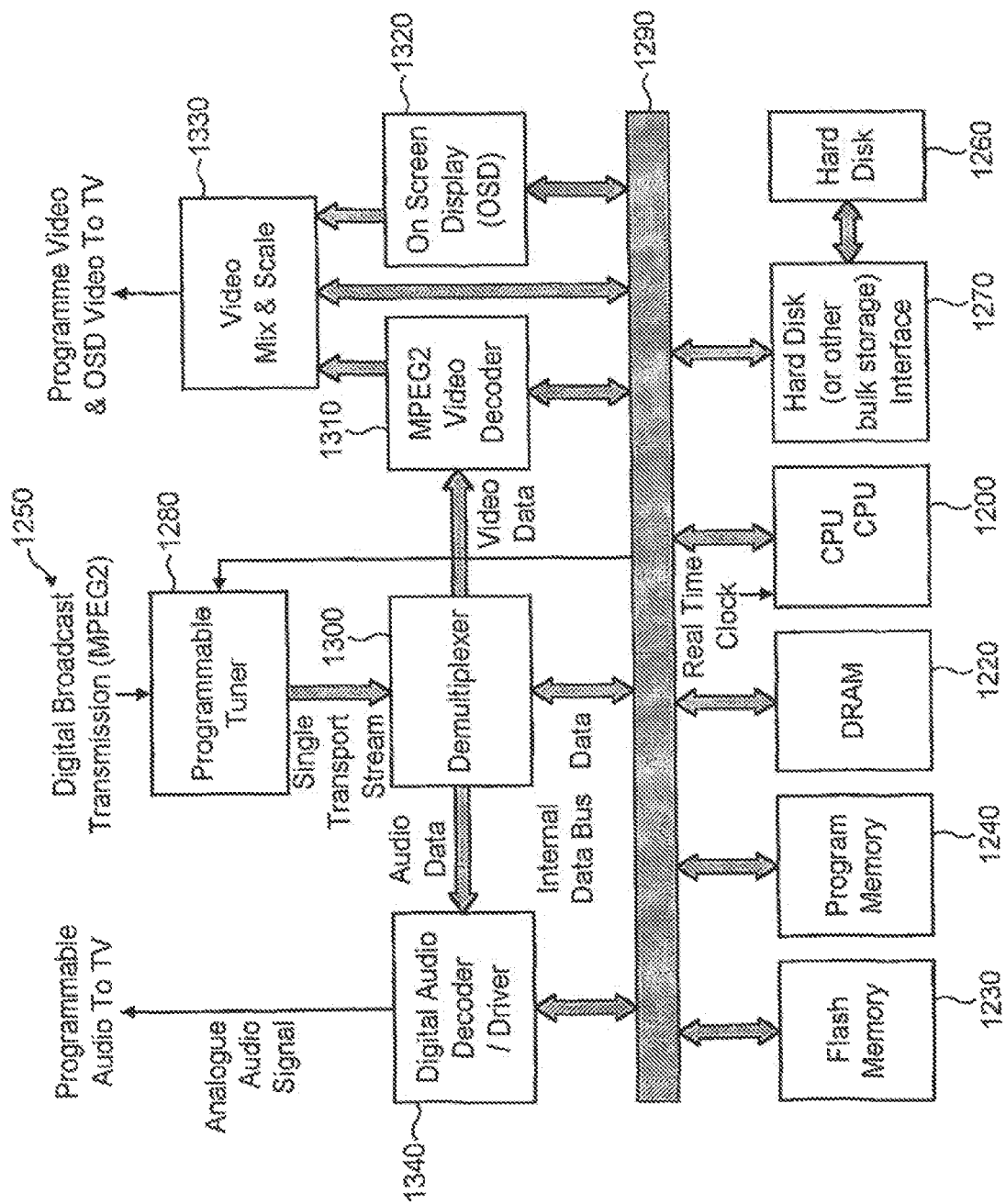
FIG. 28 is a block schematic of the individual function elements of the PVR of FIG. 27.

The functions of the EPG described above may be implemented using a PVR system shown in FIGS. 27 and 28. The PVR 1000 of FIG. 27 receives a digital broadcast transmission 1010 which may contain a number of MPEG2 transport streams containing MPEG2 encoded video, audio or data elementary digital streams. This digital broadcast 1010 may be delivered to the PVR 1000 by means of a digital satellite transmission, a digital cable transmission, a digital terrestrial transmission or a digital transmission carried on a broadband digital subscriber line (DSL). The PVR 1000 de-multiplexes and decodes the audio and video streams and passes them to the TV receiver 1020 by means of a base-band SCART connection or via the RF aerial connection by means of a re-modulated signal.

The digital broadcast transmission 1010 delivers the TV and Radio services to the PVR. It also delivers data services including the programme listings information required by the electronic programme guide (EPG). News, weather, sports and other information services may be received by the PVR as data services. Advertisement panels and other advertising information are received by the PVR as data services.

FIG. 28 shows the internal functional elements of the PVR shown in FIG. 27. This comprises a CPU 1200 coupled to volatile (DRAM) 1220, non-volatile (Flash) memory 1230 and program memory 1240. The DRAM memory 1220 is used to contain temporary information not required after cycling the STB into and out of a standby or off state. The Flash memory 1230 is used mainly to store preloaded data such as programme schedule listings, but it may also contain any information recovered from the digital broadcast transmission 1250 at anytime. For example, news, sport or weather information may be extracted from a frequently updated broadcast carousel.

The program memory contains the PVR operating software. In a preferred embodiment, the program memory also contains the EPG application software. However, the EPG application software maybe received from the digital broadcast transmission and subsequently stored to flash memory, DRAM or bulk non-volatile storage such as a hard disk or optical storage device. In order to utilise bulk non-volatile storage, such as a hard disk 1260, the PVR requires an interface 1270. This would typically be an ATAPI or SCSI hard disk interface, but any popular bulk data storage interface standard may be applicable.

The PVR contains a programmable tuner 1280, which is connected to the physical transmission termination. This termination may be a cable termination, satellite LNB, terrestrial aerial or a broadband digital subscriber line terminator (DSL). By means of the internal data bus 1290 the EPG can instruct the tuner to receive any MPEG2 transport stream (channel) present on the tuner input, including that stream (channel) carrying the host transmission.

The tuned transport stream is applied to a de-multiplexer 1300, which enables elementary audio, video and data streams to be extracted.

Video data streams are applied to the MPEG2 video decoder 1310. The output of this decoder is then combined with the on screen display OSD 1320 to provide the video signal to the TV display device. The OSD 1320 is responsible for displaying all graphical elements of the EPG application, including the advertisement panels. The video mix and scale function 1330 is capable of scaling the decoder video in order to present a reduced size live picture within the EPG display. This is the picture in graphic (PIG) display.

Audio data streams extracted by the de-multiplexer are applied to the digital audio decoder/driver 1340. This function converts the digital audio stream into an analogue signal in order to apply it to the loudspeaker(s) within the TV.

Data streams extracted from the digital broadcast transmission 1250 may be carrying information such as the programme schedule listings. During the broadcast data preload period and at any other time, this information may be cached in flash memory or transferred to bulk storage (in the case of a PVR).

There is also a real time clock (RTC—not shown) within the PVR. Immediately prior to each data preload period, the RTC generates an interrupt to the CPU 1200 causing it to wake from the standby state (if it is already in this state). The CPU then activates those parts of the PVR required to transfer preload data from the digital broadcast transmission 1250 to flash memory 1230 or bulk storage 1250. This includes instructing the programmable tuner 1390 to tune to the transport stream (channel) carrier, present on the transmitted data that contains the host broadcast transmission.

Many of the functional elements described in FIG. 28 may be combined on a single large-scale integration (LSI) silicon component.

In the case of an Integrated Digital TV (IDTV) all the components described in FIG. 28 are resident within the TV chassis.

Various modifications to the embodiments described above may be apparent.

In particular, whilst the preferred embodiments have been described with reference to an STB system, it will be appreciated that the invention could be applied either to television, personal video recorder (PVR), video-cassette-recorder (VCR), personal computer (PC) or radio systems. Furthermore, it will be appreciated that the layout of the on-screen display and location of the cells may vary from that described above as examples of preferred systems embodying the invention.

A skilled person will appreciate that variations of the disclosed arrangements are possible without departing from the invention. Accordingly, the above description of a specific embodiment is made by way of example and not for the purposes of limitation. It will be clear to the skilled person that minor modifications can be made without significant changes to the operation described above.

Reference to means for performing various steps and functions is to be understood to include all suitable variants under the doctrine of equivalents and is not to be limited to the disclosures of the specific embodiments described above.

The invention claimed is:

1. A method for using a guide on user equipment, the method comprising:
   receiving a user input selecting a time period prior to a current time; and
   in response to receiving the user input:
      generating a display that includes a plurality of video listings corresponding to past transmissions of videos within the selected time period, wherein each of the plurality of video listings corresponds to a single transmission of an associated video; and
      visually distinguishing within the generated display each of the plurality of video listings that corresponds to a past transmission of a video that is available again from each of the plurality of video listings that corresponds to a past transmission of a video that is not available again, wherein the visually distinguished video listings are displayed together with the video listings that are not visually distinguished within the generated display, and wherein the video available again is accessible responsive to an input received subsequent to the listings being displayed.

2. The method of claim 1, wherein visually distinguishing comprises displaying each of the plurality of video listings that corresponds to a past transmission of a video that is available again in a distinctive shade, color, or border.

3. The method of claim 1 further comprising receiving a user selection of one of the plurality of video listings within the generated display that corresponds to a past transmission of a video that is available again.

4. The method of claim 3 further comprising receiving a user request to record or watch a video corresponding to the selected video listing.

5. The method of claim 3 further comprising automatically recording a transmission of the video corresponding to the user-selected video listing.

6. The method of claim 3 further comprising automatically notifying the viewer before a transmission of a video corresponding to the user-selected video listing.

7. The method of claim 3 further comprising automatically notifying the viewer before a transmission of a video corresponding to the user-selected video listing by displaying an icon a pre-determined time prior to the start of the video.

8. The method of claim 1 further comprising determining, without user intervention, for each listing of the plurality of video listings within the generated display, whether said listing corresponds to a past transmission of a video that is available again.

9. The method of claim 8 further comprising receiving additional video listings corresponding to transmissions of videos, wherein the determining is performed based on whether a listing within the generated display matches any of the additional video listings.

10. The method of claim 1 further comprising searching listings information associated with transmissions of videos available again to determine a match between the listings information and the plurality of video listings corresponding to past transmissions of videos within the generated display.

11. The method of claim 1 further comprising determining whether a given listing of the plurality of video listings within the generated display corresponds to a past transmission of a given video that is available on-demand, wherein the given video listing is visually distinguished in response to determining that the given video is available on-demand.

12. A system for providing a guide on user equipment, the system comprising:
    a processor configured to:
       receive a user input selecting a time period prior to a current time; and
       in response to receiving the user input:
          generate a display that includes a plurality of video listings corresponding to past transmissions of videos within the selected time period, wherein each of the plurality of video listings corresponds to a single transmission of an associated video; and
          visually distinguish within the generated display each of the plurality of video listings that corresponds to a past transmission of a video that is available again from each of the plurality of video listings that corresponds to a past transmission of a video that is not available again, wherein the visually distinguished video listings are displayed together with the video listings that are not visually distinguished within the generated display, and wherein the video available again is accessible responsive to an input received subsequent to the listings being displayed.

13. The system of claim 12, wherein the processor is configured to visually distinguish by displaying each of the plurality of video listings that corresponds to a past transmission of a video that is available again in a distinctive shade, color, or border.

14. The system of claim 12, wherein the processor is further configured to receive a user selection of one of the plurality of video listings within the generated display that corresponds to a past transmission of a video that is available again.

15. The system of claim 14, wherein the processor is further configured to receive a user request to record or watch a video corresponding to the selected video listing.

16. The system of claim 14, wherein the processor is further configured to automatically record a transmission of the video corresponding to the selected video listing.

17. The system of claim 14, wherein the processor is further configured to automatically notify the viewer before a transmission of a video corresponding to the selected video listing.

18. The system of claim 14, wherein the processor is further configured to automatically notify the viewer before a transmission of a video corresponding to the selected video listing by displaying an icon a pre-determined time prior to the start of the video.

19. The system of claim 12, wherein the processor is further configured to determine, without user intervention, for each listing of the plurality of video listings within the generated display, whether said listing corresponds to a past transmission of a video that is available again.

20. The system of claim 19, wherein the processor is further configured to receive additional video listings corresponding to transmissions of videos, and wherein the processor is configured to determine, for each listing of the plurality of video listings within the generated display, whether said listing corresponds to a past transmission of a video that is available again by determining whether a listing within the generated display matches any of the additional video listings.

21. The system of claim 11, wherein the processor is further configured to search listings information associated with transmissions of videos available again to determine a match between the listings information and the plurality of video listings corresponding to past transmissions of videos within the generated display.

22. The system of claim 11, wherein the processor is further configured to determine whether a given listing of the plurality of video listings within the generated display corresponds to a past transmission of a given video that is available on-demand, and wherein the processor is configured to visually distinguish the given video listing in response to determining that the given video is available on-demand.

23. The method of claim 1, wherein visually distinguishing each of the plurality of video listings that corresponds to a past transmission of a video that is available again from each of the plurality of video listings that corresponds to a past transmission of a video that is not available again comprises visually distinguishing any listing included in the display that corresponds to a past transmission of a video that is available again from any listing included in the display that corresponds to a past transmission of a video that is not available again.

24. The system of claim 12, wherein the processor is configured to visually distinguish each of the plurality of video listings that corresponds to a past transmission of a video that is available again from each of the plurality of video listings that corresponds to a past transmission of a video that is not available again by visually distinguishing any listing included in the display that corresponds to a past transmission of a video that is available again from any listing included in the display that corresponds to a past transmission of a video that is not available again.

* * * * *